United States Patent [19]
Nakatani et al.

[11] Patent Number: 6,049,182
[45] Date of Patent: Apr. 11, 2000

[54] MOTOR SPEED CONTROL DEVICE

[75] Inventors: Masaji Nakatani, Nara; Chiaki Yamawaki, Habikino; Mitsunobu Yoshida, Tenri, all of Japan

[73] Assignee: Sharp Kabushiki Kaisha, Osaka, Japan

[21] Appl. No.: 08/993,527

[22] Filed: Dec. 18, 1997

[30] Foreign Application Priority Data

Dec. 25, 1996 [JP] Japan ............................. 8-345652

[51] Int. Cl.⁷ .................................................. H02P 7/00
[52] U.S. Cl. .......................... 318/432; 318/254; 318/439; 318/599; 318/138
[58] Field of Search ..................... 318/432, 254, 318/439, 138, 600, 601, 362, 368, 702; 388/811, 802, 815

[56] References Cited

U.S. PATENT DOCUMENTS

| | | | |
|---|---|---|---|
| 4,525,657 | 6/1985 | Nakase et al. . | |
| 4,988,273 | 1/1991 | Faig et al. | 425/145 |
| 5,004,965 | 4/1991 | Otokawa et al. | 318/254 |
| 5,023,924 | 6/1991 | Tajima et al. | 388/811 |
| 5,317,242 | 5/1994 | Kachima et al. | 318/254 |
| 5,469,215 | 11/1995 | Nashiki . | |
| 5,493,188 | 2/1996 | Yoshikawa et al. | 318/254 |
| 5,552,689 | 9/1996 | Matoba | 318/599 |
| 5,672,944 | 9/1997 | Gokhale et al. | 318/254 |
| 5,723,957 | 3/1998 | Ishikawa | 318/254 |

FOREIGN PATENT DOCUMENTS

| | | |
|---|---|---|
| 0382166 | 8/1990 | European Pat. Off. . |
| 4420317 | 12/1995 | Germany . |
| 054571 | 2/1994 | Japan . |
| 6-054571 | 2/1994 | Japan . |
| 046878 | 2/1995 | Japan . |
| 7-046878 | 2/1995 | Japan . |
| 2504727 | 4/1996 | Japan . |
| 504727 | 4/1996 | Japan . |

OTHER PUBLICATIONS

Nakatani et al., "Development of Low–Speed Tape Transfer Technology for VCR"; Precision Technology Development Center, Production Technology Development Group, Sharp Corporation, 1997.

*Primary Examiner*—William M. Shoop, Jr.
*Assistant Examiner*—Rita Leykin

[57] ABSTRACT

A sinusoidal wave data stream for correcting a torque ripple of a motor is stored in a torque ripple corrective memory. As the motor rotates, rotational angle information is computed from a rotational pulse signal and a rotor magnetic pole position pulse signal, which are generated accompanying the rotation. A sinusoidal wave data corresponding to the rotational angle information is recalled. Then, the sinusoidal wave data constituting a torque ripple corrective signal is subtracted from a motor control signal. With the use of the motor control signal after the subtraction, the motor is driven and controlled. With this arrangement, the motor torque ripple, which is a main cause of speed fluctuation of a polyphase brushless motor, is suppressed and stable and precise motor speed control is achieved.

55 Claims, 37 Drawing Sheets

FIG.5
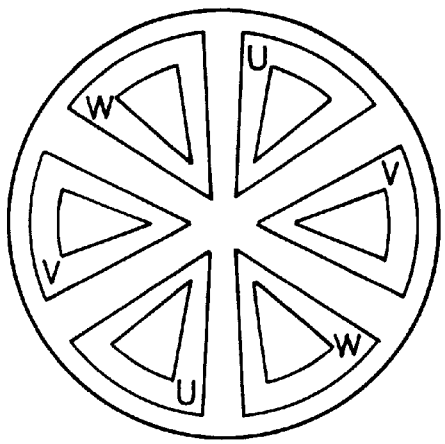
MOTOR DRIVING
COIL PATTERN
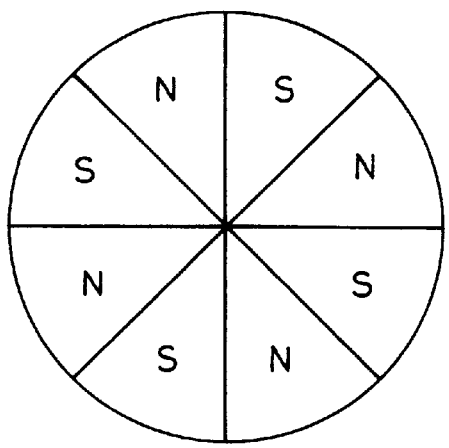
MOTOR DRIVING MAGNETIC
POLE PATTERN FIG. 18
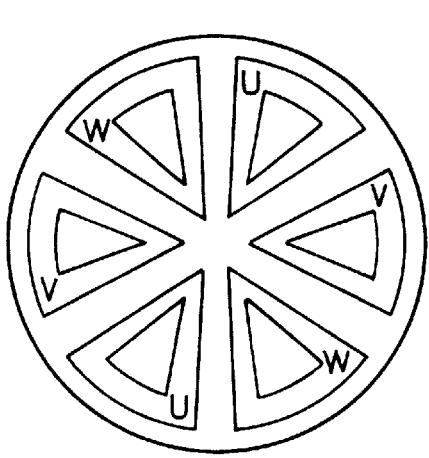
MOTOR DRIVING
COIL PATTERN
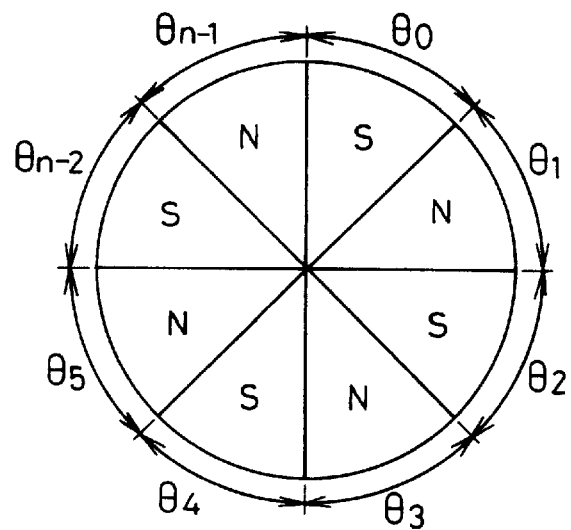
MOTOR DRIVING MAGNETIC
POLE PATTERN

FIG. 26

| ADDRESS | 0 | 1 | 2 | 3 | --- | $l_0-1$ |
|---|---|---|---|---|---|---|
| $M(l_0)$ | $D_{00}$ | $D_{01}$ | $D_{02}$ | $D_{03}$ | --- | $D_{l0-1}$ |

| ADDRESS | 0 | 1 | 2 | 3 | --- | $l_1-1$ |
|---|---|---|---|---|---|---|
| $M(l_1)$ | $D_{10}$ | $D_{11}$ | $D_{12}$ | $D_{13}$ | --- | $D_{l1-1}$ |

| ADDRESS | 0 | 1 | 2 | 3 | --- | $l_2-1$ |
|---|---|---|---|---|---|---|
| $M(l_2)$ | $D_{20}$ | $D_{21}$ | $D_{22}$ | $D_{23}$ | --- | $D_{l2-1}$ |

| ADDRESS | 0 | 1 | 2 | 3 | --- | $l_{k-1}-1$ |
|---|---|---|---|---|---|---|
| $M(l_{k-1})$ | $D_{k0}$ | $D_{k1}$ | $D_{k2}$ | $D_{k3}$ | --- | $D_{lk-1}$ |

MOTOR SPEED CONTROL DEVICE

FIELD OF THE INVENTION

The present invention relates to a device for controlling a motor rotational speed of a polyphase brushless motor so that it is kept constant, and particularly relates to a device for controlling with high precision a rotational speed of a capstan motor or a drum motor for use in a magnetic recording/reproducing apparatus such as a VTR.

BACKGROUND OF THE INVENTION

FIG. 17 illustrates an arrangement of a conventional motor speed control device.

In the figure, 51 is a polyphase brushless motor, 52 is a rotation detecting sensor such as an MR sensor for detecting a magnetic pattern formed on a motor rotating section, 53 is a waveform shaping circuit for amplifying an output signal supplied from the rotation detecting sensor 52 so as to output a rotational pulse signal having pulses proportional to the motor rotation in number, 54 is a cycle computing unit for outputting cycle information of the pulse signal, 55 is an adder, 56 is an amplifier for amplifying an error signal supplied from the adder and performing phase compensation so as to output a speed command value, 57 is a motor driving circuit for switching power supply to each coil in response to signals from sensors such as a Hall element (not shown) for detecting a rotor position, and driving the motor in accordance with the speed command value. The motor speed control device is composed of these components.

Feedback control is performed with respect to the motor rotational speed as follows: cycle information as information on the rotation of the motor is compared with a target value, and power supply to motor coils is switched based on an error found by the comparison, so that the cycle information comes to coincide with the target value.

One factor causing fluctuation of the motor rotational speed of the polyphase brushless motor is so-called a motor torque ripple, which is a phenomenon as follows: a motor torque cyclically ripples at every switching of excitation of the motor coils, thereby varying the motor rotational speed. The motor torque ripple is caused due to, for example, inconsistancy in exciting current at switching of motor excitation, or heterogeneity in magnetic flux density at a rotor magnetic pole switching point. Usually, one fluctuation component, the number of times of whose appearance per one rotation of the motor is a least common multiple of the number of the coils and the number of the rotor magnetic poles, occurs more greatly than the others. In addition, another fluctuation component, the number of times of whose appearance per one rotation is an integral multiple of the number of the rotor magnetic poles, also occurs. For example, in the case of a three-phase brushless motor with 6 driving coils and 8 driving magnetic poles, a speed fluctuation component at a great degree appears 24 times per one rotation of the motor. Such speed fluctuation components due to the motor torque ripple cannot be fully eliminated by the conventional motor speed control device, and therefore, motor control with high precision has been difficult.

To eliminate the speed fluctuation components due to the motor torque ripple, the applicant of the present application has filed a patent application of an invention which has been disclosed in the Japanese Publication for Laid-Open Patent Application No. 6-54571/1994 (Tokukaihei 6-54571). The following description will briefly explain the arrangement of the invention disclosed in Tokukaihei 6-54571. An amplitude and a phase of a motor torque ripple of a motor to be controlled are preliminarily measured, and an amplitude of a sinusoidal wave data (gain set value) and a phase (start address) are set as corrective data, in accordance with the measured amplitude and phase of the motor torque ripple. Then, rotational position information (FG address) is detected based on position information (PG) and rotational information (FG) of the motor, and the corrective data is recalled in accordance with the rotational position information and are added to the motor command value. Since the corrective data is set so as to cancel the motor torque ripple, the motor torque ripple are corrected and the motor rotation control can be realized with high precision.

According to the invention disclosed in Tokukaihei 6-54571, the correction is basically possible with respect to any component of a motor torque ripple as long as the number of times of appearance of the motor torque ripple is an integral multiple of the number of rotations of the motor. Besides, the correction is performed by a simple process of recalling the corrective data, irrelevant to an amplitude and phase of the motor torque ripple. Therefore, it is a very effective method wherein the motor torque ripple is a corrected with simple processes.

However, the invention disclosed in Tokukaihei 6-54571 has following drawbacks.

First of all, though it has the aforementioned advantage in that the correction is possible with respect to any component of a motor torque ripple as long as the number of times of appearance of the motor torque ripple is an integral multiple of the number of rotations of the motor, it has a drawback in that an operation for measuring position information (phase and amplitude) of motor torque ripples is necessitated as to each motor, thereby making the correcting operation troublesome. Besides, since corrective data for one rotation of the motor has to be stored in the case where the number of pulses of the position information PG per one rotation of the motor is one, a corrective data amount and memory capacity expand.

Secondly, since the rotational position information (FG address) is set to different values throughout one rotation of the motor so that the corrective data is recalled, position information PG for exclusive use for detection of the rotational position information is required.

Thirdly, since amplitude information of the motor torque ripple is a value which has been preliminarily measured, effects may decrease when the amplitude varies at every drive of the motor, or when the amplitude varies during rotation of the motor.

SUMMARY OF THE INVENTION

The present invention has been made in light of the fact that the number of times a main component of a motor torque ripple appears is an integral multiple of the number of cycles for switching excitation of motor coils. The object of the present invention is to provide a motor speed control device which is capable of controlling a motor rotational speed with high precision by correcting or eliminating the motor torque ripple.

In a preferred embodiment of the present invention, a motor speed control device is intended to control a rotational speed of a polyphase brushless motor. To achieve the above object, the motor speed control device comprises (1) a rotational angle detector for detecting rotational angle information indicating a rotational angle of the motor, based on (i) a rotor magnetic pole position pulse signal having n pulses per one rotation of the motor, n being an integer satisfying n>1 and an integral multiple of the number of driving magnetic poles of the motor, and (ii) a rotational pulse signal indicating the number of rotations of the motor and having m pulses per one rotation of the motor, m being an integer satisfying m>n; (2) a torque ripple corrective memory for preliminarily storing a data stream for correcting a torque ripple of the motor, reading out a data corresponding to the rotational angle information from the data stream, and outputting the read-out data as a torque ripple corrective signal; and (3) an adder-subtractor for add-subtracting the torque ripple corrective signal with respect to a motor control signal for controlling the rotational speed of the motor so as to correct the motor control signal.

According to the above arrangement, the rotational angle detector produces rotational angle information referring to driving magnetic pole positions, and the torque ripple corrective signal is outputted in accordance with the rotational angle information. Here, the cycle and phase of the motor torque ripple are in synchronization with the driving magnetic pole positions, and in motors, frequency components and phases of motor torque ripples do not greatly differ from each other as long as the motors have the same structure. Therefore, a data stream for correcting a motor torque ripple can be commonly applied to the motors having the same structure. As a result, unlike the conventional art wherein a motor torque ripple had to be measured as to each individual motor so that a data stream was prepared, the time for preparing a data stream for each motor can be saved.

As a result, fluctuation of the motor rotational speed due to a motor torque ripple can be surely corrected and eliminated, and hence, a motor speed control device capable of stably controlling the motor rotational speed with high precision is relatively easily provided.

Moreover, in the aforementioned arrangement, the motor control signal is corrected by addition-subtraction of the torque ripple corrective signal. Therefore, unlike the case where other types of calculation such as multiplication are used for the correction, only a torque ripple component is surely corrected and eliminated from the motor control signal.

Note that in the case where the rotational angle information is produced only from the rotational pulse signal and the rotor magnetic pole position pulse signal, the rotational angle detector is unable to detect an absolute rotational angle of the rotor. However, since the motor torque ripple is synchronizing with the driving magnetic pole positions, the motor speed control device is capable of correcting and eliminating the motor torque ripple without difficulties.

Besides, the rotational angle detector preferably resets the rotational angle information in synchronization with the rotor magnetic pole position pulse signal and on a cycle shorter than a rotational cycle of the motor. By doing so, an amount of data of the data stream can be reduced without degradation of a torque ripple correction effect, thereby allowing a memory capacity of the torque ripple corrective memory to be reduced.

Incidentally, the rotor magnetic pole position pulse signal may be any signal as long as it synchronizes with the driving magnetic pole positions. However, to simplify the arrangement of the motor speed control device, the rotor magnetic pole position pulse signal is preferably either a motor coil excitation switching signal used for driving the motor or a signal found from a back electromotive voltage induced at the motor coils for driving the motor.

Since these signals are indispensable when the motor is driven, there is no need to additionally provide, for example, a position detecting sensor using a Hall sensor or the like to generate the rotor magnetic pole position pulse signal. As a result, it is enabled to provide a lower-cost motor speed control device with circuitry of a smaller scale.

Furthermore, the motor speed control device having any one of the above arrangements preferably further comprises (1) a torque ripple corrective amplitude computing unit for, based on motor information fluctuating in accordance with a torque ripple of the motor, estimating amplitude information indicating an amplitude of the torque ripple corrective signal which is required to cancel the torque ripple, and (2) an amplitude adjuster for adjusting the amplitude of the torque ripple corrective signal in accordance with the amplitude information. With this arrangement, the amplitude of the torque ripple corrective signal is adjusted in accordance with an actual rotational condition of each motor. As a result, more precise correction can be realized.

Note that the above amplitude information may be set at least once prior to the torque ripple correction, for example, immediately after the rotation of the motor starts, or when the motor speed control device is assembled. Since such amplitude information can be computed during several rotations of the motor, even if the torque ripple correction cannot be conducted during the computation of the amplitude information, it does not cause any problem.

Furthermore, to enhance the precision of the correction, it is preferable that the torque ripple corrective amplitude computing unit sequentially detects a torque ripple correction effect while the adder-subtractor is correcting the motor control signal, and renews the amplitude information to be supplied to the amplitude adjuster based on the detection result. With this arrangement, the amplitude information is automatically adjusted to an optimal value at the point of time. Therefore, the motor speed control device is made to respond to changes due to aging such as temperature changes, variation of loads, fluctuation of the motor speed, and the like, thereby becoming capable of correcting the motor torque ripple more precisely.

Furthermore, the torque ripple corrective memory stores a plurality of corrective data streams differing in the number of constituent corrective data, and the motor speed control device may further comprises a selecting unit for selecting, among the corrective data streams, one corrective data stream to be outputted as the torque ripple corrective signal, in accordance with a current pulse interval of the rotor magnetic pole position pulse signal.

With this arrangement, even though the pulse interval of the rotor magnetic pole position pulse signal varies, cycles of the torque ripple corrective signal can be adjusted in accordance with respective pulse intervals of the rotor magnetic pole position pulse signal. Therefore, the motor speed can be stably controlled with high precision.

Additionally, instead of reproducing the torque ripple corrective signal from the torque ripple corrective memory, there may be provided a corrective data computing unit for computing a level of a torque ripple corrective signal corresponding to the rotational angle information, based on a total number of pieces of rotational angle information supplied during a current pulse interval of the rotor magnetic pole position pulse signal, and the rotational angle information detected. With this arrangement as well, the cycles of the torque ripple corrective signal can be adjusted in accordance with respective pulse intervals of the rotor magnetic pole position pulse signal. Therefore, the motor speed control device is made capable of stably controlling the motor speed with high precision.

Furthermore, there may be provided a phase compensating unit for adjusting the phase of the torque ripple corrective signal so as to compensate a phase difference between the torque ripple of the motor and the torque ripple corrective signal. With this arrangement, a phase difference between the torque ripple corrective signal and the actual motor torque ripple is reduced, thereby enabling more stable and precise control with respect to the motor rotational speed.

Moreover, the phase compensating unit more preferably includes a phase difference detecting section for detecting a phase difference since input of a pulse of the rotor magnetic pole position pulse signal till input of a pulse of the rotational pulse signal. In addition, the phase compensating unit may be equipped with a phase lag computing section for computing a phase of the torque ripple corrective signal corresponding to 0.5 time the pulse interval of the rotational pulse signal. With these arrangements, even in the case where a phase lag originating in the phase difference between pulses varies or a phase lag originating in the zeroth-order delay due to data holding varies, such phase lags are surely compensated.

On the other hand, a torque ripple correcting method of a motor speed control device of the present invention comprises the steps of (a) storing a torque ripple corrective signal synchronizing with a rotor magnetic pole position pulse signal which is inputted at timings in synchronization with driving magnetic pole positions of the motor and has a cycle shorter than a pulse input cycle of the rotor magnetic pole position pulse signal, and (b) correcting a motor control signal for controlling the rotational speed of the motor, by, in synchronization with the rotor magnetic pole position pulse signal, reproducing the torque ripple corrective signal and add-subtracting the torque ripple corrective signal with respect to the motor control signal.

According to the above method, the motor control signal is corrected by the torque ripple corrective signal which synchronizes with the rotor magnetic pole position pulse signal. Here, the cycle of the phase of the motor torque ripple synchronize with the driving magnetic pole positions, and in motors, frequency components and amplitudes do not greatly differ as long as the motors have the same structure. Therefore, the torque ripple corrective signal can be commonly applied to the motors of the same structure, thereby allowing remarkable simplification of the operation for preparing the torque ripple corrective signal.

As a result, it is possible to surely correct and eliminate the motor rotational speed fluctuation due to the motor torque ripple, and stably control the motor rotational speed with high precision.

Note that since the torque ripple corrective signal synchronizes with the rotor magnetic pole position pulse signal and has the cycle as described above, it is possible to surely correct and eliminate the motor torque ripple without detecting an absolute rotational angle of the rotor. Besides, as for the above method for storing the torque ripple corrective signal, sampled values may be stored, or, alternatively, a process for computing a level of the torque ripple corrective signal may be stored. Furthermore, a step of adjusting the amplitude, cycle, and phase of the torque ripple corrective signal is preferably included in the method, so that the method becomes more effective.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

For a fuller understanding of the nature and advantages of the invention, reference should be made to the ensuing detailed description taken in conjunction with the accompanying drawings.

BRIEF DESCRIPTION OF THE DRAWINGS

FIG. 5 is a view illustrating driving coil patterns and driving magnetic pole patterns of an example of a polyphase brushless motor used in the embodiments of the present invention.

FIG. 18 is a view illustrating driving coil patterns and driving magnetic pole patterns of an example of a polyphase brushless motor of the present invention.

FIG. 26 is an explanatory view of corrective data streams stored in the torque ripple corrective memory in accordance with the twelfth embodiment of the present invention.

DESCRIPTION OF THE PREFERRED EMBODIMENTS

The following description will explain an embodiment of the present invention, while referring to Figures.

Figure 1:
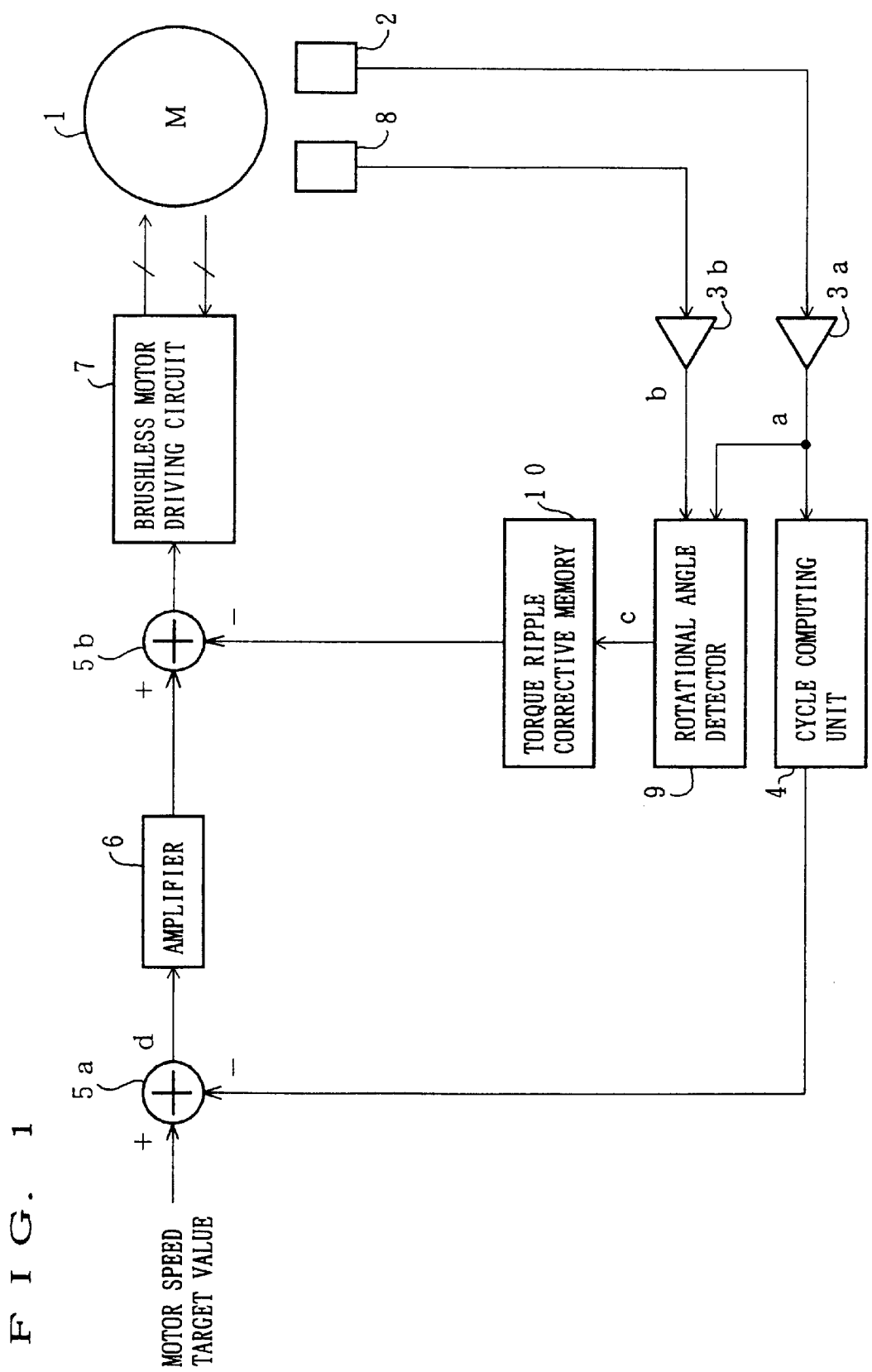
FIG. 1 is a view illustrating an arrangement in accordance with a first embodiment of the present invention.

FIG. 1 is a view illustrating an arrangement in accordance with a first embodiment of the present invention.

In FIG. 1, 1 is a polyphase brushless motor. 2 is a rotation detecting sensor such as an MR sensor for detecting a magnetic pattern formed on a motor rotating section. 8 is a position detecting sensor, such as an MR sensor or a Hall sensor, for detecting positions of driving magnetic poles of a motor rotor. 3a is a waveform shaping circuit for amplifying an output signal supplied from the rotation detecting sensor 2 so as to output a rotational pulse signal a in proportion to the motor rotation. 3b is a waveform shaping circuit for amplifying an output signal supplied from the position detecting sensor 8 so as to output a rotor magnetic pole position pulse signal b in proportion to the motor rotation. 4 is a cycle computing unit for outputting cycle information of the rotational pulse signal a. 9 is a rotational angle detector for outputting rotational angle information c by determining it from the rotational pulse signal a and the rotor magnetic pole position pulse signal b. 10 is a torque ripple corrective memory which stores a sinusoidal data stream, for outputting a sinusoidal wave data corresponding to the rotational angle information c as access address. 5a and 5b are adders. 6 is an amplifier for amplifying a speed error signal d supplied from the adder 5a and performing phase compensation with respect to it so as to output a motor control signal. 7 is a brushless motor driving circuit for driving the brushless motor, by switching power supply to each coil in response to a signal from a sensor such as a Hall element (not shown) for detecting a rotor position, and driving the motor in accordance with an input value. The motor speed control device is composed of these components.

The following description will explain operations of each component.

FIG. 5 illustrates motor stator driving coil patterns and motor rotor driving magnetic pole patterns of a three-phase opposed-type brushless motor having 6 coils and 8 poles as a polyphase brushless motor 1. This motor is arranged so that rotation or torque is controlled by switching excitation of each of the three-phase coils as well as with the use of driving current.

The brushless motor driving circuit 7 controls the switching of excitation of each coil of the polyphase brushless motor 1 as well as the driving current, and by doing so, the polyphase brushless motor 1 is caused to rotate, generating a motor torque.

Note that generally the excitation switching timing has to synchronize with the motor rotor magnetic pole position, and as a method for doing so, there have been proposed a method wherein a Hall sensor or the like is provided in a motor stator so that the motor rotor magnetic pole positions are detected, and a method wherein a back electromotive voltage generated in a motor coil is detected from a motor coil terminal. In an arrangement in FIG. 1, the phase detecting sensor 8 is provided, and this shows that in the first embodiment the method wherein a Hall sensor is used is applied. But the switching timing may be detected with the use of the back electromotive voltage, as is the case with other embodiments which will be described later.

Information on rotation of the polyphase brushless motor 1 is detected as frequency information in proportion to the number of rotations by the rotation detecting sensor 2, and an output of the rotation detecting sensor 2 is reshaped into the rotational pulse signal a by the waveform shaping circuit 3a composed of an amplifier and a comparator.

The cycle computing unit 4 computes a pulse cycle of the rotational pulse signal a, and outputs the result as motor speed information. Then, the adder 5a computes a difference between a motor speed target value and the motor speed information, and outputs the speed error signal d.

The speed error signal d is subjected to phase compensation and is amplified by the amplifier 6, and a motor control signal is outputted. The amplifier 6 may be arranged so as to have a function of so-called speed/integration control (PI control) so as to also simultaneously perform integral compensation with respect to the speed error signal, or may have another arrangement.

Then, the adder 5b subtracts a torque ripple corrective signal from the motor control signal. The motor control signal thus having been subjected to the subtraction is supplied to the brushless motor driving circuit 7, where a driving current of the polyphase brushless motor 1 is set.

In other words, the rotation detecting sensor 2, the waveform shaping circuit 3a, the cycle computing unit 4, the adder 5a, the amplifier 6, and the brushless motor driving circuit 7 constitute a feedback control system for controlling a rotational speed of the polyphase brushless motor 1, while the rotation detecting sensor 2, the waveform shaping circuit 3a, the position detecting sensor 8, the waveform shaping circuit 3b, the rotational angle detector 9, the torque ripple corrective memory 10, and the brushless motor driving circuit 7 constitute a system for motor torque ripple correction for the polyphase brushless motor 1. The present invention relates to the latter, that is, the system for the motor torque ripple correction.

To be more specific, driving magnetic pole positions are detected by the position detecting sensor 8, and an output therefrom is reshaped into the rotor magnetic pole position pulse signal b by the waveform shaping circuit 3b which is composed of an amplifier and a comparator.

The rotational angle detector 9 is composed of a counter which is reset at an edge of the rotor magnetic pole position pulse signal b and increases its count at an edge of the rotational pulse signal a, and an output of the counter is outputted as rotational angle information c indicating a rotational angle of the motor.

The torque ripple corrective memory 10 stores a sinusoidal wave data stream for correcting the motor torque ripple, and outputs the torque ripple corrective signal which corresponds to a rotational angle, in response to the rotational angle information c thus supplied thereto which is used as access address. The cycle and phase of the sinusoidal wave data stream are set so as to coincide with the cycle and phase of the motor torque ripple to be corrected, and the amplitude thereof is set so that a motor torque generated by the sinusoidal wave data stream has an amplitude equal to that of the motor torque ripple components.

Furthermore, as described above, the adder 5b subtracts the torque ripple corrective signal from the motor control signal, correcting the motor control signal. As a result, the motor torque ripple of the polyphase brushless motor 1 is corrected.

The sinusoidal wave data is found as follows. Assume that, for example, the number of the rotor magnetic pole position pulses per one rotation of the motor is 8, the number of the rotational pulses per one rotation is 360, and the cycle of the motor torque ripple component to be corrected is identical with the rotor magnetic pole position pulse cycle. In this case, the number of the rotational pulses per one cycle of the rotor magnetic pole position pulses is 45 (=360/8), and the rotational angle information c is a set of integers ranging from 0 to 44. Therefore, the sinusoidal data stream is arranged such that access addresses of 0 to 44 correspond to one cycle of the sinusoidal wave data stream, and the sinusoidal wave data stream has an amplitude equal to that of the motor torque, while has the same phase as that of the motor torque ripple.

Here, a desirable relationship between the number m of pulses of the rotational pulse signal per one rotation of the motor and the number n of pulses of the rotor magnetic pole position pulse signal per one rotation of the motor will be explained below, with reference to a waveform chart of the both pulses shown in FIG. 4.

Figure 4:
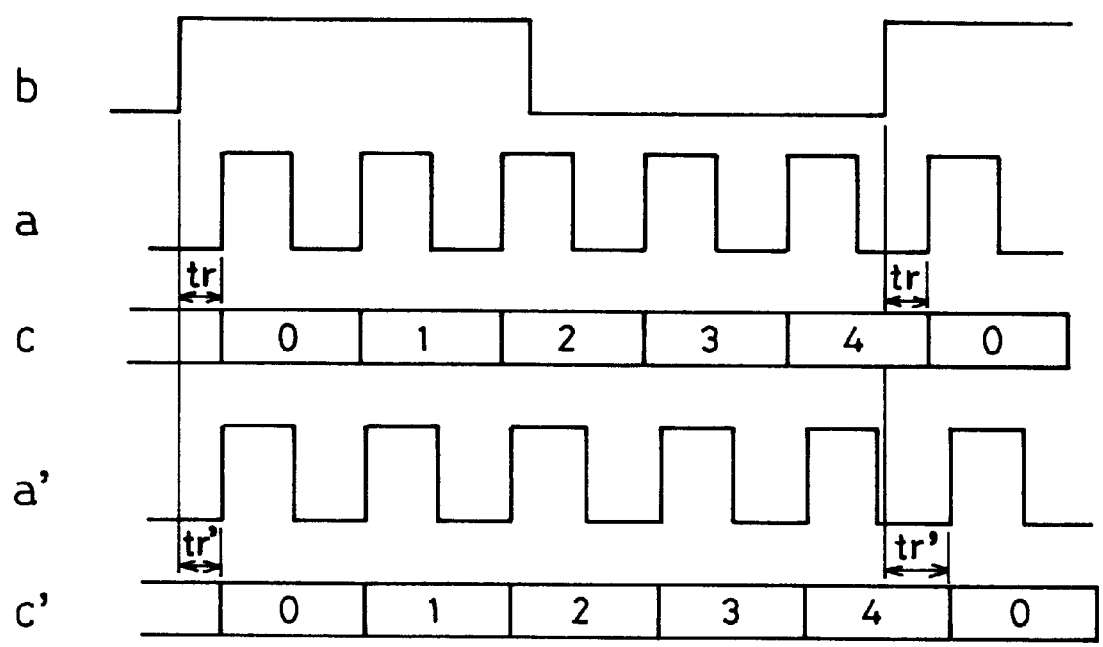
FIG. 4 is a signal waveform chart in the embodiments of the present invention.

As for the rotor magnetic pole position pulse signal b shown in the signal waveform chart as to the present embodiment in FIG. 4, for example, a south pole as a driving magnetic pole is detected at a high level, while a north pole as the driving magnetic pole is detected at a low level. On the other hand, the rotational pulse signal a' or a is determined by detecting a magnetic pattern formed on a circumference of the rotor with the use of the rotation detecting sensor 2 such as an MR sensor, and shaping it into a pulse signal with the use of the waveform shaping circuit 3a.

Here, the waveform a' in FIG. 4 is a waveform of a rotational pulse signal which has m pulses per one rotation of the motor, m being not an integral multiple of n which is the number of pulses of the rotor magnetic pole position pulse signal b per one rotation of the motor. On the other hand, the waveform a in FIG. 4 is a waveform of a rotational pulse signal which has m pulses per one rotation of the motor, m being an integral multiple of n which is the number of pulses of the rotor magnetic pole position pulse signal b per one rotation of the motor.

In the case of the rotational pulse signal waveform a' in FIG. 4, the rotational angle information c' in FIG. 4 is detected by the rotational angle detector 9, and a time interval tr' from a leading edge of the rotor magnetic pole position pulse signal b to a resetting timing of the rotational angle information c' to 0 varies as to each edge. Therefore, the timing to output the torque ripple corrective signal which is recalled in accordance with the rotational angle information c' also varies as to each cycle of switching the excitation of the motor coils. As a result, it is impossible to obtain the same corrective effects constantly with respect to the motor torque ripple generated in synchronization with the excitation switching cycles, and the corrective effects in the excitation switching cycles differ from each other. Therefore, the rotational pulse signal waveform a' cannot be utilized when accurate correction is intended.

Furthermore, in the case where the number m of the pulses of the rotational pulse signal a' per one rotation of the motor greatly differs from the integral multiple of the number n of the pulses of the rotor magnetic pole position pulse signal b per one rotation of the motor, the count of the rotational angle information c' varies at each excitation switching cycle, and to produce an accurate sinusoidal wave data becomes impossible.

In contrast, in the case of the rotational pulse signal waveform a shown in FIG. 4, the rotational angle information c detected by the rotational angle detector 9 is formed as shown in FIG. 4, and the time interval tr from a leading edge of the rotor magnetic pole position pulse signal b to a resetting timing of the rotational angle information c to 0 has a set length all the time. Therefore, the sinusoidal wave data recalled in response to the rotational angle information c, i.e., the torque ripple corrective signals, are outputted at substantially constant time intervals at all the excitation switching cycles. Besides, every excitation switching cycle corresponds to substantially the same counts of the rotational angle information c. For example, by using the aforementioned concrete numerals, the rotational angle information c is an integer falling in a range from 0 to 44 all the time. As a result, the motor torque ripple generated in synchronization with the excitation switching cycles can be surely corrected.

Thus, the number m of the pulses of the rotational pulse signal a per one rotation of the motor is preferably set to an integral multiple of the number n of the pulses of the rotor magnetic pole position pulse signal b per one rotation of the motor. By doing so, the torque ripple corrective signal with the same phase as that of the motor torque ripple can be outputted all the time.

As has been described so far, the present embodiment is made in light of that the cycles of the motor torque ripple components are in synchronization with an integral multiple of the motor coil excitation switching cycle, that is, an integral multiple of the driving magnetic pole shifting cycle, and the phase and amplitude are determined depending on the rotational angle of the motor. In the present embodiment, therefore, the motor torque ripple is corrected and eliminated as follows. The sinusoidal wave data stream which has the same phase as that of the motor torque ripple components, and has the same amplitude, when converted to motor torque, as the amplitude of the motor torque ripple, is stored in the torque ripple corrective memory 10. The rotor magnetic pole position pulse signal b indicating the driving magnetic pole positions is used as a reset signal, and the count of the rotational angle information c increases in synchronization with the rotational pulse signal a, the number of whose pulses is greater than that of the rotor magnetic pole position pulse signal b and is proportional to the number of rotations. Then, a sinusoidal wave data corresponding to the rotational angle information c is recalled as the torque ripple corrective signal, and by driving the motor in accordance with the torque ripple corrective signal, the motor torque ripple is corrected and eliminated.

In the present embodiment, the driving magnetic pole positions in synchronization with the cycle and phase of the motor torque ripple are used as reference of the rotational angle. Since the frequency components and amplitude of the motor torque ripple do not vary with motors, a sinusoidal wave data stream for correcting the motor torque ripple may be found as to one motor, and the same sinusoidal wave data may be applied to another apparatus incorporating a motor of the same type, resulting in that motor torque ripple of the motor can be easily corrected only by outputting the sinusoidal wave data in accordance with the motor rotational angle information.

As a result, operations for measuring the sinusoidal wave data stream as to each motor become unnecessary. Therefore, without troublesome operations for setting the sinusoidal wave data stream, the motor rotational speed can be controlled with stability and high precision.

Here, in the arrangement in accordance with the first embodiment of the present invention, as shown in FIG. 1, the position detecting sensor 8 for the exclusive use is provided, but the motor speed control device may be differently arranged as described below. The following arrangement wherein the position detecting sensor 8 is omitted is more effective.

Figure 2:
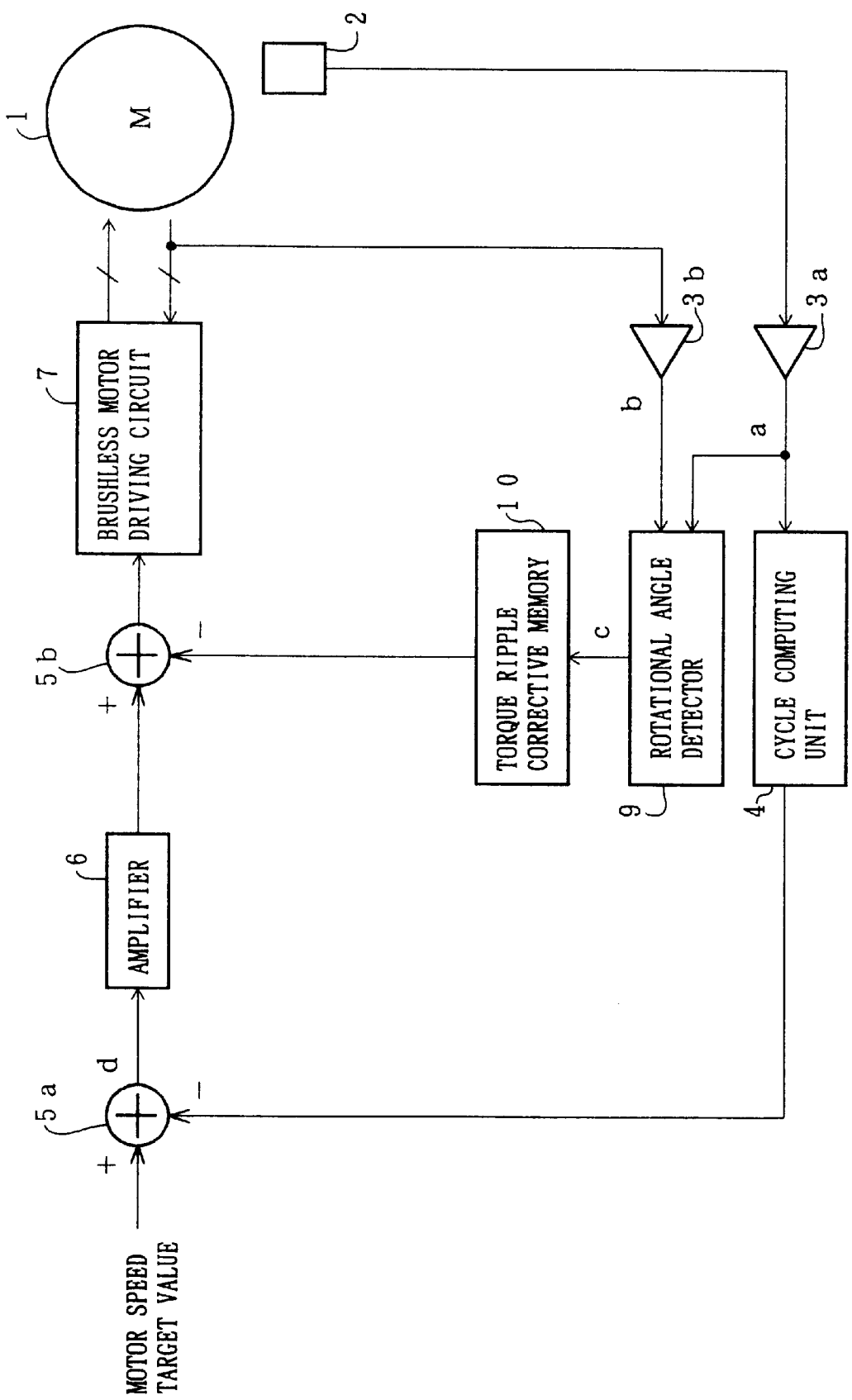
FIG. 2 is a view illustrating an arrangement in accordance with a second embodiment of the present invention.

FIG. 2 is a view illustrating an arrangement in accordance with the second embodiment of the present invention. The members having the same structure (function) as those in the first embodiment will be designated by the same reference numerals and their description will be omitted.

In the arrangement shown in FIG. 2, the position detecting sensor 8 for the exclusive use for obtaining the rotor magnetic pole position pulse signal b is not provided, but an output signal from a sensor such as the Hall sensor used for detecting the motor coil excitation switching timing is used.

With this arrangement of the second embodiment of the present invention, the same effect as that of the first embodiment can be obtained with a reduced circuitry scale, and consequently the device in accordance with the second embodiment is more effective.

Note that the brushless motor driving circuit 7 usually uses a pulse signal which has a reshaped waveform, to detect the excitation switching timing (hereinafter referred to as excitation switching timing detection signal). Therefore, by using the signal after waveform shaping, the arrangement of the second embodiment produces an advantage in that the waveform shaping circuit 3b is omitted, thereby further reducing the circuitry scale.

Besides, usually the same number of the excitation switching timing detection signals as the motor phases are utilized, but, for the above purpose, only one among them or a combination of some of them may be used.

Figure 3:
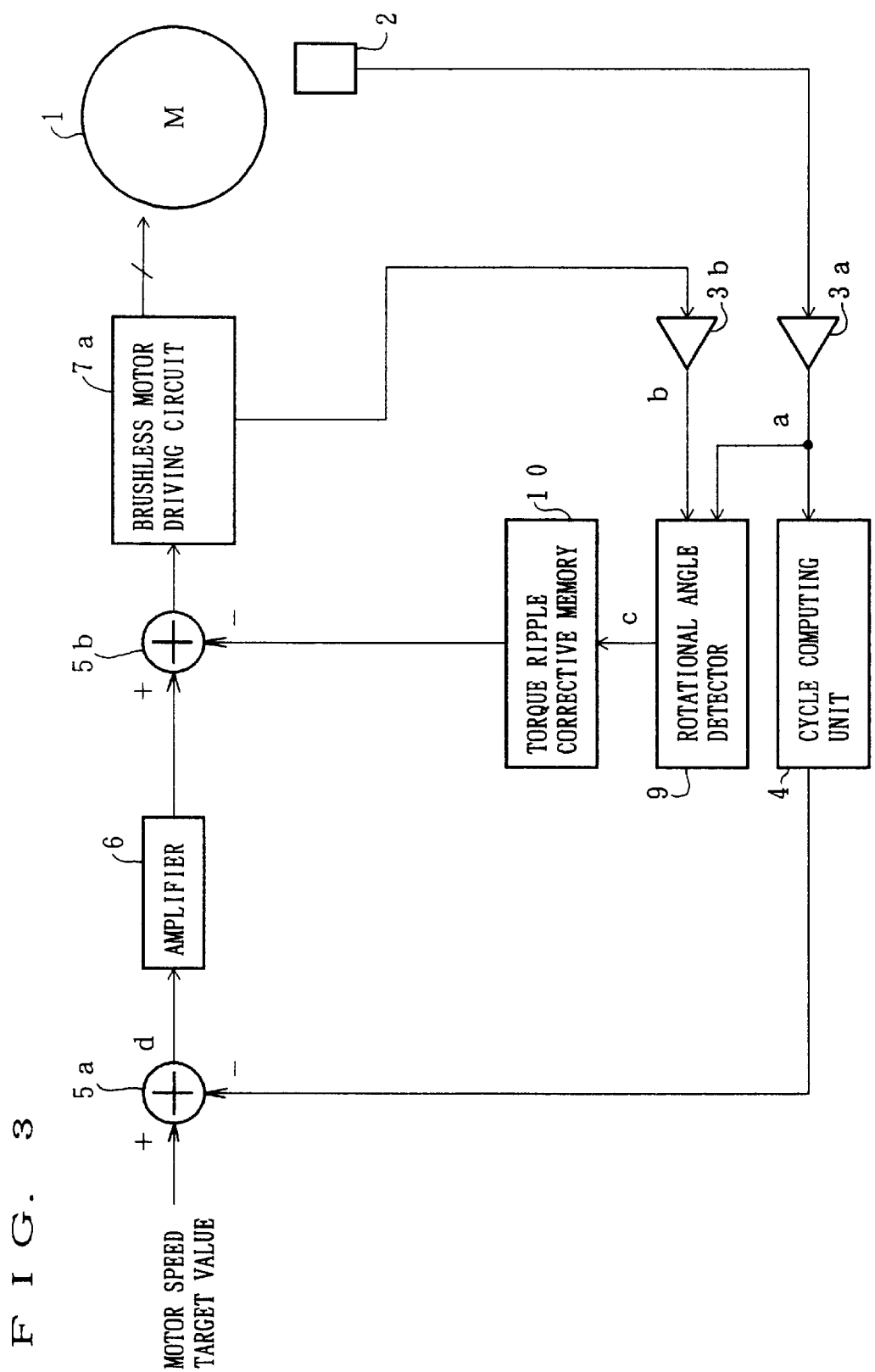
FIG. 3 is a view illustrating an arrangement in accordance with a third embodiment of the present invention.

FIG. 3 is a view illustrating an arrangement in accordance with a third embodiment of the present invention, wherein the position detecting sensor 8 for the exclusive use is omitted. The members having the same structure (function) as those in the first embodiment will be designated by the same reference numerals and their description will be omitted.

In the arrangement of FIG. 3, the position detecting sensor 8 for the exclusive use is not provided as means for determining the rotor magnetic pole position pulse signal b, but a back electromotive voltage is used, which is generated in the motor coils when the rotor magnetic pole positions shift as the motor rotates.

To drive the polyphase brushless motor 1, it is necessary to detect the driving magnetic pole positions and switch the excitation with respect to the motor coils at timings in synchronization with the shift of the driving magnetic pole positions. As a method for detecting the driving magnetic pole positions, there has been proposed a method wherein the back electromotive voltage generated in the motor coil terminals is used. When each motor coil terminal is not excited, the back electromotive voltage is being generated at the motor coil terminals, accompanying the shift of the driving magnetic pole positions, and the driving magnetic pole positions can be detected with the use of the back electromotive voltage generated in each motor coil terminal. Generally, such a driving method is called as sensorless driving.

Therefore, by determining the rotor magnetic pole position pulse signal b with the use of the driving magnetic pole position information thus found by the sensorless brushless motor driving circuit 7a, the same effect as that of the second embodiment can be achieved with circuitry of a smaller scale. Thus, the device of the third embodiment is further effective.

As has been described, with any one of the first through third embodiments, fluctuation of the motor rotational speed due to a ripple of a motor torque at every motor coil excitation switching cycle, that is, a motor torque ripple, can be surely corrected and eliminated. By doing so, stable and accurate control is realized with respect to the motor rotational speed. The circuitry scale does not expand, in the case where the present invention is realized by improving software, with the use of, for example, a microcomputer.

Furthermore, with the arrangement of either the second or third embodiment, there is no need to provide specific means for detecting the motor magnetic pole positions. Therefore, a decrease in manufacturing costs and reduction of the circuitry scale can be achieved.

Here, the sinusoidal wave data stream may be set so as to have the same cycle of that of the motor torque ripple component and its phase is determined depending on the driving magnetic pole positions, as shown in the description on the first through third embodiments. Therefore, it is easy to determine the sinusoidal wave data stream. One method for finding the amplitude is explained as follows. The motor is driven by using the device of the present arrangement, and fluctuation of the motor torque or fluctuation of the motor rotational speed is observed by a fast Fourier transform (FFT) analyzer. Among components of the motor torque ripple, a component to be corrected is focused, and the amplitude of the sinusoidal wave data stream is gradually varied so that the amplitude which makes the component smallest is found. This method is direct and simple. However, another method is applicable, such as: a method wherein the desirable amplitude is found by measuring the motor torque ripple appearing in the motor control signal; or a method wherein the desirable amplitude is found by computing an amplitude of the motor torque ripple and subtracting transfer functions of the brushless motor driving circuit 7 and the polyphase brushless motor 1 from the amplitude thus found of the motor torque ripple, as is the case with the fourth through eleventh embodiments which will be described later.

Furthermore, since the present invention is arranged so that the torque ripple corrective signal is subtracted from the motor control signal, only the components which should be corrected are surely eliminated, among the torque ripple components which can be approximately expressed in addition formulas as transfer functions. The following description will explain this matter in more detail. Fourier expansion of the motor torque ripple is expressed as:

$$A_1 \sin(\omega t+\theta_1)+A_2 \sin(\omega t+\theta_2)+A_3 \sin(\omega t+\theta_3)+ \ldots +A_n \sin(\omega t+\theta_n) \quad (1)$$

Note that ωt is a value corresponding to the excitation switching cycle. In the case of the first embodiment of the present invention, to correct the second term of the expression (1), the torque ripple corrective signal, when converted to motor torque, is expressed as:

$$A_2 \sin(\omega t+\theta_2) \quad (2)$$

Since the correction is made by subtraction, the motor torque ripple after the correction is as follows:

$$A_1 \sin(\omega t+\theta_1)+A_2 \sin(\omega t+\theta_2)+A_3 \sin(\omega t+\theta_3)+ \ldots +A_n \sin(\omega t+\theta_n)-A_2 \sin(\omega t+\theta_2)=A_1 \sin(\omega t+\theta_1)+A_3 \sin(\omega t+\theta_3)+ \ldots +A_n \sin(\omega t+\theta_n) \quad (3)$$

Thus, only the component to be corrected is surely corrected.

Note that the above expression (2) expresses a value of the torque ripple corrective signal which, after being inputted to the brushless motor driving circuit 7, appears as a motor torque. It is a value of the torque ripple corrective signal multiplied by the transfer function of the brushless motor driving circuit 7 and the motor 1, that is, the conversion constant from the torque ripple corrective signal to the motor torque.

On the other hand, for example, in the case of the method wherein the torque ripple corrective signal is used for controlling amplification of the motor control signal, the torque ripple corrective signal, when converted to motor torque, is expressed as:

$$1/A_2 \sin(\omega t+\theta_2) \quad (4)$$

Since the multiplication is conducted by using the above expression, the motor torque ripple after the correction is as follows:

$$\{A_1 \sin(\omega t+\theta_1)+A_2 \sin(\omega t+\theta_2)+ \ldots +A_n \sin(\omega t+\theta_n)\}/A_2 \sin(\omega t+\theta_2) \quad (5)$$

Therefore, the torque ripple corrective signal affects the other components. This reverse influence is great particularly when only one component is corrected.

Incidentally, in the case where the motor torque ripple appearing in the motor control signal can be directly measured, the sinusoidal wave data stream to be stored in the torque ripple corrective memory 10 can be directly found from the motor control signal. On the other hand, in the case where the sinusoidal wave data stream is found by measuring a motor torque ripple appearing not in the motor control signal but in another signal such as the speed error signal d or the output torque of the polyphase brushless motor 1, it is necessary to divide the measured motor torque ripple by a transfer function from a point of subtraction thereof to a point of the measurement, in order to determine the sinusoidal wave data stream.

Here, in the case where a transfer function of the brushless motor driving circuit 7 and the polyphase brushless motor 1 can be approximated by one component, the motor torque ripply may be simply divided by the transfer function. Therefore, the case where the transfer function is expressed by a plurality of components will be described below in detail.

A transfer function of the polyphase brushless motor 1 is taken as example of the transfer function used for the division. The torque transfer function of the polyphase brushless motor 1 is expressed with a plurality of components as follows:

$$A_a+A_1 \sin(\omega t+\theta_1) \quad (6)$$

This is a torque transfer function found in the case where magnetic flux density varies, and an output torque is a product of a motor current I and the torque transfer function, which is expressed as:

$$I \times \{A_a+A_1 \sin(\omega t+\theta_1)\}=T_a+T_1 \sin(\omega t+\theta_1) \quad (7)$$

Clear from the above expression, a motor torque ripple $T_1 \sin(\omega t+\theta_1)$ occurs in this case. The present invention is intended to eliminate only the motor torque ripple $T_1 \sin(\omega t+\theta_1)$ from the output torque expressed by the expression (7) above, $T_a+T_1 \sin(\omega t+\theta_1)$. Therefore, the motor current I of the expression (7) may be processed as follows:

$$I \times [1-A_1 \sin(\omega t+\theta_1)/\{A_a+A_1 \sin(\omega t+\theta_1)\}] \qquad (8)$$

By doing so, with the expressions (7) and (8), the output torque becomes only $T_a$. Thus, only the motor torque ripple is surely eliminated.

In the expression (8), $-A_1 \sin(\omega t+\theta_1)/\{A_a+A_1 \sin(\omega t+\theta_1)\}$ represents the torque ripple corrective signal, and the minus sign signifies that it is subtracted from the motor control signal. Thus, $A_1 \sin(\omega t+\theta_1)$ is divided by the torque transfer function at the polyphase brushless motor 1 expressed by the expression (6), as described above, and is stored as the sinusoidal wave data in the torque ripple corrective memory 10. In this case, strictly speaking, it is necessary to vary the torque ripple corrective signal in accordance with the rotational control signal. However, since the number of the motor rotations does not greatly vary in the case where the motor control is performed, the rotational control signal by no means greatly changes, and this rarely arises as a big problem. Besides, in the case where the number of the motor rotations is varied, sinusoidal wave data streams may be prepared so as to correspond to the variations, and one sinusoidal wave data stream corresponding the number of the motor rotations may be selected.

The following description will explain repetition of the sinusoidal wave data stream per one rotation of the motor.

FIG. 5 shows driving coil patterns and driving magnetic pole patterns of the three-phase brushless motor having 6 coils and 8 poles as an example of the polyphase brushless motor 1 used in the present embodiment.

As described above, the motor torque ripple occurs due to inconsistency in exciting current at switching of excitation with respect to the motor driving coils, or heterogeneity in magnetic flux density at a point of the switching of the driving magnetic poles. According to Fourier transformation of the motor torque ripple, usually, one fluctuation component, the number of times of whose appearance per one rotation of the motor is a least common multiple of the number of the coils and the number of the rotor magnetic poles, occurs more greatly than the others. In addition, another fluctuation component, the number of times of whose appearance per one rotation is an integral multiple of the number of the rotor magnetic poles, also occurs. For example, in the case of the three-phase brushless motor with 6 driving coils and 8 driving magnetic poles, as illustrated in FIG. 5, a speed fluctuation component at a great degree occurs 24 times per one rotation of the motor.

Therefore, directing attention to this point, it will be effective that a data stream stored as the sinusoidal wave data stream in the torque ripple corrective memory 10 is set so that the number of repetition of the data stream per one rotation is set to a least common multiple of the number of coils and the number of the rotor magnetic poles.

The following description will explain this matter with concrete numerals. Assume that the three-phase brushless motor with 6 coils and 8 poles as shown in FIG. 5 is used, and the number of the rotor magnetic pole position pulses per one rotation of the motor is 8, while the number of the rotational pulses per one rotation of the motor is 360. In this case, the number of the rotational pulses per one cycle of the rotor magnetic pole position pulse b is 45 (=360/8), and accordingly, 45 data corresponding to the rotational angle information c, that is, access addresses, which are integers ranging from 0 to 44, are obtained. Besides, the sinusoidal wave data stream is repeated 24 times per one rotation of the motor, 24 being the least common multiple of the number of coils, 6, and the number of the magnetic poles, 8. One cycle of the repetition corresponds to 15 (=360/24) pulses. In other words, the sinusoidal wave data stream is arranged such that one cycle of the sinusoidal wave data stream corresponds to 15 times of access, and the sinusoidal wave data stream has the same amplitude, when converted to motor torque, as that of the motor torque ripple, while has the same phase as that of the motor torque ripple. Besides, during one cycle of the rotor magnetic pole position pulse b, the sinusoidal wave data stream is repeated three (=45/15) times. Therefore, a sinusoidal wave data stream such that one cycle thereof corresponds to 15 rotational pulses and three cycles thereof correspond to integers ranging from 0 to 44 as access addresses should be stored in the torque ripple corrective memory 10.

Thus, the motor torque ripple component is easily specified, thereby resulting in reduction of correcting operation time, automatization, and the like.

The following description will explain another example relating to the number of times the sinusoidal wave data stream is repeated per one rotation of the motor.

Figure 6:
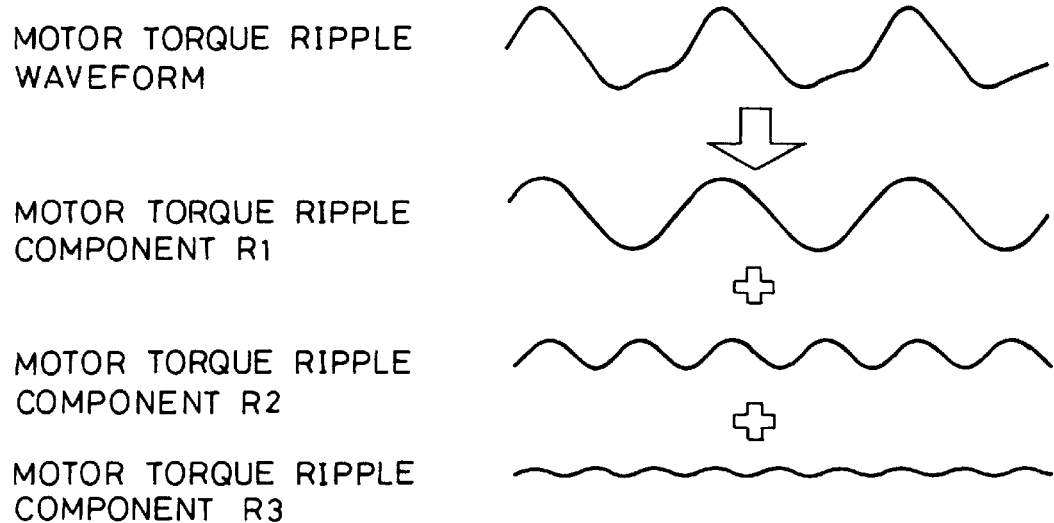
FIG. 6 is a waveform chart of a motor torque ripple in the embodiments of the present invention.

FIG. 6 is a waveform chart of the motor torque ripple.

The motor torque ripple usually results on synthesis of sinusoidal wave components, as shown in the expression (1) above. The motor torque ripple usually has a component which appears more greatly than the others, the number of times the component appears per one rotation of the motor being a least common multiple of the number of coils and the number of the rotor magnetic poles, but sometimes, as illustrated in FIG. 6, not only this component but also a plurality of other components, R1 and R2 in FIG. 6, greatly appear in some motors.

To correct and eliminate the plural motor torque ripple components, sinusoidal wave data streams corresponding to the components R1 and R2 respectively are found, and the plural sinusoidal wave data streams are synthesized. A resultant sinusoidal wave data stream is stored in the torque ripple corrective memory 10, so as to be used for correction.

By doing so, a plurality of motor torque ripples are surely corrected, only by finding sinusoidal wave data streams corresponding to them respectively, without expanding the scales of hardware and software.

Note that the plural components means components differing from each other in either cycle, phase, or amplitude.

The present invention is realized by improving software, with the use of, for example, a microcomputer, since it does not cause expansion of the circuitry scale, but it may be also realized by improving hardware. To do so in the latter manner, there is a method wherein the output of the torque ripple corrective memory 10 is subjected to A/D conversion, and the subsequent process is conducted with the use of analog signals. In this case, considering errors in quantization of the sinusoidal wave data stream, it is preferable that the sinusoidal wave data stream in the torque ripple corrective memory 10 is formed by fully using memory data bits so that a desirable amplitude is obtained at the A/D conversion.

Furthermore, in the first through third embodiments, the torque ripple corrective signal is subtracted after the process at the amplifier 6, but the present invention should not be limited to this, and the torque ripple corrective signal may be subtracted, for example, when the motor speed information is subtracted from the motor speed target value at the adder 5a. At the subtraction, a value found in consideration of the transfer function of the amplifier 6 may be used as the amplitude of the torque ripple corrective signal. Moreover, in the case where the amplitude is found by observation with the use of the FFT analyzer as described above, the torque ripple corrective signal can be adjusted so as to have a desirable amplitude, without considering the transfer function. Therefore, this method is easy.

To reversely rotate the motor, means for finding a rotational direction may be provided, and the rotational angle detector may be composed of an up-and-down counter or the like, so that for reverse rotation of the motor, the rotational angle information may be decreased in response to each pulse signal.

The following description will explain the fourth through seventh embodiments of the present invention, while referring to FIGS. 7 through 11.

The fourth through seventh embodiments are intended to automatically determine amplitude information of the torque ripple corrective signal from the speed error signal d, and they differ from the first through third embodiments in incorporating a torque ripple amplitude computing unit 11, a multiplier 12, and a corrective switch 13.

Figure 8:
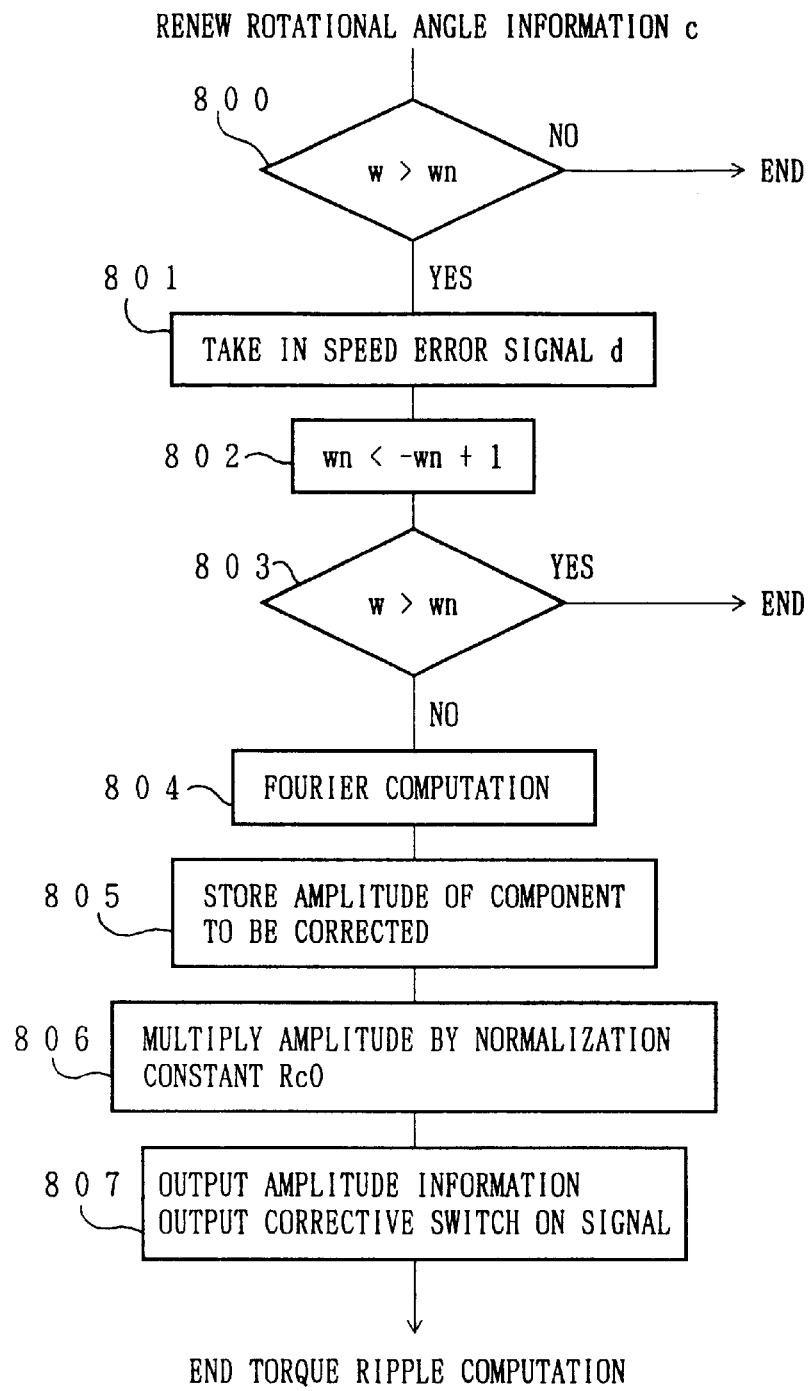
FIG. 8 is a flowchart of an operation in the fourth embodiment of the present invention.
Figure 9:
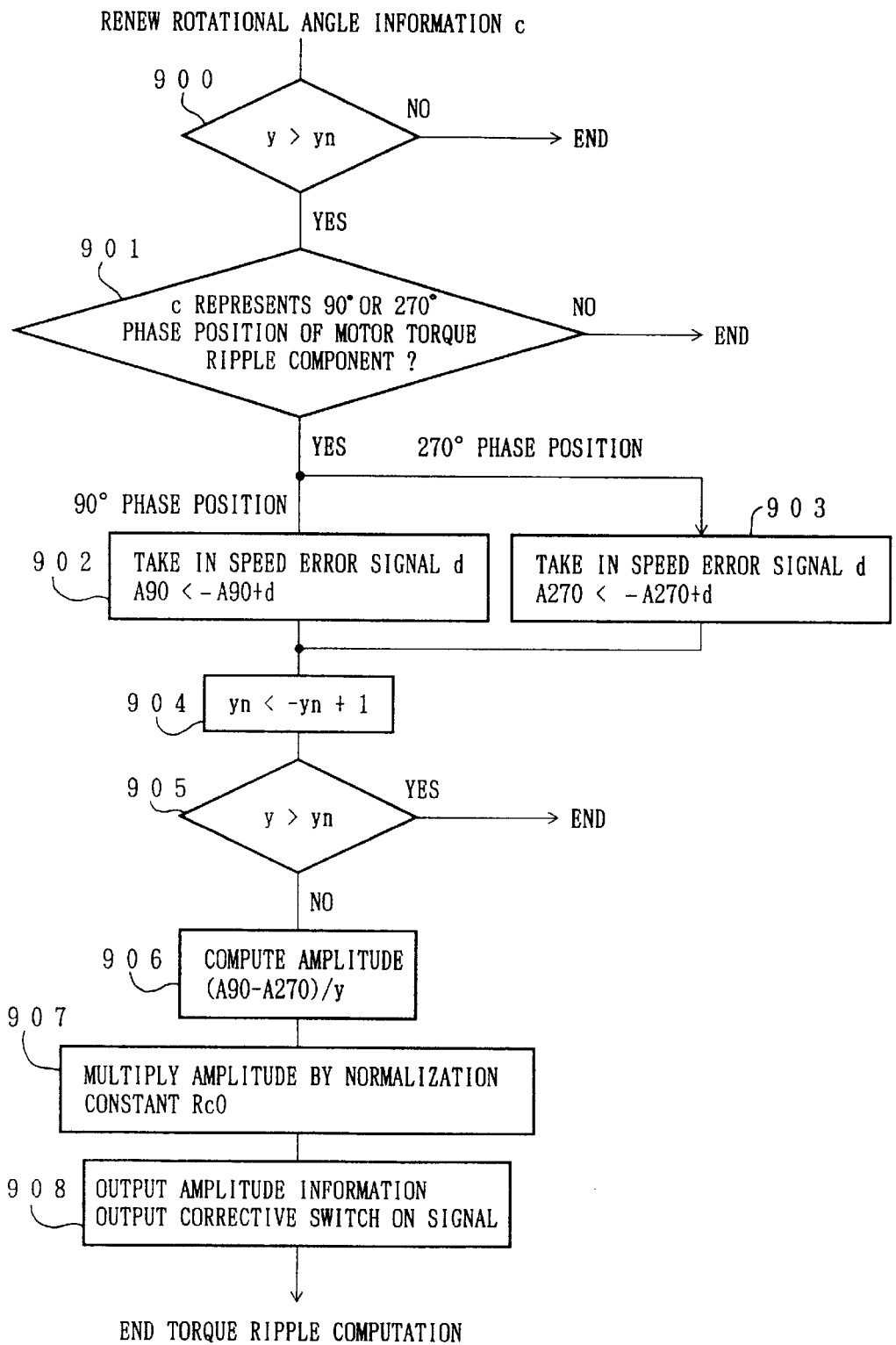
FIG. 9 is a flowchart of an operation in the fifth embodiment of the present invention.
Figure 10:
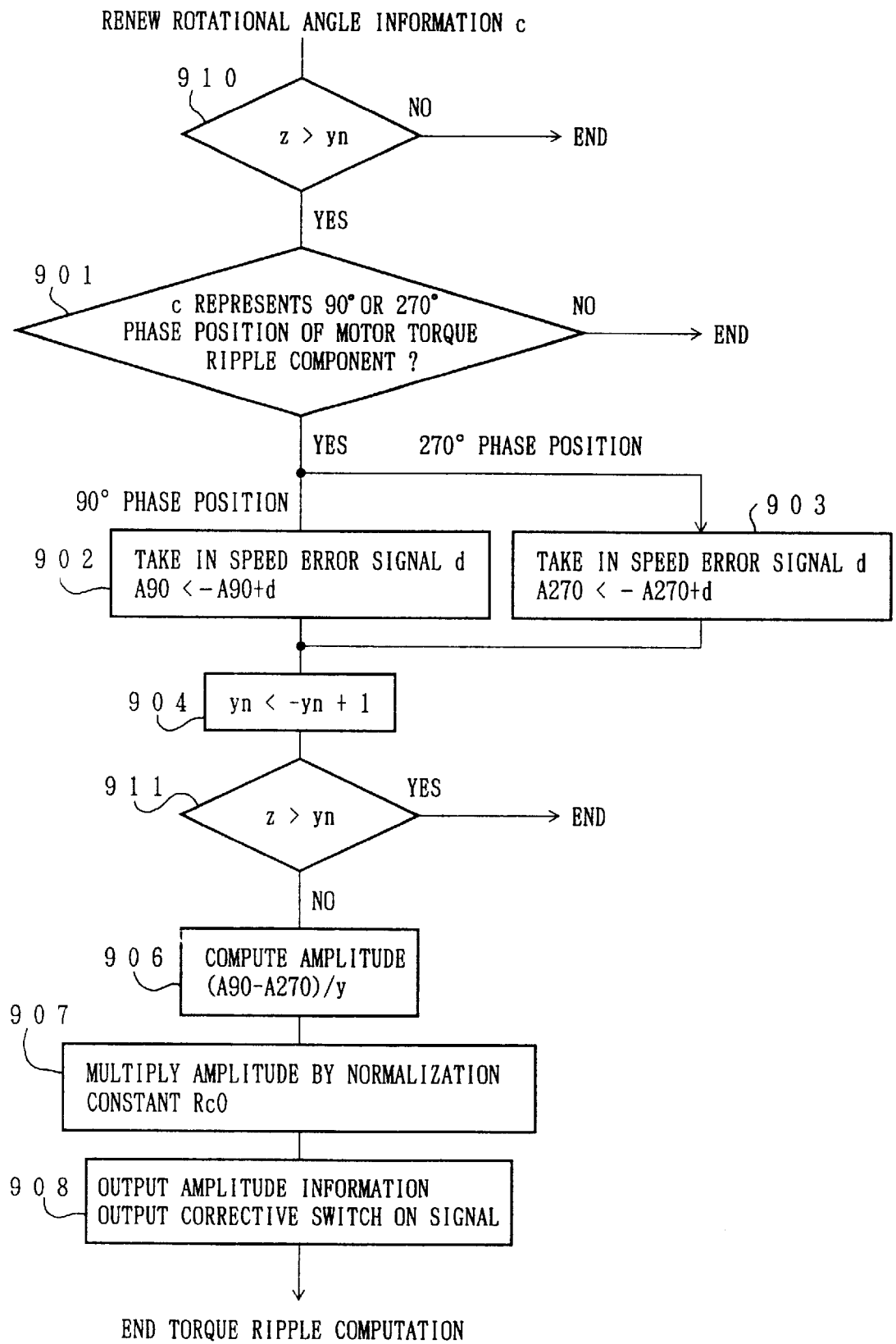
FIG. 10 is a flowchart of an operation in the sixth embodiment of the present invention.

The members having the same structure (function) as those in the first through third embodiments will be designated by the same reference numerals and their description will be omitted. FIGS. 8 through 10 are flowcharts showing process sequences. At the beginning of each process sequence, initialization of each variable and memory is carried out, but this initialization process is omitted in FIGS. 8 through 10.

Figure 7:
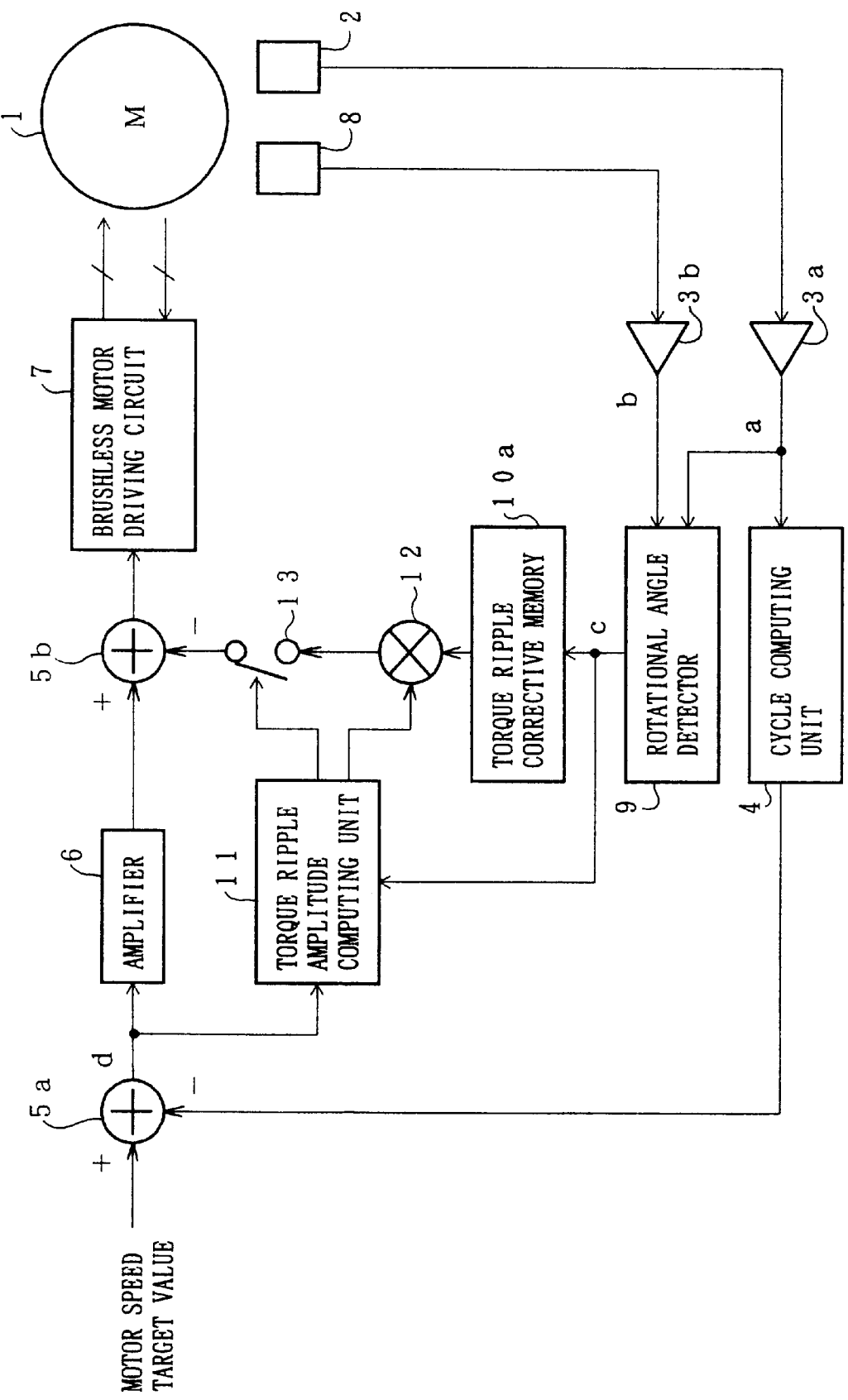
FIG. 7 is a view illustrating an arrangement in accordance with fourth through sixth embodiments of the present invention.

The following description will explain an arrangement of the fourth through sixth embodiments of the present invention, while referring to FIG. 7.

These embodiments are intended to realize the following: the speed error signal d is taken in so that the motor torque ripple component to be corrected is detected, and an amplitude of the motor torque ripple component is found so that from the amplitude, amplitude information of the torque ripple corrective signal is found, and thereafter, the amplitude information is multiplied by the sinusoidal wave data read out from the torque ripple corrective memory 10a so that the torque ripple corrective signal is obtained.

First of all, a sinusoidal wave data stream with a set amplitude is stored in the torque ripple corrective memory 10a. The multiplier 12 multiplies (1) a value which the torque ripple corrective memory 10a outputs in accordance with the rotational angle information c and (2) the amplitude information of the torque ripple amplitude computing unit 11 together, so as to output the torque ripple corrective signal for correcting the motor torque ripple. The corrective switch 13 is caused to shift to an ON state when the computation of the amplitude information in the torque ripple amplitude computing unit 11 finishes and the amplitude information is outputted, while it is caused to shift to an OFF state when the amplitude information has not been outputted.

The following description will explain the operation of the torque ripple amplitude computing unit 11.

FIG. 8 is a flowchart of an operation of the fourth embodiment of the present invention, which is performed at every renewal of the rotational angle information c. At a step 800, it is checked whether or not a speed error signal taking-in operation has been repeated a set number of times and amplitude information is computed. In the case where the computation is completed, subsequent steps are unnecessary. In the case where the computation is uncompleted, the flow goes to a step 801, where the speed error signal d is taken in. At a next step 802, a count of the counter wn which indicates how many times the taking-in operation has been done is increased by one. At a step 803, wn is compared with w in which the set desired number of times of the taking-in operation is stored, so that whether or not the number of times the taking-in operation has been done reaches the set number is checked. In the case where the number has not yet reached the set number, the subsequent steps are not performed, and at the next renewal of the rotational angle information c, the operation for taking in the speed error signal d is carried out. In the case where the number of times the taking-in operation has been done reaches the set number, a frequency component extracting process such as Fourier transformation is performed at a step 804 by using the data thus taken in. Then, at a step 805, a frequency component to be corrected are chosen among the frequency components extracted at the step 804, and a torque ripple speed fluctuation amplitude of the chosen component is stored. At a step 806, the amplitude is multiplied by a normalization constant Rc0 so that amplitude information for correcting the motor torque ripple is outputted. Thereafter, at a step 807, the amplitude information is outputted, and the flow ends, outputting a signal for causing the corrective switch 13 to shift to the ON state.

Here, the normalization constant Rc0 is a constant for determining the amplitude information, and is set to a value such that a multiple of the amplitude information and the amplitude value of the sinusoidal wave data stream stored in the torque ripple corrective memory 10a, when converted into motor torque, is equal to the amplitude of the motor torque ripple. An example method for finding the normalization constant is as follows. The motor is driven with the use of the device of the fourth embodiment of the present invention, and fluctuation of the motor torque or fluctuation of the motor rotational speed is observed by an FFT analyzer. Among components of the motor torque ripple, a component to be corrected is focused, and the amplitude of the sinusoidal wave data stream is gradually varied so that the amplitude which makes the component smallest is found. This method is direct and simple. However, another method is applicable. For example, as described above, the amplitude may be computed with the use of each transfer function of the elements such as the polyphase brushless motor.

Furthermore, from another viewpoint, another example method for finding the normalization constant Rc0 will be explained below. Since the speed error signal d represents the fluctuation of the motor speed, it contains a transfer function of each element such as the motor. Besides, in most cases, the motor torque ripple components appear in the speed error signal d, without attenuation or phase difference. As a result, in the case where no motor torque ripple appears in the speed error signal d, it can be judged that the torque ripple component has been corrected. Therefore, the motor torque ripple component is corrected by preliminarily adding, as the torque ripple corrective signal, a signal identical to the motor torque ripple component appearing in the speed error signal d.

In this case, a point at which the torque ripple corrective signal is added is behind the adder 6. Therefore, the amplitude of the torque ripple corrective signal to be added may be set equal to the amplitude of the torque ripple component contained in the speed error signal d after passing through the amplifier 6. Note that in setting the normalization constant Rc0, a degree of amplification at the amplifier 6 and values of the sinusoidal wave data stream stored in the torque ripple corrective memory should be considered, and since both the values are set by the control unit per se, the control unit is able to determine the values without difficulties. Note that in the case where a band restriction term for, for example, phase compensation, is included in the transfer function of the amplifier 6, only an actual degree of amplification after omitting the band restriction term is taken into consideration, when the normalization constant Rc0 is set.

The amplitude information as an output of the torque ripple amplitude computing unit 11 and the output of the torque ripple corrective memory 10a are multiplied together by the multiplier 12, and as a result, the torque ripple corrective signal is outputted. Then, the torque ripple corrective signal is subtracted from the motor control signal at the adder 5b, and the correction is completed.

Then, the following description will explain the fifth embodiment of the present invention, while referring to FIG. 9.

FIG. 9 is a flowchart of an operation sequence in the fifth embodiment of the present invention. At the beginning of the flow of the process sequence, initialization of each variable and memory is carried out, but this initialization process is omitted in FIG. 9.

The fifth embodiment of the present invention relates to an operation by the torque ripple amplitude computing unit 11 of the arrangement shown in FIG. 7. The fifth embodiment is intended to exemplify a method as follows. Speed error signals corresponding to a maximum amplitude and a minimum amplitude of the torque ripple corrective signal respectively are taken in y times (y is an integer satisfying y>1) and are integrated respectively. Mean values of the resultant values are found so as to determine an amplitude, then, amplitude information is found from the amplitude thus found. The sinusoidal wave data read out from the torque ripple corrective memory and the amplitude information thus found are multiplied together, so that the torque ripple corrective signal is determined.

The following description will explain the operation process in the fifth embodiment of the present invention.

FIG. 9 shows the process at the torque ripple amplitude computing unit 11, which is performed, for example, at every renewal of the rotation angle information c. At a step 900 it is checked whether or not the speed error signal has been taken in a set number of times and the amplitude information has been already computed. In the case where the computation has been completed, the subsequent steps are unnecessary. In the case where the computation has not yet been completed, the flow goes to a step 901, where it is judged which the current rotational angle information c represents, either a maximum amplitude position or a minimum amplitude position of the sinusoidal wave data stream stored in the torque ripple corrective memory 10a, that is, a position at which appears a speed fluctuation which corresponds to either a 90° phase position or a 270° phase position when the sinusoidal wave data stream is converted into a sinusoidal wave. To identify the position, a motor torque-motor speed transfer function with respect to a frequency of the sinusoidal wave data stream and a transfer function at detection of the speed error signal may be considered.

In the case where the rotational angle information c represents neither of them, the current process ends, and the operation is left in a stand-by state until the next renewal of the rotational angle information c. In the case where it represents either of them, subsequent steps depend on which it represents, the 90° phase position or the 270° phase position. In the case where the rotational angle information c represents the 90° phase position, the flow goes to a step 902, where the speed error signal d is added to a variable A90 and is taken in. On the other hand, in the case where it represents the 270° phase position, the flow goes to a step 903, where the speed error signal d is added to a variable A270 and is taken in. Then, at a step 904, a count yn of a taking-in counter is increased by 1.

At a step 905, whether or not the taking-in step has been already carried out the set number of times, that is, y times, is checked, and in the case where the result of the check is negative, the current process is ended, and the operation is left in a stand-by state until the next renewal of the rotational angle information c. In the case where the result of the check is affirmative, an amplitude A is computed at a step 906. This step is aimed to compute respective mean values by using the integrated values of the speed error signals, and find the speed error signal by subtraction with respect to the mean values. Note that in the above case the amplitude A is computed by first computing mean values by individually averaging the speed error signal integrated values at the above positions and thereafter subtracting one mean value from the other, but needless to say, the calculation process should not be limited to this. Any other process is applicable as long as the same calculation result is obtained. For example, a difference between values of the speed error signal d at the above two positions may be calculated at every taking-in operation with respect to the speed error signals d, and thereafter the amplitude A may be found from a mean value of these differences. By doing so, the same effect can be achieved.

At a step 907, the amplitude A is multiplied by the normalization constant Rc0, and at a step 908, amplitude information as a result of the multiplication is outputted, while a signal for causing the corrective switch 13 to shift to the ON state is outputted. Note that a method for finding the normalization constant Rc0 may be the same as that in the fourth embodiment of the present invention.

The amplitude information as an output of the torque ripple amplitude computing unit 11 and an output of the torque ripple corrective memory 10a are multiplied together by the multiplier 12, and as a result a torque ripple corrective signal is outputted. The torque ripple corrective signal is subtracted from the motor control signal at the adder 5b. Thus, correction is performed.

As has been described, in the fifth embodiment, the amplitude of the torque ripple corrective signal is automatically adjusted so as to become optimal. Therefore, time for adjustment is saved and a motor toque ripple is surely corrected as to each motor, while the operation of the torque ripple amplitude computing unit 11 is simplified since the amplitude is calculated by simple steps, such as addition and averaging. The calculation by this method is preferably carried out immediately after the motor rotation starts. Correction cannot be carried out during this calculation time, but only with respect to several rotations of the motor. Therefore, this causes little influence. Moreover, in the case where the calculation is carried out when an individual device is manufactured and only the output of the amplitude information already calculated is carried out when the device is put in use, the effect can be achieved immediately after the rotation starts.

The following description will explain the sixth embodiment of the present invention.

FIG. 10 is a flowchart of an operation sequence in the sixth embodiment of the present invention. At the beginning of the flow of the process sequence, initialization of each of the variable and memory is carried out, but this initialization process is omitted in FIG. 10. The members having the same structure (function) as those in the fifth embodiment will be designated by the same reference numerals and their description will be omitted.

The sixth embodiment of the present invention relates to an operation by the torque ripple amplitude computing unit 11 of the arrangement shown in FIG. 7. Compared with the fifth embodiment, the steps 900 and 905 thereof in FIG. 9 are different from corresponding steps of the present embodiment.

Usually, in the motor torque ripple, a component, the number of times of whose appearance is an integral multiple of the coil excitation switching cycle, occurs more greatly than the others, and the cycle of the sinusoidal wave data stream is also set equal to the cycle of this component. However, due to decentricity and deflection of the motor, other motor torque ripple components, the numbers of times of whose appearance are integral multiples of the motor rotation, respectively, also occur. Therefore, to find amplitude information of the motor torque ripple from the mean value of the speed error signal d, more precise amplitude can be found by using speed error information for integral-multiple rotations of the motor.

In the sixth embodiment of the present invention, the number of times the operation for taking in the speed error signal d is carried out per one rotation of the motor is set to an integral multiple of the number of times an operation for totalizing the taken-in values of the speed error signal d is carried out. Therefore, a value z, which is, in steps 910 and 911 in FIG. 10, compared with the number of times the taking-in operation is carried out, is set to an integral multiple of the number of times the integrating operation is carried out per one rotation of the motor.

Therefore, the number of times of the taking-in operation is an integral multiple of the number of rotations of the motor, and it becomes possible to calculate amplitude information with precision, which is not affected by the motor decentricity, deflection, or the like.

Note that the method of the sixth embodiment of the present invention is applicable to the fourth embodiment of the present invention, and in this case, the value w in FIG. 8 may be set to an integral multiple of the number of times of renewal of the rotational angle information per one rotation of the motor.

The following description will explain the seventh embodiment of the present invention.

Figure 11:
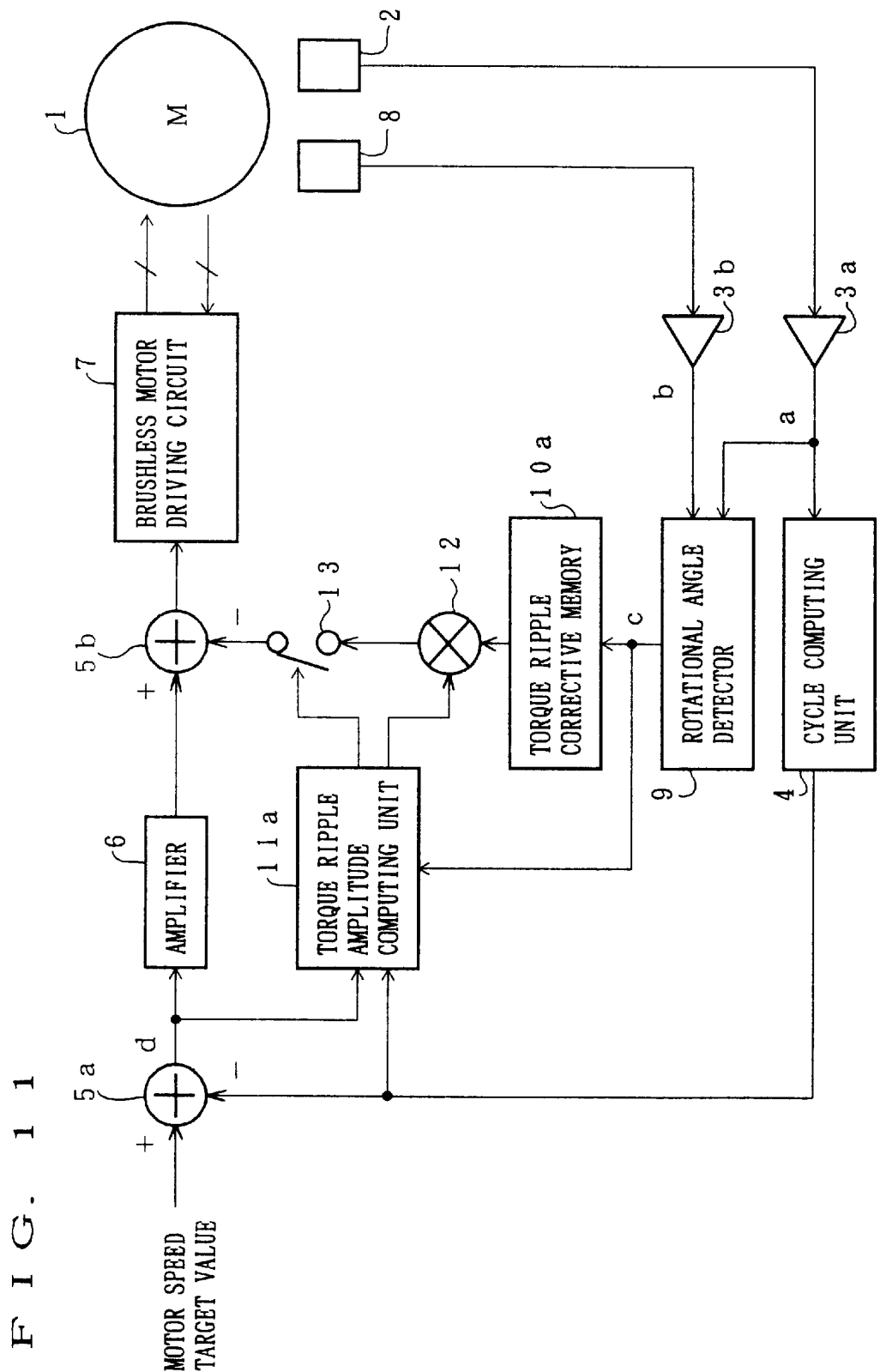
FIG. 11 is a view illustrating an arrangement in accordance with a seventh embodiment of the present invention.

FIG. 11 is a view illustrating an arrangement in accordance with the seventh embodiment of the present invention. The members having the same structure (function) as those in the above-mentioned embodiments will be designated by the same reference numerals and their description will be omitted.

As compared with the arrangements of the fourth through sixth embodiments, the arrangement of the seventh embodiment is characterized by extended functions of the torque ripple amplitude computing unit 11.

Usually, the following transfer function is established between the motor torque ripple and the speed error signal d. First of all, a transfer function related to a moment of inertia and a viscous resistance of the motor is established between the motor torque ripple and the motor rotational speed, and a transfer function stemming from a rotational pulse signal cycle and an error computing time is established between the motor rotational speed and the speed error signal d. The transfer functions as above use frequencies as parameters. Therefore, it is necessary to set the normalization constant Rc0 to a value found in consideration of the above transfer functions which are found from the frequency of the motor torque ripple. One of methods to do so is a method utilizing the FFT analyzer.

Here, the frequency of the component to be corrected depends on the motor speed, and the method applied to the fourth through sixth embodiments is sufficiently suitable in the case where the motor rotational speed is not varied. However, in the case where the motor rotational speed is varied when the motor is put in use, it is necessary to vary the normalization constant Rc0 in consideration of the transfer function between the motor torque ripple and the speed error signal d.

For this reason, in the seventh embodiment of the present invention, the motor speed information which is an output of the cycle computing unit 4 is also supplied to a torque ripple amplitude computing unit 11a, and the normalization constant Rc0 is calculated, in consideration of the transfer function, according to a mean speed information found by averaging the motor speed information. Therefore, since the amplitude information of the motor torque ripple is found in this manner, this method is very effective particularly in the case where the motor rotational speed is varied.

Note that concerning the normalization constant, an optimal value as to each mean speed information may be preliminarily found by observation by the use of the FFT analyzer or the like, and a normalization constant Rc0 suitable to a current mean speed information may be selected and used. In practice, for example, by storing each normalization constant Rc0 and recalling a normalization constant Rc0 suitable for current mean speed information, the calculation process can be omitted and calculation delay due to the calculating time can be eliminated. Besides, by expressing each normalization constant Rc0 in a simple expression related to the mean speed information and performing the calculation based on the expressions, the calculating process is minimized.

Note that in the above embodiments, subtraction of the torque ripple corrective signal is carried out by the adder 5b, but the subtraction of the torque ripple corrective signal may be carried out with respect to a subtraction result of the motor speed information from the motor speed target value by the adder 5a. In the latter case, by giving consideration to the transfer function of the amplifier 6 as the normalization constant Rc0, the same effect can be achieved. The rotor magnetic pole position pulse signal b may be detected by using a motor-driving-use sensor, or may be detected with the use of the motor coil terminals, as shown in the descriptions on the first through third embodiments.

Furthermore, the seventh embodiment of the present invention shows a method of correcting the motor torque ripple per se, and with this, suppressing the speed fluctuation due to the motor torque ripple. Thus, it is a method wherein a cause of the speed fluctuation is directly eradicated. However, the motor speed fluctuation per se may be suppressed. In this case, for example, a sinusoidal wave data stream which has the same phase and amplitude as those of a torque ripple speed fluctuation component extracted at the step 805 may be subtracted as the torque ripple corrective signal by the adder 5a. By doing so, the normalization constant Rc0 for determining the amplitude information is set to a value such that a result of multiplication of an amplitude of the sinusoidal wave data stream stored in the torque ripple corrective memory 10a and the amplitude information has an amplitude equal to that of the torque ripple speed fluctuation component.

Thus, according to any one of the fourth through seventh embodiments of the present invention, the amplitude of the torque ripple corrective signal is automatically set to an optimal value. Therefore, time for adjustment is saved, and the motor torque ripple is surely corrected as to each individual motor. Besides, the calculating operation by any one of the methods shown in the fourth through seventh embodiments of the present invention is preferably carried out immediately after the motor rotation starts. Correction cannot be carried out during this calculation time, but only with respect to several rotations of the motor. Therefore, this causes little influence. Moreover, in the case where the calculation by any one of the methods in the fourth through seventh embodiments is carried out when an individual device is manufactured and only the output of the amplitude information already calculated is carried out when the device is put in use, the effect can be achieved immediately after the rotation starts.

The following description will explain eight through tenth embodiments of the present invention, while referring to FIGS. 12 through 15.

Figure 12:
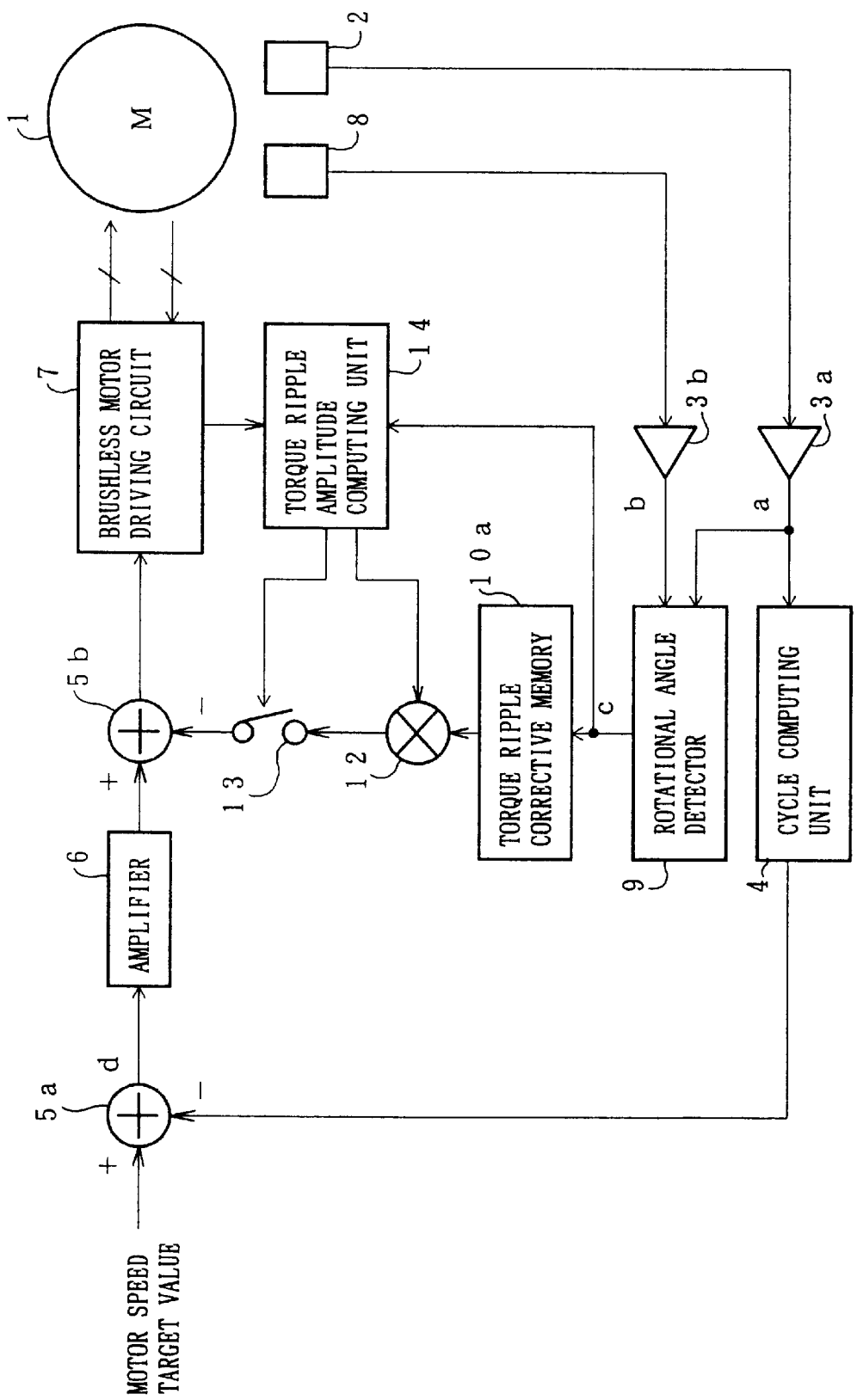
FIG. 12 is a view illustrating an arrangement in accordance with eighth through tenth embodiments of the present invention.
Figure 13:
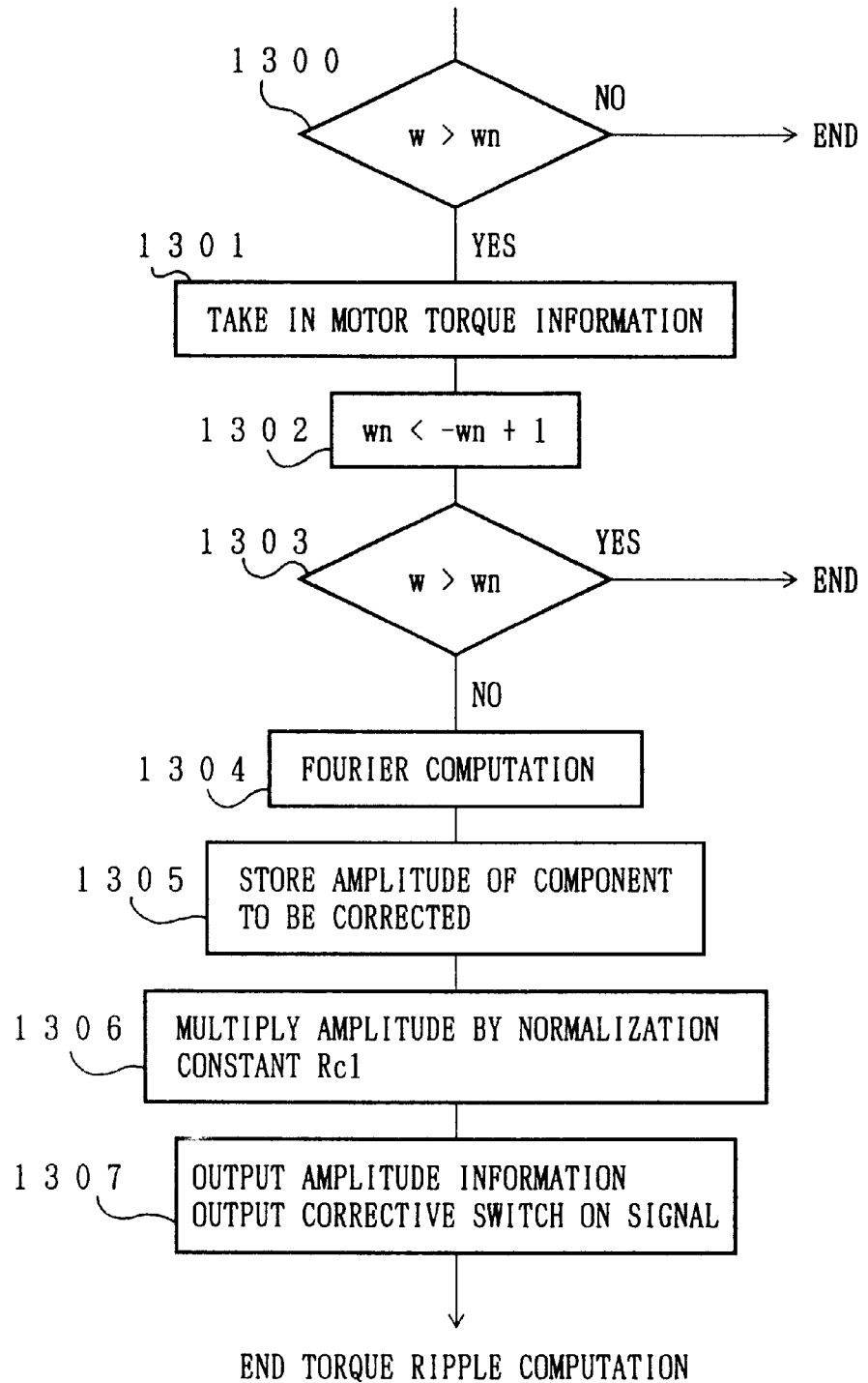
FIG. 13 is a flowchart of an operation in the eighth embodiment of the present invention.
Figure 14:
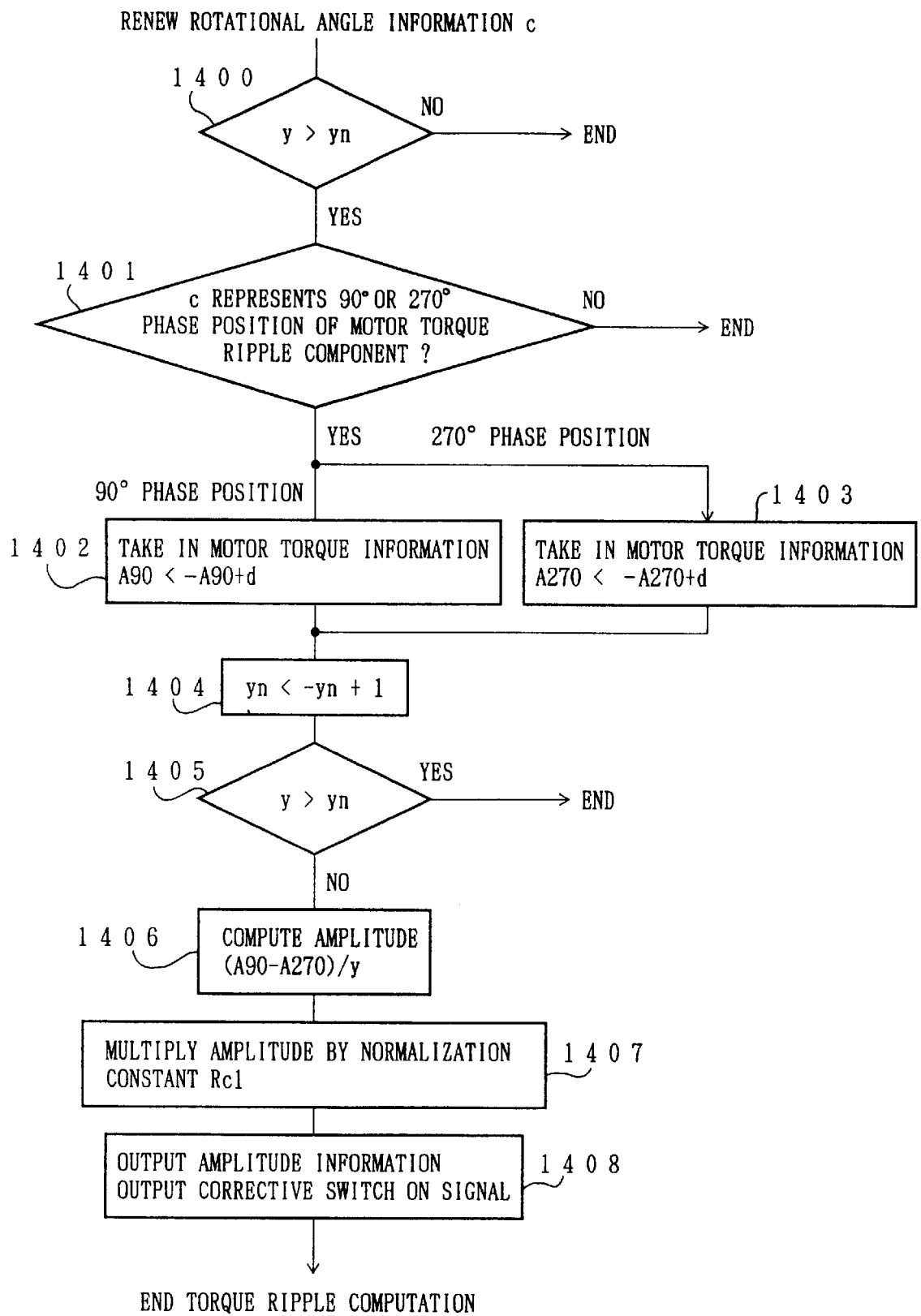
FIG. 14 is a flowchart of an operation in the ninth embodiment of the present invention.
Figure 15:
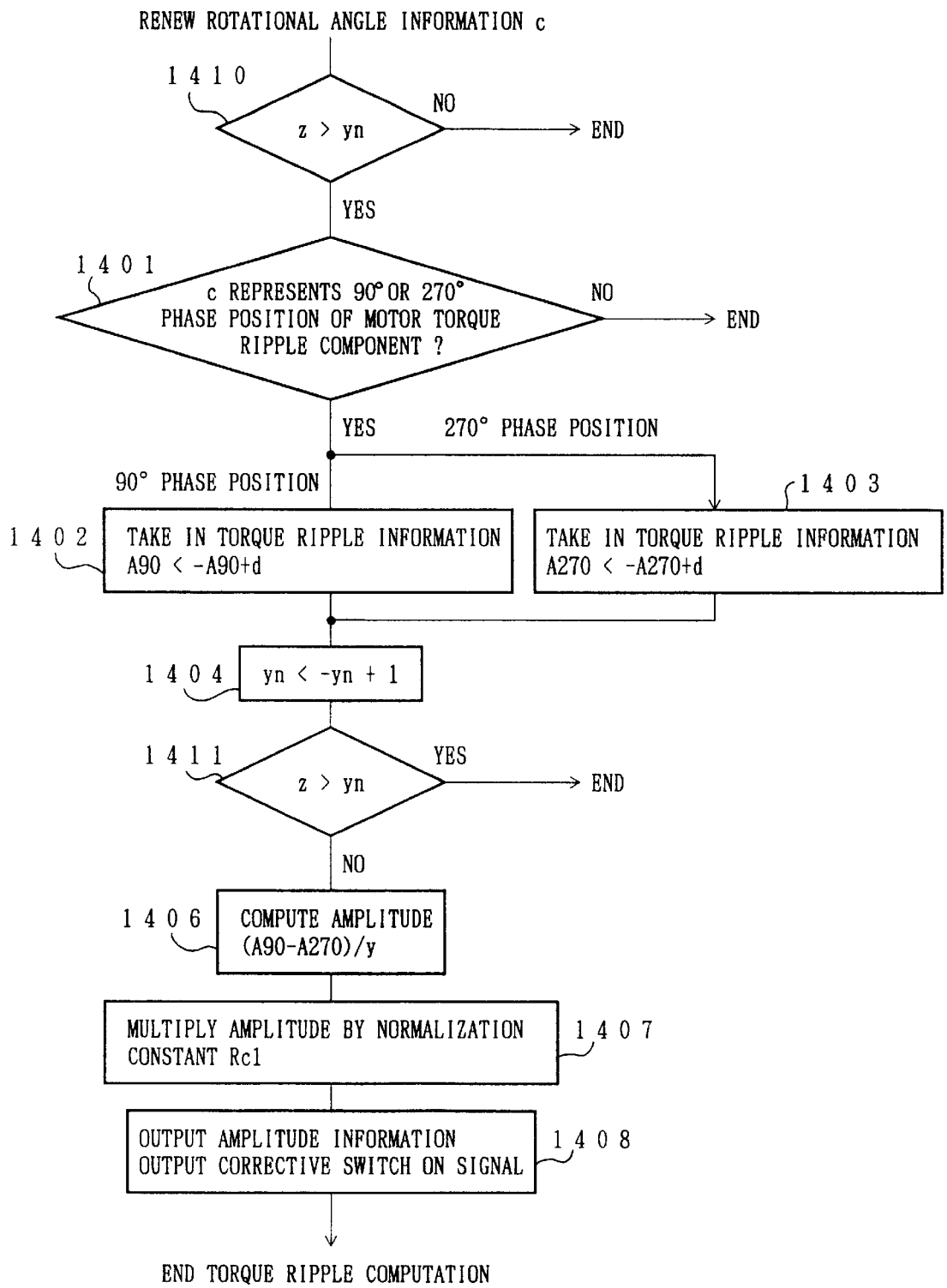
FIG. 15 is a flowchart of an operation in the tenth embodiment of the present invention.

FIG. 12 is a view illustrating an arrangement in accordance with the eighth through tenth embodiments of the present invention. The members having the same structure (function) as those in the above-mentioned embodiment will be designated by the same reference numerals and their description will be omitted. FIGS. 13 through 15 are flowcharts of operation sequences in the eighth through tenth embodiments of the present invention, respectively. At the beginning of each flow of the process sequences, initialization of each variable and memory is carried out, but this initialization process is omitted in FIGS. 13 through 15.

The eighth through tenth embodiments of the present invention are intended to automatically determine amplitude information of a torque ripple corrective signal from motor torque information. The arrangement in accordance with these embodiments differs from the arrangements in accordance with the first through seventh embodiments in incorporating a torque ripple amplitude computing unit 14, a multiplier 12, and a corrective switch 13, as illustrated in FIG. 12.

The eighth embodiment of the present invention is intended to determine the torque ripple corrective signal in the following manner. To begin with, a frequency component which is identical to the torque ripple corrective signal is extracted from the motor torque information, then, an amplitude of the extracted frequency component is detected. Thereafter, amplitude information of the torque ripple corrective signal is computed from the amplitude, and the amplitude information thus found is multiplied by the sinusoidal wave data read out from the torque ripple corrective memory.

A sinusoidal wave data stream having a set amplitude is stored in the torque ripple corrective memory 10a. The multiplier 12 multiplies (1) an output of the torque ripple corrective memory 10a, which is recalled as to each rotational angle information c, and (2) amplitude information supplied from the torque ripple amplitude computing unit 14, so as to output a torque ripple corrective signal for correcting the motor torque ripple. The corrective switch 13 is caused to shift to an ON state in the case where the calculation of the amplitude information by the torque ripple amplitude computing unit 14 has ended and the amplitude information has been outputted, while it is caused to shift to an OFF state in the case where the amplitude information has not been outputted.

Then, the following description will explain an operation at the torque ripple amplitude computing unit 14.

FIG. 13 is a flowchart of an operation sequence in the eighth embodiment of the present invention, which is carried out, for example, at every renewal of the rotational angle information c. At a step 1300, it is checked whether or not a set number of times the motor torque information has been taken in, and the amplitude information has been calculated. In the case where the calculation has finished, the subsequent steps are unnecessary.

In the case where the calculation has not finished, the flow goes onto a step 1301, where the motor torque information is taken in. At a subsequent step 1302, a count wn of a counter which shows the number of times the taking-in operation has been done is increased by one. At a step 1303, whether or not the number of times of the taking-in operation has reached a set number is checked, by comparing the count wn with a constant w set to the set number. In the case where the number of times of the taking-in operation has not reached the set number, the subsequent steps are not carried out and the flow ends, and the operation for taking in the motor torque information is repeated.

In the case where the number of times of the taking-in operation has reached the set number, the frequency component detecting operation such as the Fourier transformation is carried out at a step 1304 with the use of the data thus taken in. Then, at a step 1305, the frequency component to be corrected is extracted from the detected frequency components, and a torque ripple amplitude of the frequency component thus extracted is stored. Then, at a step 1306, amplitude information for correcting the motor torque ripple is computed by multiplying the torque ripple amplitude by a normalization constant Rc1. Finally, at a step 1307, the amplitude information is outputted, while a signal causing the corrective switch 13 to shift to the ON state is outputted, with which the flow ends.

As for the aforementioned motor torque information, a motor torque ripple due to inconstancy in exciting current supplied to the motor coils is found in a simple manner, for example, by detecting current running through a motor driving transistor incorporated in the brushless motor driving circuit 7.

Here, the normalization constant Rc1 is a constant determining the amplitude information, and may be set to a value such that a multiple of the amplitude information and the amplitude value of the sinusoidal wave data stream, when converted into motor torque, is equal to the amplitude of the motor torque ripple. An example method for finding the normalization constant is as follows. The motor is driven with the use of the device in accordance with the eighth embodiment of the present invention, and fluctuation of the motor torque or fluctuation of the motor rotational speed is observed by an FFT analyzer. Among components of the motor torque ripple, a component to be corrected is focused, and the amplitude of the sinusoidal wave data stream is gradually varied so that the amplitude which makes the component smallest is found. This method is direct and simple. However, another method is applicable. For example, the amplitude may be computed with the use of each transfer function of the elements such as the polyphase brushless motor.

The amplitude information as an output of the torque ripple amplitude computing unit 14 and an output of the torque ripple corrective memory 10a are multiplied together by the multiplier 12, and a torque ripple corrective signal is outputted. Then, the torque ripple corrective signal is subtracted from the motor control signal by the adder 5b. Thus, the correction is carried out.

The following description will explain the ninth embodiment of the present invention.

FIG. 14 is a flowchart of an operation sequence in the ninth embodiment. At the beginning of the flow of the process sequence, initialization of each variable and memory is carried out, but this initialization process is omitted in FIG. 14.

The ninth embodiment of the present invention has an arrangement shown in FIG. 12, and relates to an operation by the torque ripple computing unit 14, which is as follows. Motor torque information which is rotational angles corresponding to a maximum amplitude and a minimum amplitude of the torque ripple corrective signal is taken in y times (y is an integer which satisfies y>1), and is integrated and averaged so that an amplitude of the torque ripple corrective signal is found, and amplitude information of the torque ripple corrective signal is computed from the amplitude thus found. Then, the amplitude information is multiplied by the sinusoidal wave data read out from the torque ripple corrective memory 10a, so that the torque ripple corrective signal is determined.

The following description will explain this operation in the ninth embodiment of the present invention.

FIG. 14 shows the operation by the torque ripple amplitude computing unit 14, which is performed, for example, at every renewal of the rotation angle information c. At a step 1400 it is checked whether or not the motor torque information has been taken in a set number of times and the amplitude information has been already computed. In the case where the computation has been completed, the subsequent steps are unnecessary.

In the case where the computation has not yet been completed, the flow goes to a step 1401, where it is judged which the current rotational angle information c represents, either a maximum amplitude position or a minimum amplitude position of the sinusoidal wave data stream stored in the torque ripple corrective memory 10a, that is, either a 90° phase position or a 270° phase position when the sinusoidal wave data stream is converted into a sinusoidal wave. In the case where the rotational angle information c represents neither of them, the current process ends, and the operation is left in a stand-by state until the next renewal of the rotational angle information c.

In the case where it represents either of them, subsequent steps depend on which it represents, the 90° phase position or the 270° phase position. In the case where the rotational angle information c represents the 90° phase position, the flow goes to a step 1402, where the motor torque information is added to a variable A90 and is taken in. On the other hand, in the case where it represents the 270° phase position, the flow goes to a step 1403, where the motor torque information is added to a variable A270 and is taken in. Then, at a step 1404, a count yn of a taking-in counter is increased by 1. At a step 1405, whether or not the taking-in step has been already carried out the set number of times, that is, y times, is checked. In the case where the result of the check is negative, the current process sequence is ended, and the operation is left in a stand-by state until the next renewal of the rotational angle information c.

In the case where the result of the check is affirmative, an amplitude A is computed at a step 1406. This step is aimed to compute respective mean values by using the integrated values of the motor torque information, and average them by subtraction with respect to the mean values. At a step 1407, the amplitude A is multiplied by the normalization constant Rc1, and at a step 1408, amplitude information as a result of the multiplication is outputted, while a signal for causing the corrective switch 13 to shift to the ON state. Note that the normalization constant Rc1 may be found as described above. As for the aforementioned motor torque information, a motor torque ripple due to inconstancy in exciting current supplied to the motor coils is found in a simple manner, for example, by detecting current running through the motor driving transistor incorporated in the brushless motor driving circuit 7.

The amplitude information as an output of the torque ripple amplitude computing unit 14 and an output of the torque ripple corrective memory 10a are multiplied together by the multiplier 12, and as a result a torque ripple corrective signal is outputted. The torque ripple corrective signal is subtracted from the motor control signal by the adder 5b. Thus, correction is performed.

Thus, in the ninth embodiment, the amplitude of the torque ripple corrective signal is automatically adjusted so as to become optimal. Therefore, time for adjustment is saved and a motor toque ripple is surely corrected as to each motor, while the operation of the torque ripple amplitude computing unit 14 is simplified since the amplitude is calculated by simple steps, such as addition and averaging.

Besides, the calculation by this method is preferably carried out immediately after the motor rotation starts. Correction cannot be carried out during this calculation time, but only with respect to several rotations of the motor. Therefore, this causes little influence. Moreover, in the case where the calculation is carried out when an individual device is manufactured and only the output of the amplitude information already calculated is carried out when the device is put in use, the effect can be achieved immediately after the rotation starts.

The following description will explain the tenth embodiment of the present invention.

FIG. 15 is a flowchart of an operation sequence in the tenth embodiment of the present invention. At the beginning of the flow of the process sequence, initialization of each variable and memory is carried out, but this initialization process is omitted in FIG. 15. The members having the same structure (function) as those in the above-mentioned embodiments will be designated by the same reference numerals and their description will be omitted.

The tenth embodiment of the present invention relates to an operation by the torque ripple amplitude computing unit 14 of the arrangement shown in FIG. 12. Compared with the ninth embodiment, the steps 1400 and 1405 thereof in FIG. 9 are different from corresponding steps of the present embodiment.

Usually, in the motor torque ripple, a component, the number of times of whose appearance is an integral multiple of the coil excitation switching cycle, occurs more greatly than the others, and the cycle of the sinusoidal wave data stream is also set equal to the cycle of this component. However, due to decentricity and deflection of the motor, other motor torque ripple components, the numbers of times of whose appearance are integral multiples of the motor rotation, respectively, also occur, though they only slightly fluctuate. Therefore, to find amplitude information of the motor torque ripple from the mean value of the speed error signal d, more precise amplitude can be found by using speed error information for integral-multiple rotations of the motor.

In the tenth embodiment of the present invention, the number of times the operation for taking in the motor torque information is carried out per one rotation of the motor is set to an integral multiple of the number of times the integrating operation is carried out per one rotation of the motor. Therefore, a value z in steps 1410 and 1411 in FIG. 15, which is to be compared with the number of times the motor torque information has been taken in, is set to an integral multiple of the number of times the integrating operation is carried out per one rotation of the motor.

Therefore, the number of times of the taking-in operation is an integral multiple of the number of rotations of the motor, and it becomes possible to calculate amplitude information with precision, which is not affected by the motor decentricity, deflection, or the like.

Note that the arrangement of the tenth embodiment of the present invention is applicable to the eighth embodiment of the present invention, and in this case, the value w in FIG. 13 may be set to an integral multiple of the number of times of renewal of the rotational angle information per one rotation of the motor.

Note that in the above embodiments, subtraction of the torque ripple corrective signal is carried out by the adder 5a, and in this case, the transfer function of the amplifier 6 as the normalization constant may be taken into consideration. The rotor magnetic pole position pulse signal b may be detected by using a motor-driving-use sensor, or may be detected with the use of the motor coil terminals, as shown in the descriptions on the first through third embodiments.

As has been described, in the eighth through tenth embodiments, the amplitude of the torque ripple corrective signal is automatically adjusted so as to become optimal. Therefore, time for adjustment is saved and a motor toque ripple is surely corrected as to each motor. Besides, the calculation in the eighth through tenth embodiments is preferably carried out immediately after the motor rotation starts. Correction cannot be carried out during this calculation time, but only with respect to several rotations of the motor. Therefore, this causes little influence. Moreover, in the case where the calculation in accordance with the eighth through tenth embodiments is carried out when an individual device is manufactured and only the output of the amplitude information already calculated is carried out when the device is put in use, the effect can be achieved immediately after the rotation starts.

Figure 16:
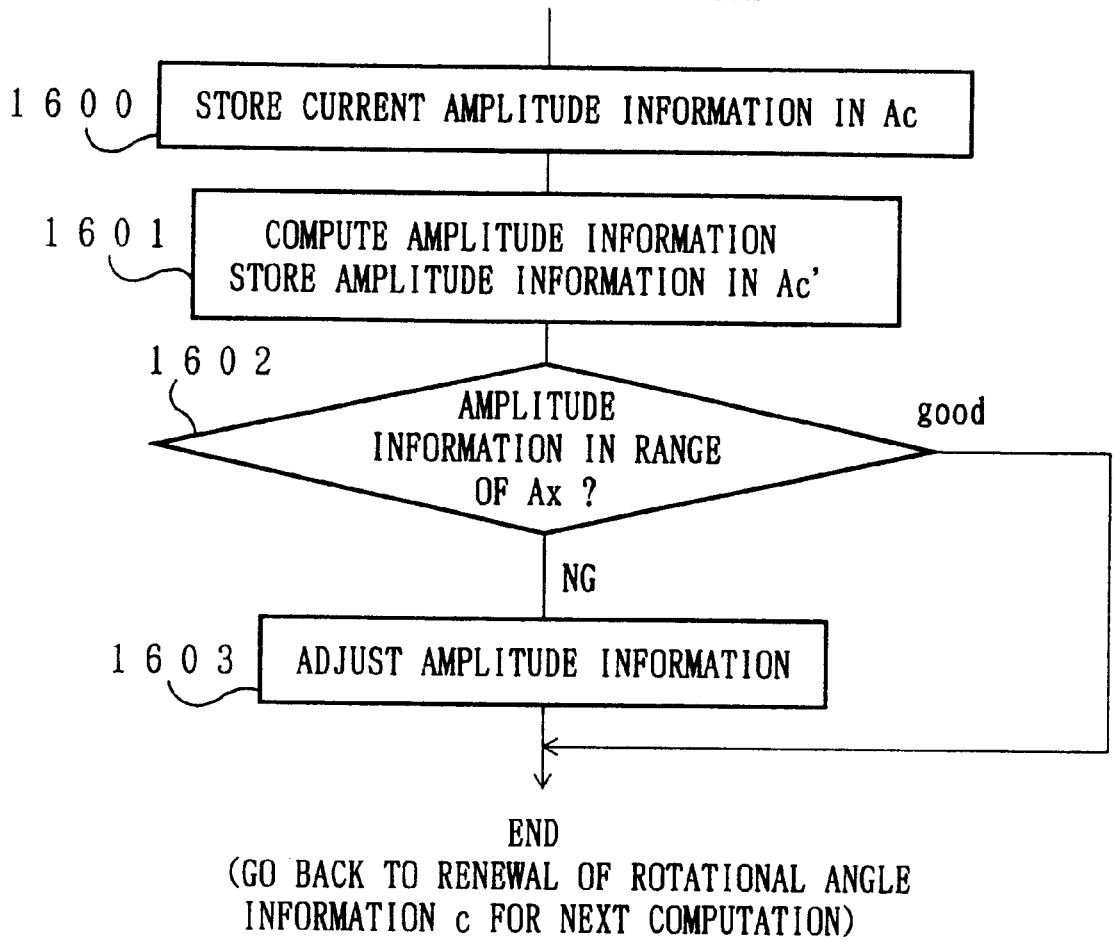
FIG. 16 is a flowchart of an operation in the eleventh embodiment of the present invention.
Figure 17:
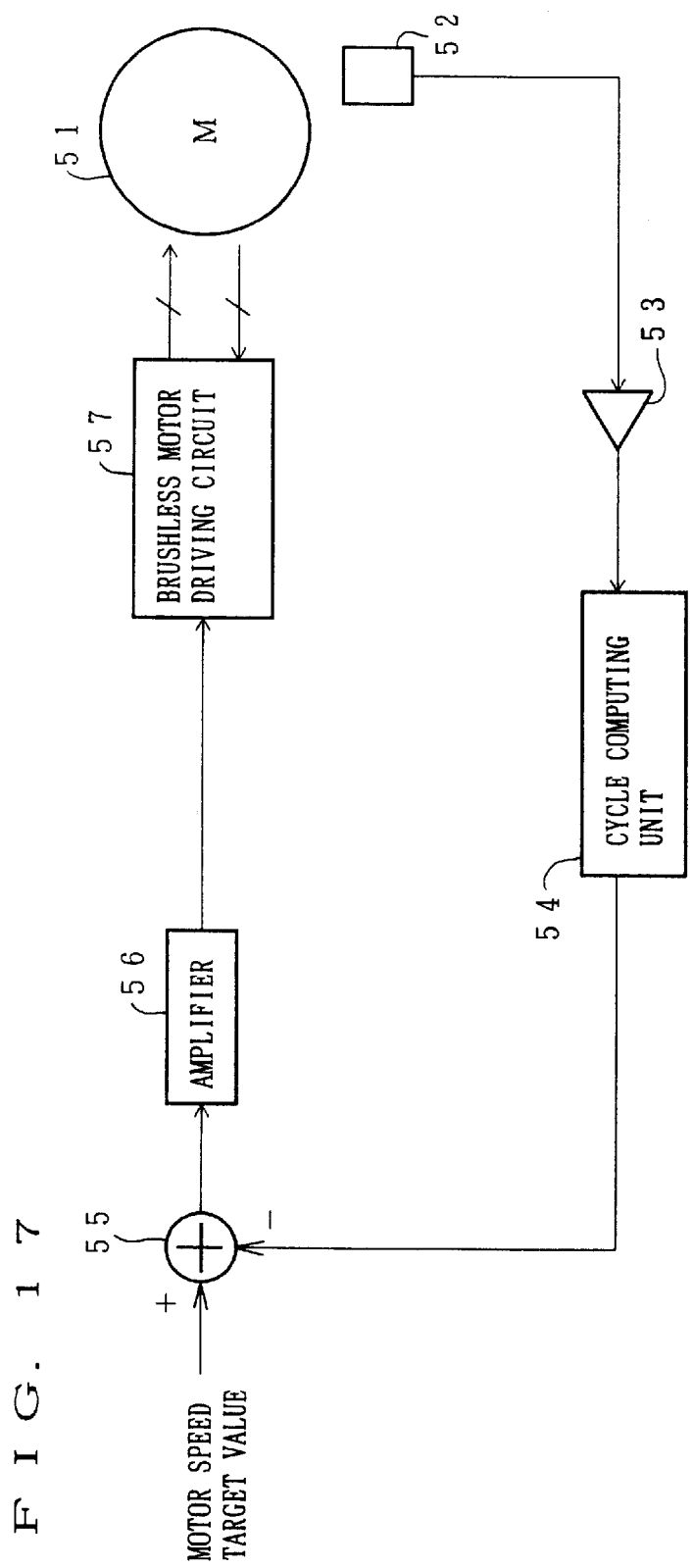
FIG. 17 is a view illustrating an arrangement of a conventional motor speed control device.

The following description will explain the eleventh embodiment of the present invention, while referring to FIG. 16.

FIG. 16 is a flowchart of an operation sequence in the eleventh embodiment of the present invention. At the beginning of the flow of the process sequence, initialization of each variable and memory is carried out, but this initialization process is omitted in FIG. 16. The members having the same structure (function) as those in the above-mentioned embodiments will be designated by the same reference numerals and their description will be omitted.

The eleventh embodiment of the present invention relates to an operation by the torque ripple amplitude computing unit 11 or 14 of the arrangement shown in FIG. 7, which is in accordance with the fourth through sixth embodiments, or FIG. 12 in accordance with the eighth through tenth embodiments, respectively. The eleventh embodiment is intended to exemplify a method wherein the amplitude information of the torque ripple corrective signal is renewed even in the case where the amplitude information has already been set and the motor toque ripple is being corrected, for example, while the motor is being driven. To be more specific, in the arrangement of the eleventh embodiment, corrective effect detecting means for sequentially detecting an effect of torque ripple correction is provided in the torque ripple amplitude computing unit, and the amplitude information of the torque ripple corrective signal is renewed based on the detection result.

The process shown in FIG. 16 is a process of an operation by the corrective effect detecting means which is carried out at every renewal of the rotational angle information c, after the amplitude information is detected and correction is carried out based on the amplitude information by a method in accordance with any one of the fourth through tenth embodiments of the present invention. More concretely, the process is performed after the step 800, 900, 1300, or 1400, in the case where it is judged the number of times the motor torque information has been taken in has reached a set number.

First of all, at a step 1600, the amplitude information is stored as a variable Ac.

At a step 1601, amplitude information is anew computed by the method in accordance with any one of the fourth through tenth embodiments. The amplitude information thus computed is stored as a variable Ac'.

Then, at a step 1602, it is judged whether or not the amplitude information Ac' is within a set range expressed by using a set value Ax. For example, at this step, it is judged whether or not |Ac'|<Ax is satisfied. In other words, it is checked whether or not the motor torque ripple is corrected so as to become sufficiently small (smaller than Ax), or to state differently, whether or not correction is conducted with the use of correct amplitude information. In the case where as a result of the check it is judged that the aforementioned condition is satisfied, the flow goes along a "good" branch, and the process finishes. Then, amplitude information is computed anew at every renewal of the rotational angle information c. On the other hand, in the case where it is judged that the aforementioned condition is not satisfied, the flow goes along an "NG" branch to a step 1603, where the amplitude information Ac is adjusted.

Note that the set value Ax is a tolerance value for the fluctuation of the speed error signal or the motor torque due to the motor torque ripple, and may be determined, for example, in accordance with a target value of the motor speed fluctuation.

The step 1603 is aimed to, for example, increase/decrease the amplitude information Ac by a set value. To do so, at the step 1602, the reason why the flow has gone along the "NG" branch, either that Ac' is too great in a minus direction, or that Ac' is too great in a plus direction, is stored. In the case of the minus direction, the amplitude information is judged to be too great, and the amplitude information Ac is decreased. On the other hand, in the case of the plus direction, the amplitude information is judged to be too small, and the amplitude information Ac is increased. The plus/minus judgement is enabled only with information on whether Ac' is a minus value or a plus value. Alternatively, the judgement is enabled with information on whether Ac and Ac' have the same phase or opposite phases. Further, instead of increasing/decreasing the amplitude information Ac by a set value, newly computed amplitude information Ac', which represents an amount to be further corrected, may be added to the amplitude information Ac. The addition result is used as new amplitude information Ac.

Thus, in the eleventh embodiment of the present invention, the corrective effect is sequentially checked, and according to the check, the amplitude information is anew set to an optimal value. Therefore, the motor control device is made to respond to changes due to aging such as temperature changes, variation of loads, fluctuation of the motor speed, and the like, thereby becoming capable of optimal correction and control of the motor rotation with stability and precision all the time.

Incidentally, since the motor speed control devices in accordance with the first through eleventh embodiments are arranged so as to generate corrective data streams by referring to the motor magnetic pole positions, a phase of a corrective data stream used can be made to substantially coincide with a phase of a fluctuation of the motor speed due to the motor torque fluctuation (motor torque ripple) which occurs in synchronization with the motor magnetic pole positions, without carrying out specific operations such as measurement of corrective data as to each individual motor. As a result, the motor speed fluctuation can be eliminated extremely efficiently and effectively, as compared with the above case where specific operations are carried out.

However, in the aforementioned arrangements, the effect of elimination of torque ripple sometimes deteriorates due to errors in pulse intervals of the rotor magnetic pole position pulse signal b, for example, in the case where inexpensive motors are used. In other words, in the case where inexpensive motors are used, accuracy in motor magnetic pattern formation is often low. Therefore, as is the case with the motor driving magnetic pole patterns illustrated in FIG. 18, angles $\theta_0$ through $\theta_{n-1}$ between the magnetic poles tend to greatly vary. An error of a center position of formed magnetic patterns with respect to a center position of the rotor is often great. Moreover, in such a motor speed control device applied to such a motor, errors in detection by the rotor magnetic pole position sensor and errors in threshold levels of the waveform shaping circuit 3b which generates the rotor magnetic pole position pulse signal b are often great. As a result, errors in pulse intervals of the rotor magnetic pole position pulse signal b shown in FIG. 19 expand. Note that in FIG. 19, both the leading edge and the trailing edge of the rotor magnetic pole position pulse signal b indicate changes in the rotor magnetic pole positions. Therefore, as for the rotor magnetic pole position pulse signal b, an interval between edges, as shown by $\theta_0$, is given as a pulse interval. As for the rotational pulse signal a, an interval from a leading edge to a next leading edge is given as a pulse interval. But, it should be noted that the method for setting pulse intervals in the rotor magnetic pole position pulse signal b is not limited to the above-described method, but any one may be applicable as long as it is capable of indicating timings at which the rotor magnetic pole positions change. Likewise, a method for applying the rotational pulse signal a is not limited to the above method, and any one may be applicable as long as pulses the number of which is proportional to the number of rotations of the motor are inputted.

As a result, a maximum value of the rotational angle information, whose value increases at constant time intervals until being reset at every edge of the rotor magnetic pole position pulse signal b, varies in each pulse. For example, even though the number of pulses of the rotational pulse signal a given during every interval of the rotor magnetic pole position pulse signal b is 15 in the case where the magnetic pattern formation is accurate, the number during an interval $\theta_0$ from one edge to a next edge may become, for example, 17 due to errors in the pulse intervals. On the other hand, the number of corrective data stored in the torque ripple corrective memory is set to 15 in conformity with the case where the magnetic pattern formation is accurate. Here, in the case where a corrective data stream is read out from the torque ripple corrective memory, the number of data read out exceeds the number of data previously stored, usually again the data at the beginning of the stream, that is, the zeroth data and the first data are read out. Therefore, the torque ripple corrective signal b does not become a signal whose waveform is cyclic. Besides, since the actual waveform of the motor torque ripple and the waveform of the torque ripple corrective signal have different cycles, their phases gradually come to fail to coincide with each other. As a result, errors may occur between the actual speed fluctuation due to the motor torque ripple and the corrective data stream, thereby causing the motor speed control device to become unable to effectively correct the motor torque ripple.

Figure 19:
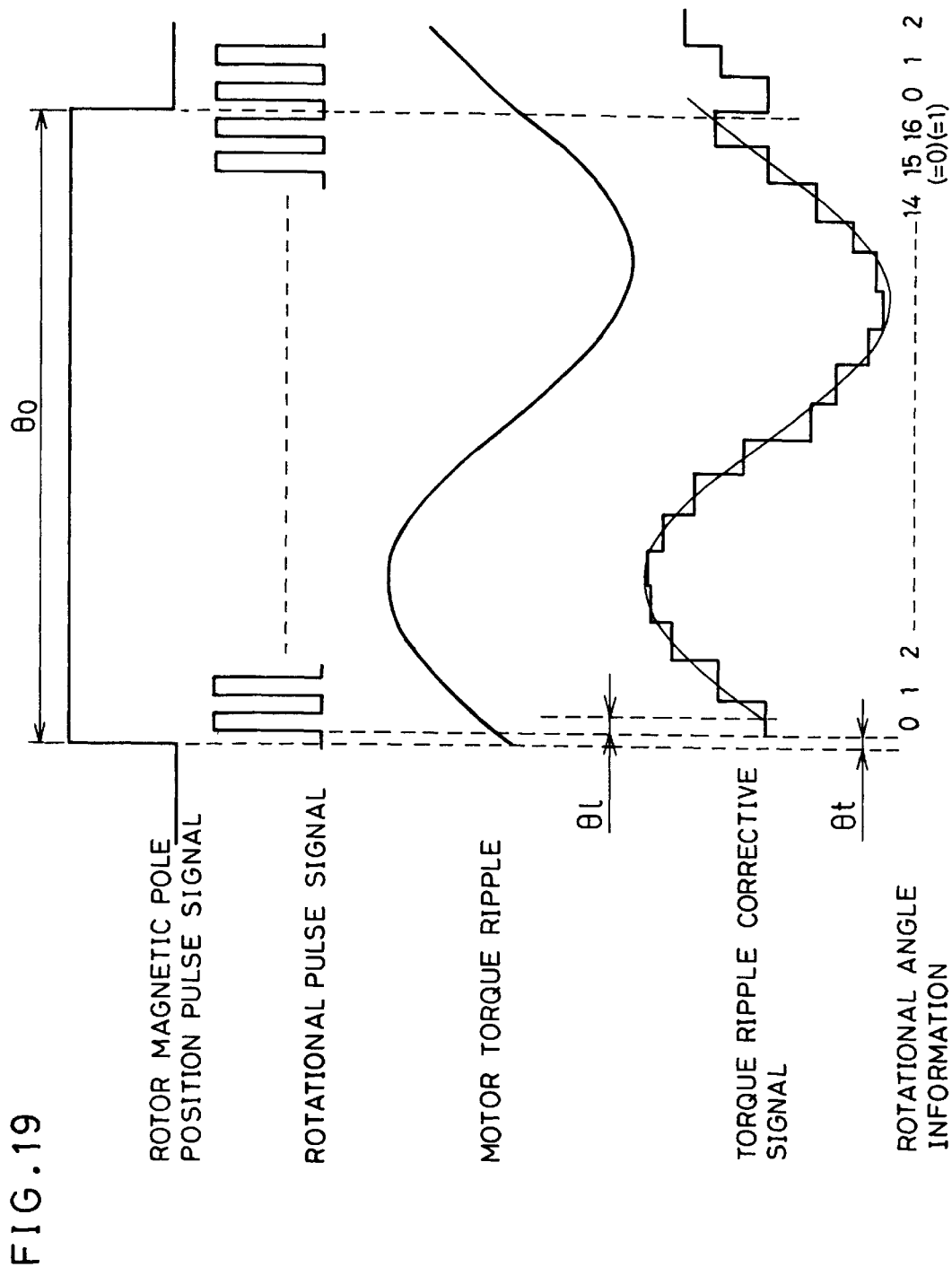
FIG. 19 is a waveform chart in the case where an actual motor torque ripple and the torque ripple corrective signal differ in cycle and phase in a motor speed control device in accordance with the first through eleventh embodiments of the present invention.

Note that FIG. 19 is a waveform chart in the case where, for purposes of illustration, a motor torque ripple component has a sinusoidal waveform whose one cycle corresponds to one interval between the motor magnetic pole positions.

Figure 20:
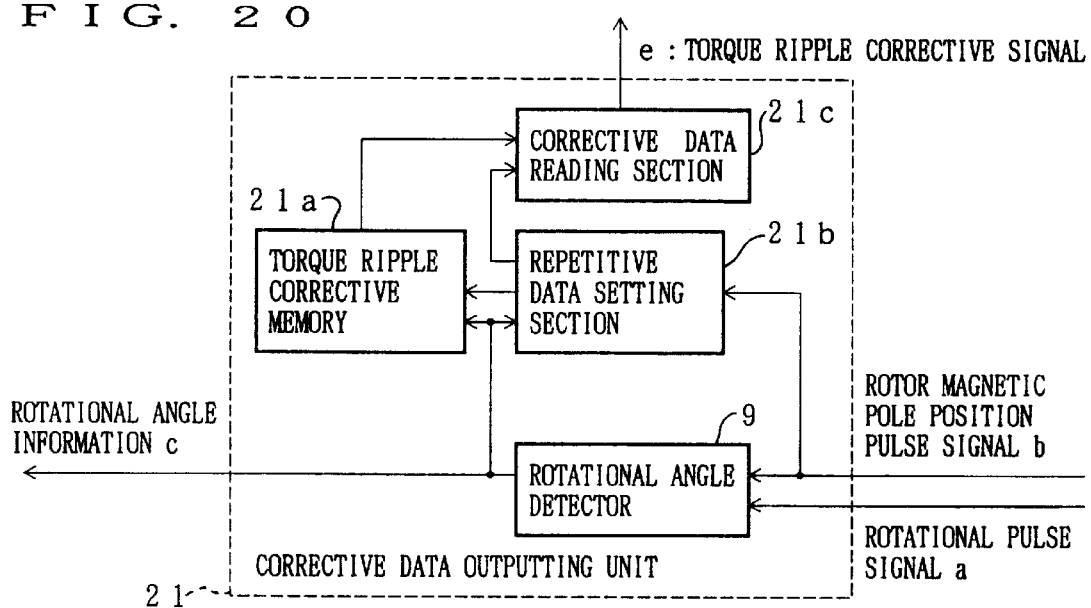
FIG. 20 is a block diagram of a corrective data outputting unit in accordance with a twelfth embodiment of the present invention.

In contrast, a twelfth embodiment of the present invention described below with reference to FIGS. 20 through 27 is intended to realize a motor speed control device which is capable of surely correcting a motor torque ripple even in the case where the maximum value of the rotational angle information fluctuates. A corrective data outputting unit 21 shown in FIG. 20 is provided in the place of the rotational angle detector 9 and the torque ripple corrective memory 10 shown in FIG. 1. The corrective data outputting unit 21 is equipped with (1) the rotational angle detector 9 for generating rotational angle information c, (2) a torque ripple corrective memory 21a in which a plurality of corrective data streams differing in the number of constituent data have been previously stored, (3) a repetitive data setting section 21b which, for each pulse interval of the rotor magnetic pole position pulse signal b, selects a corrective data stream which is composed of the same number of corrective data as the number of pieces of the rotational angle information c applied during a current pulse interval, and (4) a corrective data reading section 21c which suspends the outputting of the corrective data outputting unit 21 while no corrective data stream is being selected.

With the above arrangement, even in the case where the number of pieces of rotational angle information c applied varies as to pulse intervals of the rotor magnetic pole position pulse signal b, the corrective data outputting unit 21 outputs, as a torque ripple corrective signal e, a corrective data stream having the same number of data as the number of pieces of rotational angle information c which is currently applied. As a result, the error occurring due to fluctuation of the pulse intervals of the rotor magnetic pole position pulse signal b can be reduced, while the precision in correcting process by the motor speed control device is improved.

Figure 21:
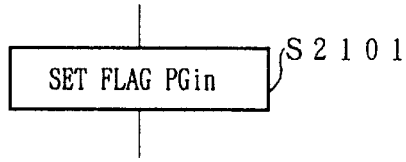
FIG. 21 is a flowchart showing an operation of a rotational angle detector in the twelfth embodiment of the present invention the moment a pulse of the rotor magnetic pole position pulse signal is inputted.
Figure 22:
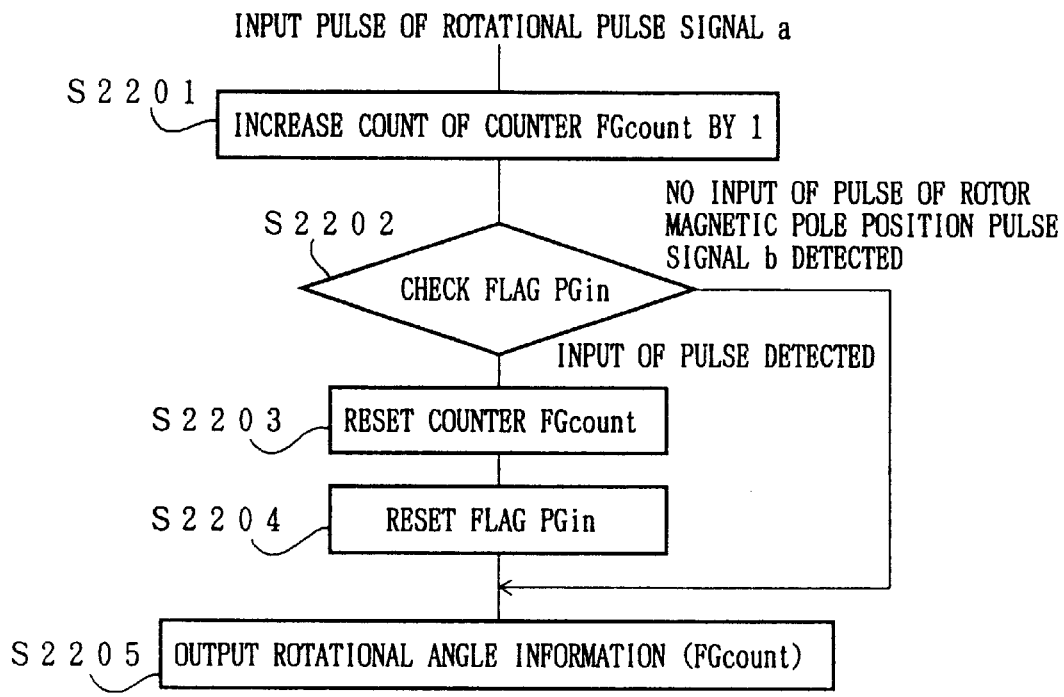
FIG. 22 is a flowchart showing an operation of a rotational angle detector in the twelfth embodiment of the present invention the moment a pulse of the rotational pulse signal is inputted.

To be more specific, as shown in FIG. 21, the rotational angle detector 9 waits for input of a pulse of the rotor magnetic pole position pulse signal b, and when pulse input is detected (a leading edge or a trailing edge is detected), a flag PGin is turned ON (S2101). As shown in FIG. 22, the rotational angle detector 9 increases a count of the counter FGcount by 1 the moment a leading edge of the rotational pulse signal a is detected. It should be noted that the counter FGcount can be realized anyway, with hardware or with software, but the present description explains a case where it is realized with software. Then, the flag PGin is checked to judge whether or not a pulse of the rotor magnetic pole position pulse signal b is inputted (S2202) In the case where the flag PGin is ON (input of pulse is detected), the rotational angle detector 9 resets the counter FGcount so as to make it indicate 0 at S2203, and resets the flag PGin so as to make it OFF at S2304. In addition, at S2305, the rotational angle detector 9 outputs a value resulting on accumulation in the counter FGcount as rotational angle information c. In the case where the flag PGin is OFF at S2202, the operation at S2205 is carried out, and a value resulting on accumulation in the counter FGcount is outputted as the rotational angle information c. As a result, the rotational angle information c outputted by the rotational angle detector 9 increases in response to every input of a pulse of the rotational pulse signal a, and is reset every time a pulse of the rotor magnetic pole position pulse signal b is inputted.

Figure 23:
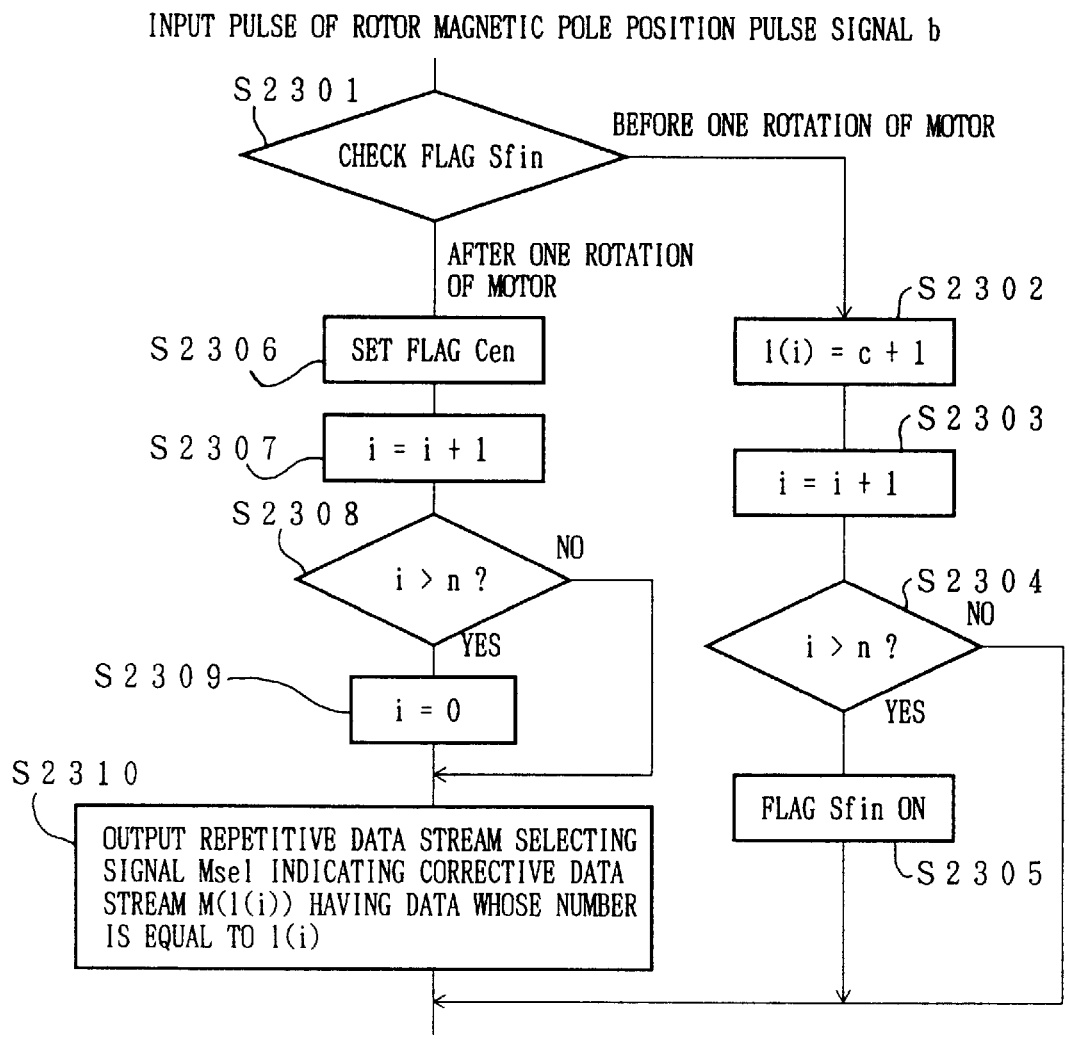
FIG. 23 is a flowchart showing an operation of a repetitive data setting section in the twelfth embodiment of the present invention.

On the other hand, the repetitive data setting section 21b carries out an operation shown in FIG. 23. The repetitive data setting section 21b detects each number of pulses of the rotational pulse signal a during each pulse interval, that is, detects each number of pieces of rotational angle information c, based on the rotor magnetic pole position pulse signal b during one rotation of the motor, and sequentially stores the detected values. Then, in each pulse interval of the rotor magnetic pole position pulse signal b, one corresponding detected value is outputted as a repetitive data stream selecting signal Msel. For example, in the case where the excitation switching is executed n times during one rotation of the motor, the number of the pulse intervals of the rotor magnetic pole position pulse signal b is n during one rotation of the motor. Therefore, data l(0), l(1), . . . l(n−1) indicating the numbers of pieces of the rotational angle information c applied during pulse intervals, respectively, are stored in a memory, and the repetitive data setting section 21b outputs the data l(0), l(1), . . . , l(n−1) (hereinafter referred to as number data) as the repetitive data stream selecting signals Msel during corresponding pulse intervals, respectively.

Specifically, a counter i which shows a corresponding pulse interval is reset so as to indicate 0, and flags Cen and Sfin which will be described later are initialized so as to be OFF. Then, at S2301, the repetitive data setting section 21b checks the flag Sfin, and, as to every pulse signal interval during one rotation of the motor, judges whether or not a corresponding number data is already detected. In the case where the flag Sfin is OFF, it is judged that the detection of every number data has not been completed, and the processes at S2302 and thereafter are carried out so that each number data is determined.

In the determining process, a value resulting on increasing the current value of the rotational angle information c by 1 is stored in a memory l(i) at S2302. Here, in the case where a pulse of the rotor magnetic pole position pulse signal b is inputted, the above value of the rotational angle information c is a maximum value during the pulse interval until the input of this pulse. Here, it should be noted that since the rotational angle information c starts with 0, the number of pulses of the rotational pulse signal a, i.e., the number of the corrective data, is a number resulting on adding 1 to the current value of the rotational angle information c. Therefore, by storing the addition result, the number data corresponding to the previous pulse interval is stored.

Furthermore, at S2303, in order to determine the number data corresponding to the next pulse interval, the count of the counter i is increased by one, and at S2304, the count value is compared with the number n of pulses of the rotor magnetic pole position pulse signal b applied during one rotation of the motor. The process from S2301 through S2304 is repeated until the count of the counter i exceeds the maximum value n, and the number data l(0), l(1), . . . , l(n−1) corresponding to the pulse intervals, respectively, are sequentially determined. When the motor completes one rotation and the count of the counter i exceeds the maximum value n, the repetitive data setting section 21b judges that the number data for one rotation are determined, and sets the flag Sfin ON (S2305).

Figure 25:
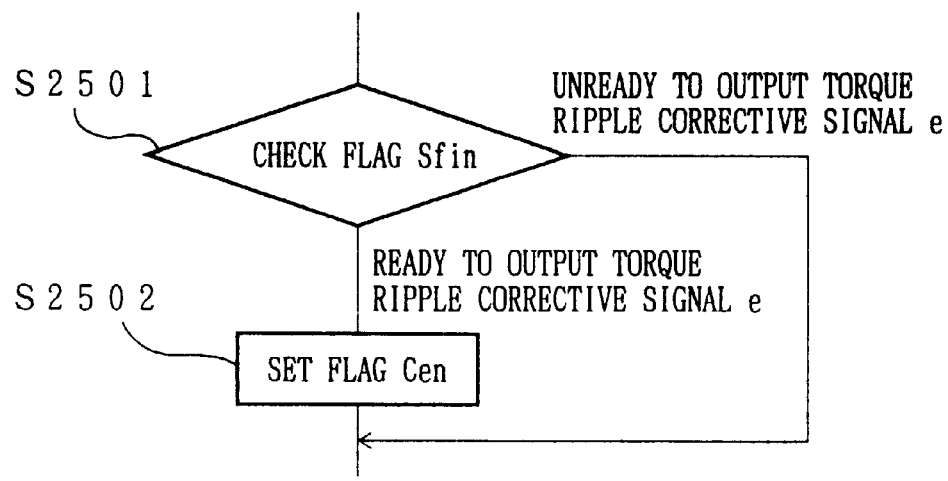
FIG. 25 is a flowchart showing an operation of a corrective data reading section in the twelfth embodiment of the present invention.

Incidentally, as shown in FIG. 25, the corrective data reading section 21c checks the flag Cen which indicates whether or not torque ripple correction is ready, so as to judge whether or not corrective data supplied from the torque ripple corrective memory 21a should be outputted as the torque ripple corrective signal e (S2501). Here, since the flag Cen remains OFF in the same state as that at the initialization while an operation for determining the torque number data is being under way, the corrective data reading section 21c continue suspending output of the corrective data.

In contrast, as shown in FIG. 23, in the case where the flag Sfin becomes ON at S2305, it is judged at S2301 that the motor has completed one rotation, and the processes at S2306 and thereafter are carried out. In other words, at S2306, the repetitive data setting section 21b sets the flag Cen ON, indicating that the torque ripple correction is ready. At S2307, the count of the counter i is increased by 1, and in the case where the addition result exceeds the maximum value n (in the case of YES at S2308), the process at S2309 is executed, thereby causing the count of the counter i to be reset to 0. Thus, the count value of the counter i represents the numeral indicating the current pulse interval. Besides, at S2310, the number data l(i) corresponding to the count value of the counter i is read out, and it is outputted as the repetitive data stream selecting signal Msel.

Here, the torque ripple corrective memory 21a is composed of, for example, a ROM (read-only memory) and the like, and stores corrective data streams $M(l_0)$, $M(l_1)$, . . . , $M(l_{k-1})$, which have data, the numbers of which are $l_0$, $l_1$, . . . , and $l_{k-1}$, respectively. Each corrective data stream M has a waveform with which the torque ripple can be corrected, as is with the cases of the first through eleventh embodiments. The corrective data stream may be produced by, for example, synthesizing predictable torque ripple components, or sampling actual torque ripples. Since the torque ripple corrective signals e are stored as the corrective data streams M, the waveform of the torque ripple corrective signal e can be desirably set.

The numbers $l_0, l_1, \ldots, l_{k-1}$ may be set any way as long as they include all the number data l(i) corresponding to the pulse intervals, but usually they are set as follows. Namely, a reference number is selected, judging from the arrangement of the motor, and the numbers $l_0, l_1, \ldots, l_{k-1}$ are set so as to fall in a range centering around the reference number. For example, in the aforementioned arrangement, the reference numeral is set to 120/8=15. Therefore, the numbers $l_0, l_1, \ldots, l_{k-1}$ will be set so as to fall in a range centering around 15, for example, in a range of 12 to 18.

Figure 24:
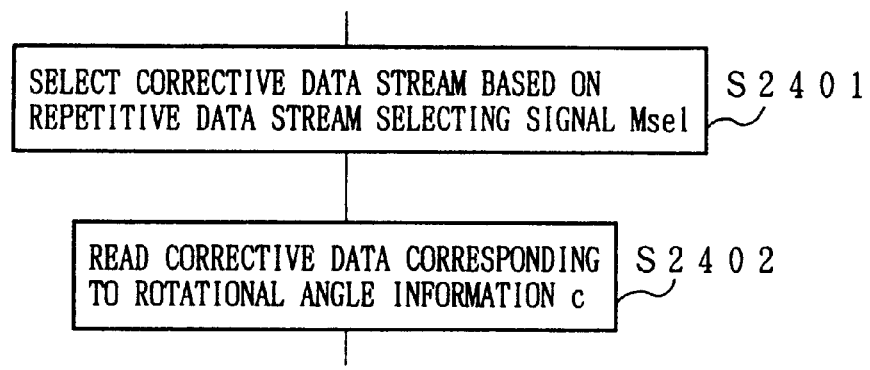
FIG. 24 is a flowchart showing an operation of a torque ripple corrective memory in the twelfth embodiment of the present invention.

At S2401 shown in FIG. 24, one corrective data stream used for correction during the current pulse interval is selected among these corrective data streams in accordance with the repetitive data stream selecting signal Msel outputted by the repetitive data setting section 21b, and at S2402, the torque ripple corrective memory 21a outputs a corrective data corresponding to the rotational angle information c in the corrective data stream.

On the other hand, since the flag Cen is ON in this state, it is judged at S2501 that output of the torque ripple corrective signal e is ready, and the corrective data reading section 21c outputs, as the torque ripple corrective signal e, the corrective data outputted by the torque ripple corrective memory 21a (S2502).

Figure 27:
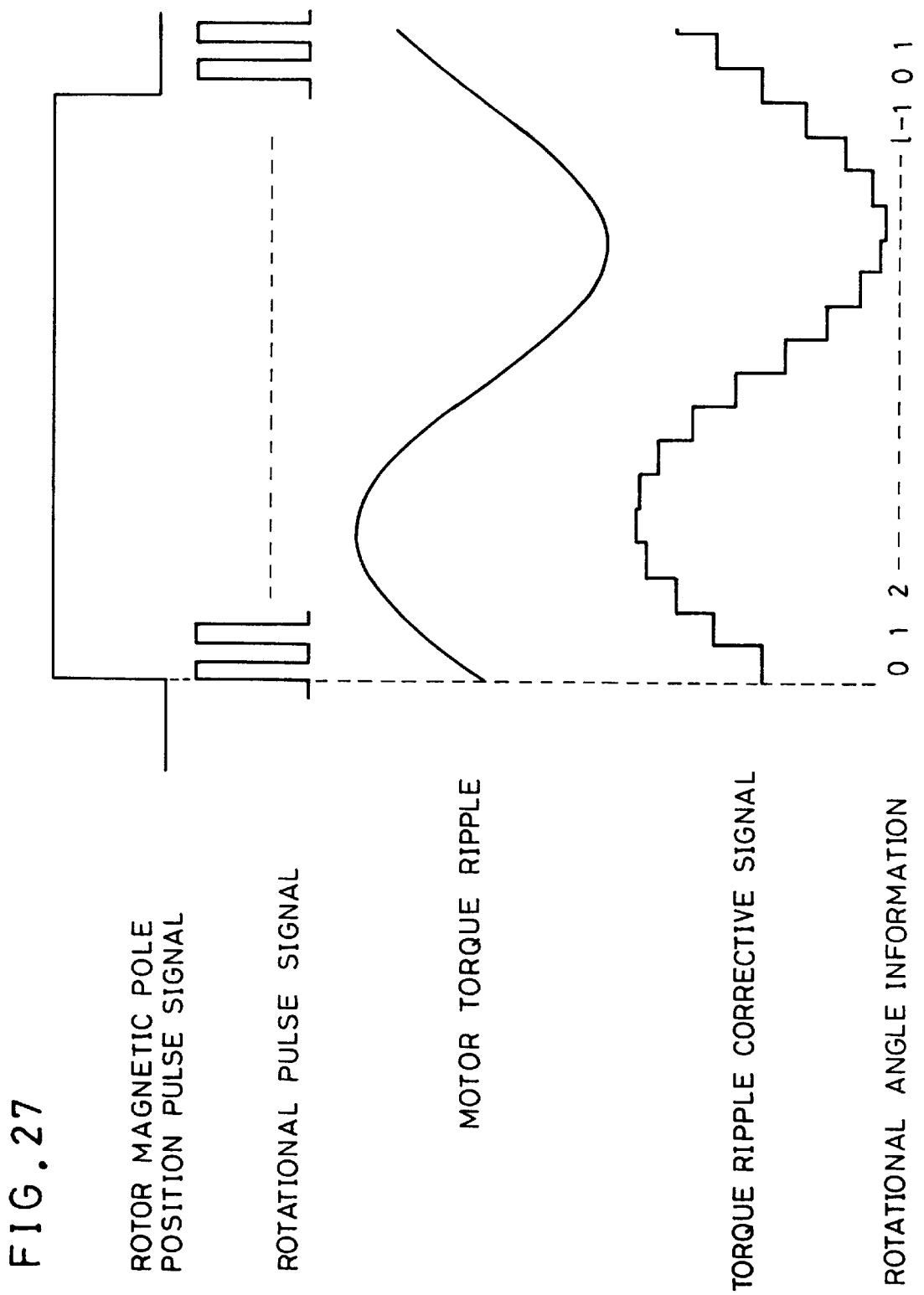
FIG. 27 is a waveform chart showing an operation of the twelfth embodiment of the present invention.

As a result, the corrective data outputting unit 21 is capable of selecting an appropriate corrective data stream and outputting the torque ripple corrective signal e, even in the case where the pulse interval of the rotor magnetic pole position pulse signal b fluctuates. This allows the motor speed control device to conduct appropriate correction all the time, independently of pulse intervals, as illustrated in FIG. 27.

Note that, to store a plurality of corrective data streams, memory capacity required of the torque ripple corrective memory 21a expands, as compared with the first through eleventh embodiments, but it is still sufficiently small, as compared with the conventional case where the corrective data stream for one rotation of the motor is stored.

Moreover, in the above description, the steps of S2401 and S2402 are separately described, but in actuality, the two steps are simultaneously executed as described below. Namely, a corrective data designated by a combination of the repetitive data stream selecting signal Msel and the rotational angle information c is stored in an address corresponding to the combination in the torque ripple corrective memory 21a. Then, when both the signals Msel and c are supplied, the corrective data is read out from the address which is generated so as to correspond to the combination. By doing so, the two steps are simultaneously executed. Note that in the case where a value resulting on decoding the number data l(i) is stored instead of the number data l(i) and the decoded value is outputted as the repetitive data stream selecting signal Msel, the generating of an address corresponding to the combination of the signals Msel and c becomes easier.

Incidentally, in the aforementioned twelfth embodiment, the torque ripple corrective signal e is generated by using the corrective data stream stored in the torque ripple corrective memory 21a, but the method for generating the torque ripple corrective signal e is not limited to this, and it may be generated through a computing process, as is the case with a thirteenth embodiment of the present invention described below.

Figure 28:
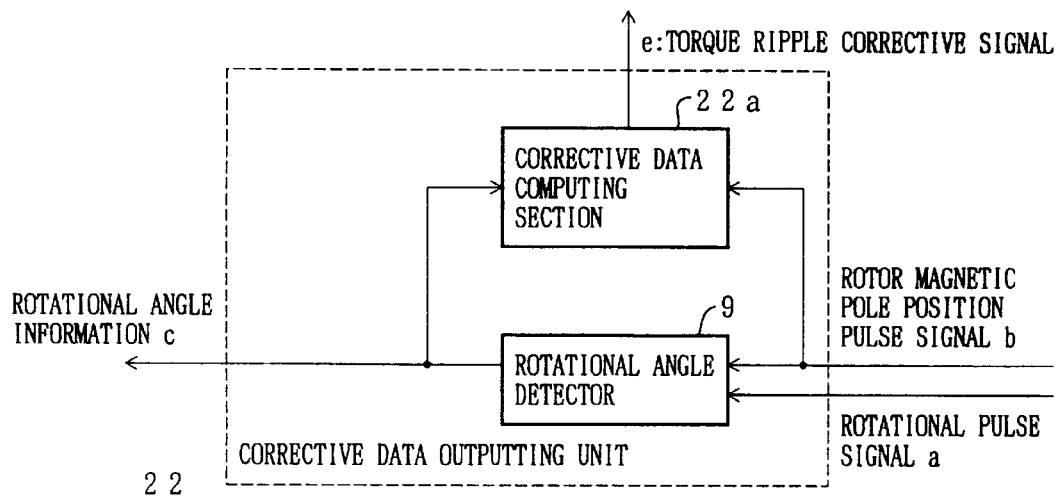
FIG. 28 is a block diagram of a corrective data outputting unit in accordance with a thirteenth embodiment of the present invention.

In the thirteenth embodiment, as illustrated in FIG. 28, a corrective data outputting unit 22 substituted for the corrective data outputting unit 21 is equipped with: the rotational angle detector 9 which is the same one as that in the twelfth embodiment; and a corrective data computing section 22a for generating a torque ripple corrective signal e whose cycles are proportional to the pulse intervals of the rotor magnetic pole position pulse signal b, based on the rotational angle information c and the rotor magnetic pole position pulse signal b. Note that the following description will explain the present embodiment by exemplifying a case where the torque ripple corrective signal e has a sinusoidal waveform in the same cycle as that of the pulse intervals of the rotor magnetic pole position pulse signal b. In this case, the torque ripple corrective signal e are set so as to in the same cycle as that of the pulse intervals, respectively.

Figure 29:
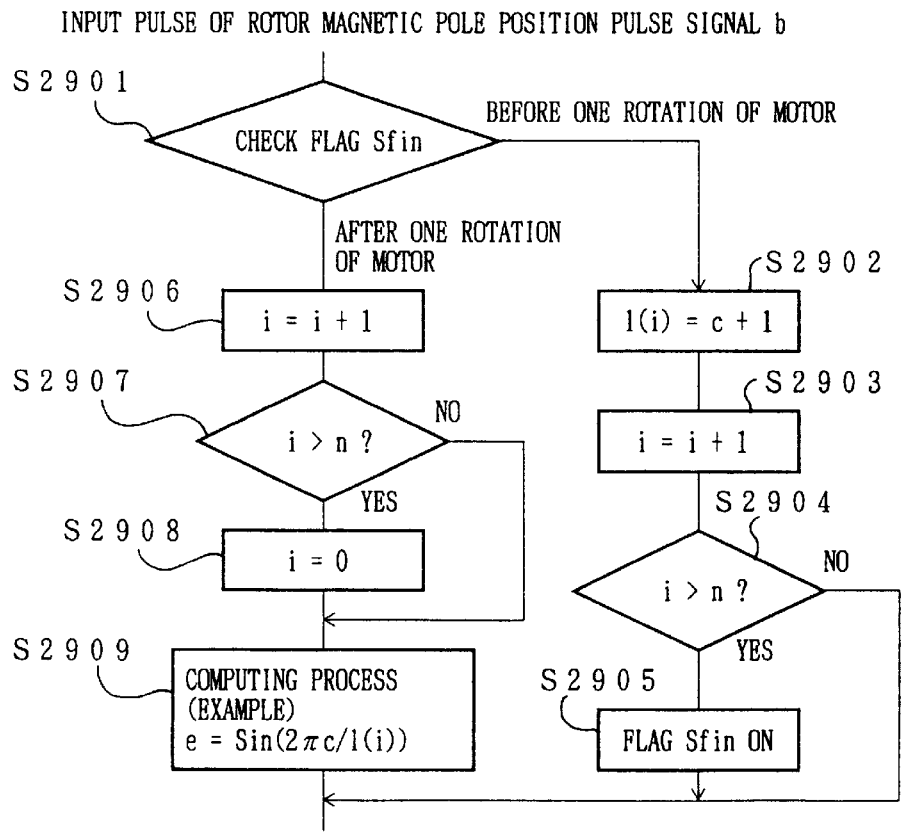
FIG. 29 is a flowchart showing an operation of a corrective data computing section in the thirteenth embodiment of the present invention.

In the case where the flag Sfin is OFF, that is, number data for one rotation of the motor have not been determined, the corrective data computing unit 22a conducts a number data determining operation through steps S2901 through S2905 shown in FIG. 29, as is carried out through the steps S2301 through S2305 shown in FIG. 23, and then, stores number data l(0), l(1), . . . l(n−1) for one rotation thus determined.

The moment the number data for one rotation are determined, the count of the counter i is set to a numeral indicating a current pulse interval (S2906 through S2908), as is done through the steps S2307 through S2309 shown in FIG. 23. Further, at S2909, the corrective data computing section 22a in accordance with the present embodiment computes the torque ripple corrective signal e through a predetermined computing process, based on the rotational angle information c and the number data l(i) corresponding to the count of the counter i. Here, since the torque ripple corrective signal e has the sinusoidal waveform in the same cycle as that of the pulse intervals, the torque ripple corrective signal e is expressed by an expression (9) below:

$$e = \mathrm{Sin}(2 \times \pi \times c / l(i)) \quad (9)$$

The process at S2909 is repeated every time the rotational angle information c is supplied, and the corrective data computing section 22a outputs, as the torque ripple corrective signal e, a sinusoidal wave which has a phase of 0[rad] the moment a pulse of the rotor magnetic pole position pulse signal b is inputted, and is in the same cycle as that of the pulse intervals.

Thus, the corrective data computing section 22a adjusts cycles of the torque ripple corrective signal e, based on the number data respectively corresponding to the pulse intervals previously detected. By doing so, it is possible to generate the torque ripple corrective signals e so as to correspond to the pulse interval, even in the case where the pulse interval of the rotor magnetic pole position pulse signal b varies. As a result, like in the twelfth embodiment, this allows the motor speed control device to conduct appropriate correction all the time, independently of pulse intervals, as illustrated in FIG. 27.

It should be noted that in the present embodiment, since the torque ripple corrective signal e is generated by computation, storage of a plurality of corrective data streams M is unnecessary, and hence, the memory capacity required of the corrective data outputting unit can be reduced, as compared with the twelfth embodiment.

Figure 30:
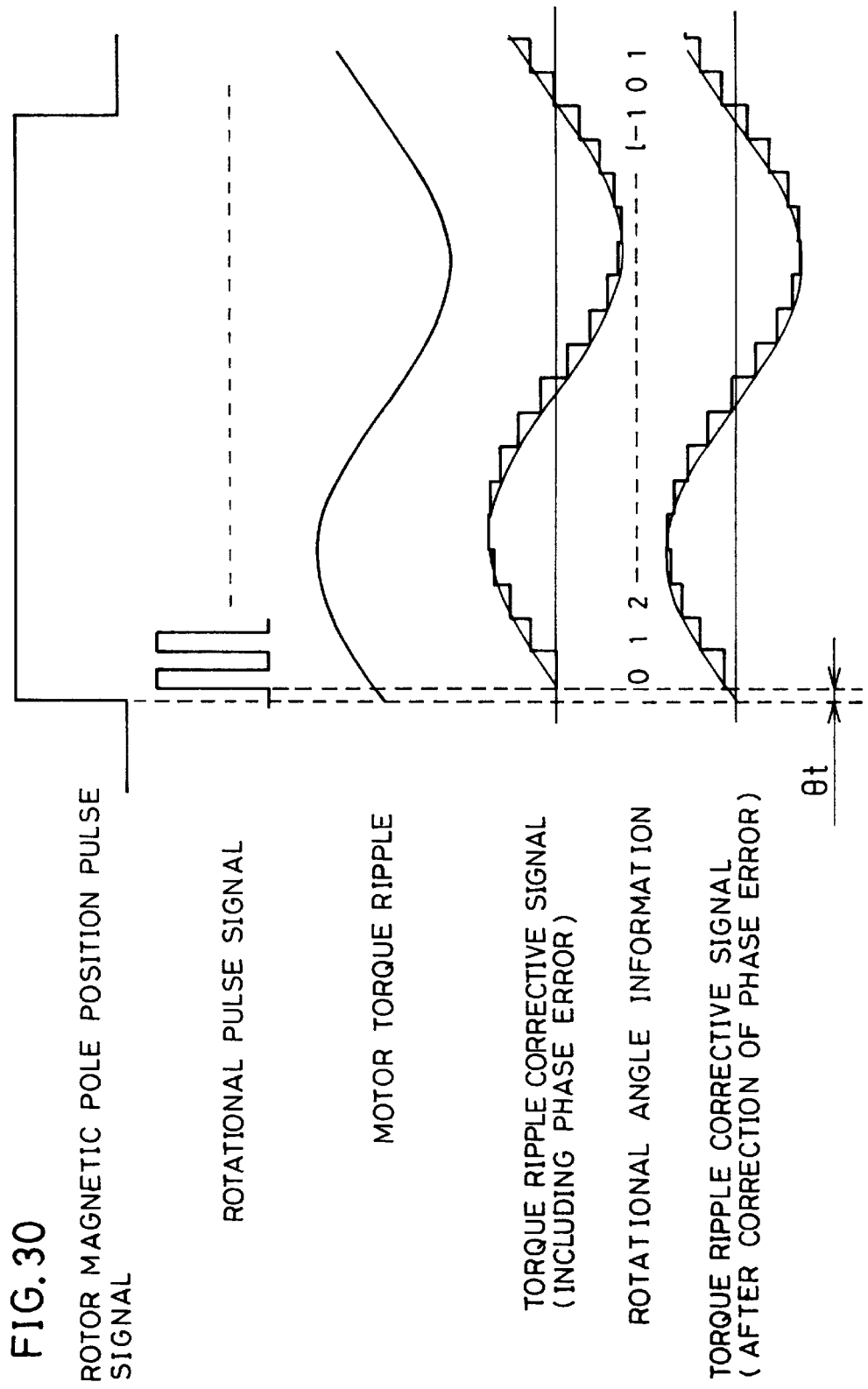
FIG. 30 is a waveform chart showing an operation in fourteenth and fifteenth embodiments of the present invention.

Incidentally, in the first through thirteenth embodiments, the rotational angle information c is renewed when a pulse of the rotational pulse signal a is inputted. Here, as illustrated in FIG. 30, there usually exists a time lag θt, between the moment a pulse of the rotor magnetic pole position pulse signal b is inputted and the moment a pulse of the rotational pulse signal a is inputted. Therefore, the torque ripple corrective signal e generated in accordance with the rotational angle information c has a phase lag in conformity with the time lag θt (hereinafter referred to as phase error θt) with respect to the motor torque ripple which occurs in synchronization with input of pulses of the rotor magnetic pole position pulse signal b, thereby impairing the precision in correcting torque ripples.

The phase error θt expands as one pulse interval of the rotational pulse signal a becomes longer, or as the number of pulses of the rotational pulse signal a during one rotation of the motor decreases. Therefore, the deterioration in the precision in correcting torque ripples due to the phase error θt sometimes becomes too great to neglect, particularly in a small motor in which to form many rotational pulse patterns is difficult.

Figure 31:
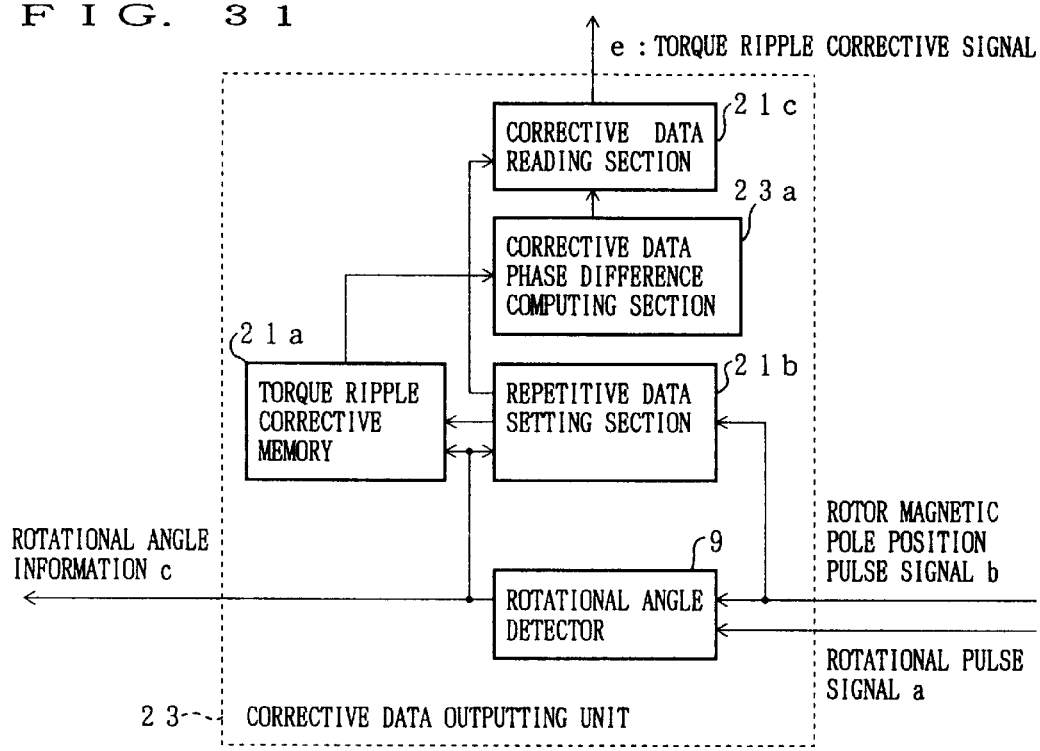
FIG. 31 is a block diagram of a corrective data outputting unit in accordance with the fourteenth embodiment of the present invention.

In contrast, a motor speed control device in accordance with a fourteenth embodiment of the present invention described below with reference to FIGS. 31 through 34 is capable of correcting the phase error θt and hence, further improving the precision in the correction. As illustrated in FIG. 31, a corrective data outputting unit 23 in accordance with the present embodiment is equipped with, in addition to the arrangement shown in FIG. 20, a corrective data phase difference computing section 23a for detecting a phase error θt between the rotational pulse signal a and the rotor magnetic pole position pulse signal b so as to correct the output of the torque ripple corrective memory 21a. Note that the members having the same structure (function) as those in the arrangement shown in FIG. 20 will be designated by the same reference numerals and their description will be omitted.

Figure 32:
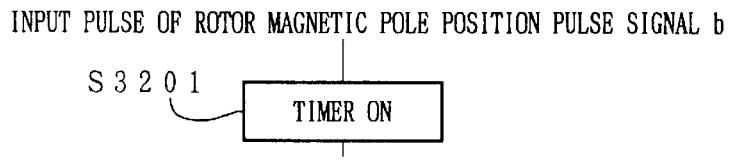
FIG. 32 is a flowchart showing an operation of a corrective data phase difference computing section in the fourteenth and fifteenth embodiments of the present invention the moment a pulse of the rotor magnetic pole position pulse signal is inputted.

The corrective data phase difference computing section 23a is equipped with a timer for measuring time in order to detect a phase error θt between the two pulse signals, and as illustrated in FIG. 32, the timer starts counting from 0 the moment a pulse of the rotor magnetic pole position pulse signal b is inputted. A count cycle of the timer is set sufficiently shorter than the pulse interval of the rotational pulse signal a, and after the input of the pulse, the count of the timer increases in the count cycle.

Figure 33:
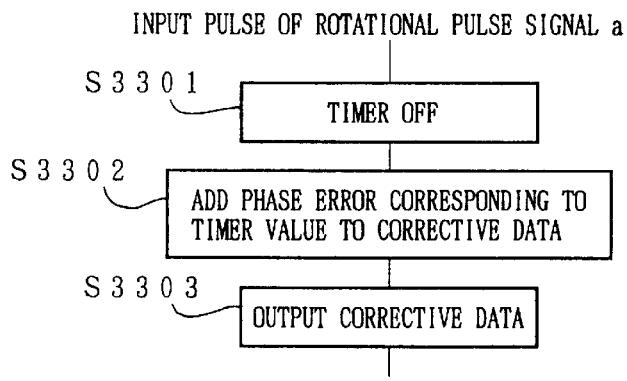
FIG. 33 is a flowchart showing an operation of the corrective data phase difference computing section in the fourteenth embodiment of the present invention the moment a pulse of the rotational pulse signal is inputted.

The moment the first pulse of the rotational pulse signal a since the above moment of the pulse input is inputted, the timer stops counting at S3301 as shown in FIG. 33. As a result, a time lag between the moment a pulse of the rotor magnetic pole position pulse signal b is inputted and the moment a pulse of the rotational pulse signal a is inputted is detected in a form of the count of the timer. Note that the count of the timer is held until a next pulse of the rotor magnetic pole position pulse signal b is inputted.

Subsequently, at S3302, the corrective data phase difference computing section 23a corrects the corrective data outputted by the torque ripple corrective memory 21a by using the phase error θt, and then, at S3303, sends it to the corrective data reading section 21c.

The following description will explain the correcting process at S3302 in detail, by exemplifying a case where a corrective data stream M can be approximated into a sinusoidal wave in the same cycle as that of the pulse intervals of the rotor magnetic pole position pulse signal b. Specifically, let the phase error indicated by the count be θt, and the number of the count values of the timer during a current pulse interval of the rotor magnetic pole position pulse signal b be θ, then, a phase error [rad] is expressed as $2 \times \pi \times (\theta t/\theta)$. Therefore, in the case where the corrective data stream M is approximated into the sinusoidal wave, an error Δe in the corrective data which occurs due to the phase error is expressed by an expression (10) below:

$$\Delta e = \mathrm{Sin}[2 \times \pi \times \{c/l(i)+(\theta t/\theta)\}] - \mathrm{Sin}[2 \times \pi \times \{c/l(i)\}] \quad (10)$$

The corrective data phase difference computing section 23a corrects the corrective data by adding the corrective data error Δe thereto.

The total number θ can be computed by, for example, reading out number data l(i) corresponding to a current pulse interval from the repetitive data setting section 21b, and multiplying the number data l(i) by a ratio of a pulse interval of the rotational pulse signal a to a count width of the timer. Alternatively, like the number data l(i), the total number θ may be detected and stored as to every pulse interval of the rotor magnetic pole position pulse signal b. By actually measuring the total numbers θ respectively corresponding to the pulse intervals, the detection of the same becomes more accurate, thereby improving the precision in the correction. Note that the measurement of the total number θ can be carried out simultaneously with the number data determining operation or the like. Therefore, a period of time until the motor speed control device becomes ready to correct a torque ripple by no means alters due to measurement of the total number θ.

The steps S3302 and S3303 are repeated at every input of a pulse of the rotational pulse signal a, and the corrective data phase difference computing section 23a corrects the corrective data based on the total number θ of count values of the timer in the current pulse interval of the rotor magnetic pole position pulse signal b, the phase error θt, and the rotational angle information c. By doing so, as illustrated in FIG. 30, the phase of the torque ripple corrective signal e is made to coincide with the phase of the motor torque ripple, independently of a phase error θt between the pulse signals a and b, thereby allowing the motor speed control device to control the motor rotational speed with higher precision.

Incidentally, in the aforementioned fourteenth embodiment, the torque ripple corrective signal e is generated by using the corrective data stream stored in the torque ripple corrective memory 21a, but the method for generating the torque ripple corrective signal e is not limited to this. The torque ripple corrective signal e may be generated through a computing process, as is the case with the aforementioned thirteenth embodiment. This method is applied to a fifteenth embodiment of the present invention which is described below.

Figure 34:
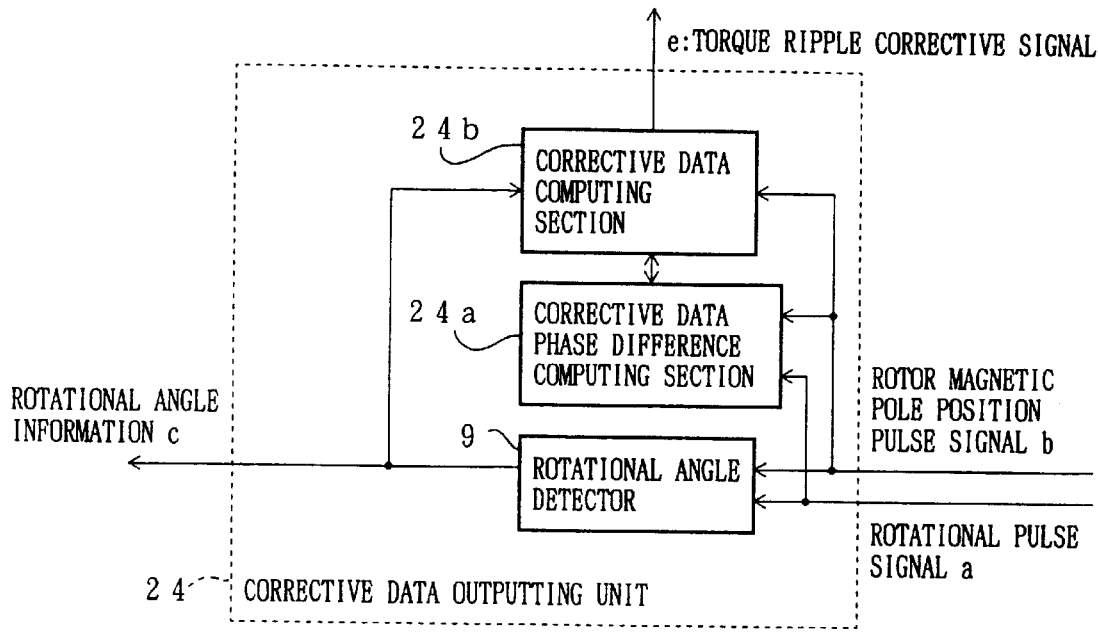
FIG. 34 is a block diagram of a corrective data outputting unit in accordance with the fifteenth embodiment of the present invention.

As illustrated in FIG. 34, a corrective data outputting unit 24 in the fifteenth embodiment is equipped with: the rotational angle detector 9 which is the same one as that shown in FIG. 20; a corrective data phase difference computing section 24a for detecting the phase error θt; and a corrective data computing section 24b for computing a torque ripple corrective signal e after correction of the phase error θt.

The corrective data phase difference computing section 24a carries out an operation shown in FIG. 32, and starts a timer for measuring time elapse, at every input of a pulse of the rotor magnetic pole position pulse signal b. A count cycle of the timer is set sufficiently shorter than the pulse interval of the rotational pulse signal a, and a count of the timer is set to 0 at pulse input of the rotor magnetic pole position pulse signal b, and is increased in the above count cycle.

Figure 35:
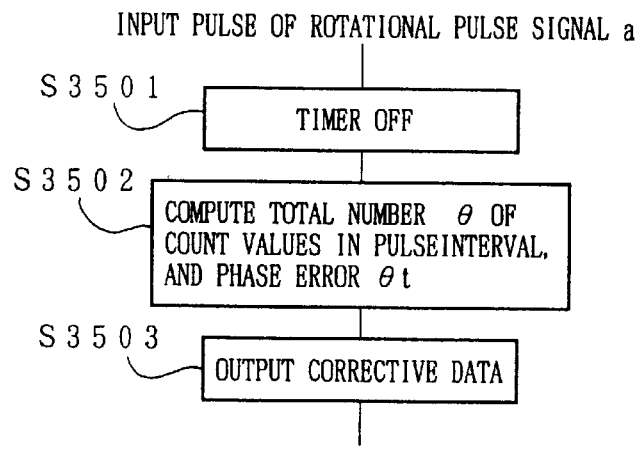
FIG. 35 is a flowchart showing an operation of the corrective data phase difference computing section in the fifteenth embodiment of the present invention the moment a pulse of the rotational pulse signal is inputted.

The moment the first pulse of the rotational pulse signal a since the above moment of the pulse input is inputted, the timer stops counting at S3501 as shown in FIG. 35. As a result, a time lag between the moment a pulse of the rotor magnetic pole position pulse signal b is inputted and the moment a pulse of the rotational pulse signal a is inputted, that is, a phase error θt, is detected in a form of the count of the timer. Subsequently, the corrective data phase difference computing section 24a computes a total number of count values of the timer in the current pulse interval (S3502), as the corrective data phase difference computing section 23a does. The values of θ and θt are supplied to the corrective data computing section 24b at S3503. Note that the period of time while the timer is counting is a period of time from the moment a pulse of the rotor magnetic pole position pulse signal b is inputted until the moment a pulse of the rotational pulse signal a is inputted. While rest pulses of the rotational pulse signal a are being inputted, computation of a phase error θt and the like is carried out, based on the detected count value.

Figure 36:
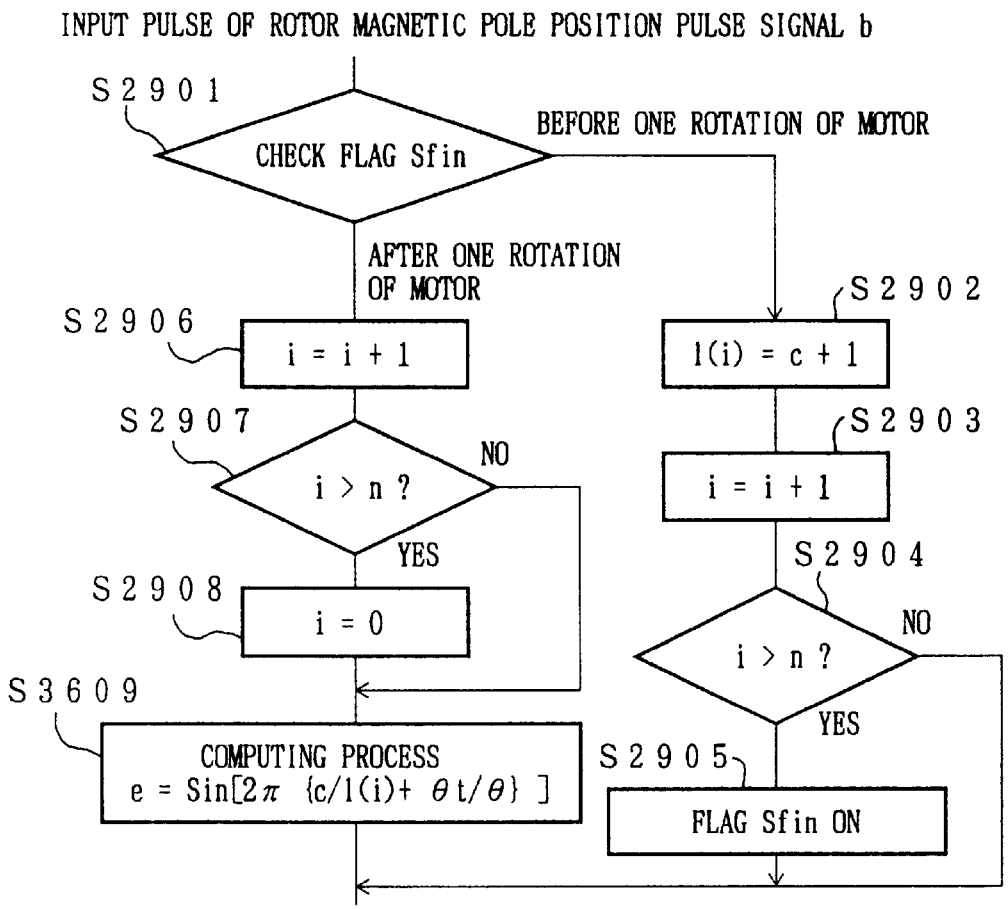
FIG. 36 is a flowchart showing an operation of a corrective data computing section in the fifteenth embodiment of the present invention.

On the other hand, as illustrated in FIG. 36, the corrective data computing section 24b carries out the same operation as that illustrated in FIG. 29, to output the torque ripple corrective signal e. Note that since the corrective data computing section 24b in accordance with the present embodiment corrects the phase error θt, a process at S3609 is carried out instead of the process at S2909 shown in FIG. 29. As described above, the present embodiment is described by exemplifying a case where the torque ripple corrective signal e has a sinusoidal waveform in the same cycle as that of the pulse intervals of the rotor magnetic pole position pulse signal b. Therefore, let the number data corresponding to the current pulse interval be l(i), and the torque ripple corrective signal e computed through the above process of S3609 at every input of the rotational angle information c is expressed by an expression (11) below:

$$e = \mathrm{Sin}[2 \times \pi \times \{c/l(i)+(\theta t/\theta)\}] \quad (11)$$

As a result, the corrective data outputting unit 24 is made capable of outputting the torque ripple corrective signal e with its phase made coincident with the phase of the motor torque ripple, independently of the phase error θt between the pulse signals a and b, as illustrated in FIG. 30. Therefore, as is the case with the aforementioned fourteenth embodiment, precise torque ripple correction can be realized.

It should be noted that in the thirteenth (fourteenth) embodiment, the corrective data phase difference computing section 23a (24a) determines the phase error θt by actual measurement, but a predetermined value may be instead used as the phase error θt. The substantially same effect can be achieved in the case where the corrective data phase difference computing section 23a (the corrective data computing section 24b) outputs a torque ripple corrective signal e whose level is corrected so that an error occurring due to the phase error θt is cancelled. However, more precise correction with respect to the corrective data can be achieved by determining the phase error θt by actual measurement as the corrective data phase difference computing sections 23a and 24a in accordance with the embodiments do, and by doing so, the motor speed control device is made to control the motor rotational speed with higher precision.

Incidentally, the above description of the fourteenth and fifteenth embodiments explains the motor speed control device which is capable of correcting the phase error θt which originates in a time lag between the moment a pulse of the rotor magnetic pole position pulse signal b is inputted and the moment a pulse of the rotational pulse signal a is inputted.

Figure 37:
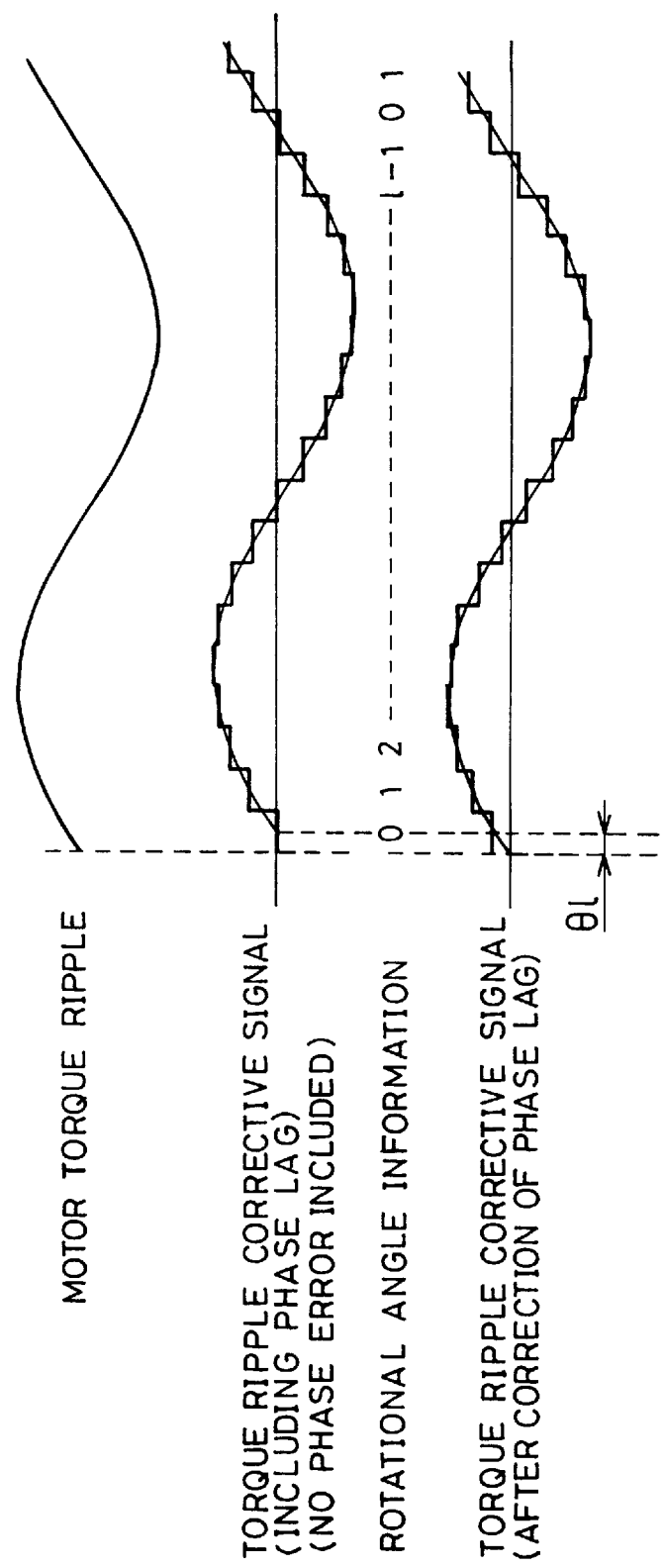
FIG. 37 is a waveform chart showing an operation in sixteenth and seventeenth embodiments of the present invention.

However, since the corrective data outputting units 21 through 24 digitally operate and renew the level of the torque ripple corrective signal e at every input of the rotational angle information c, the torque ripple corrective signal e thus generated has a phase lag θl with respect to the torque ripple, as illustrated in FIG. 37, even though no phase error θt exists.

To be more specific, the torque ripple corrective signal e is dispersedly generated in a time direction, and in the case where the corrective data outputting units 21 through 24 are expressed in a transfer function, a lag factor stemming from a zeroth-order delay due to data holding is included therein, thereby causing the phase lag θl. A length of the phase lag θl is ½ of a hold time of the torque ripple corrective signal e (½ of a pulse interval of the rotational pulse signal a). Therefore, the phase lag θl expands as one pulse interval of the rotational pulse signal a becomes longer, or as the number of pulses of the rotational pulse signal a during one rotation of the motor decreases. As a result, the deterioration in the precision in correction, which arises from the phase lag θl, sometimes becomes too great to neglect, particularly in a small motor in which to form many rotational pulse patterns is difficult.

Figure 38:
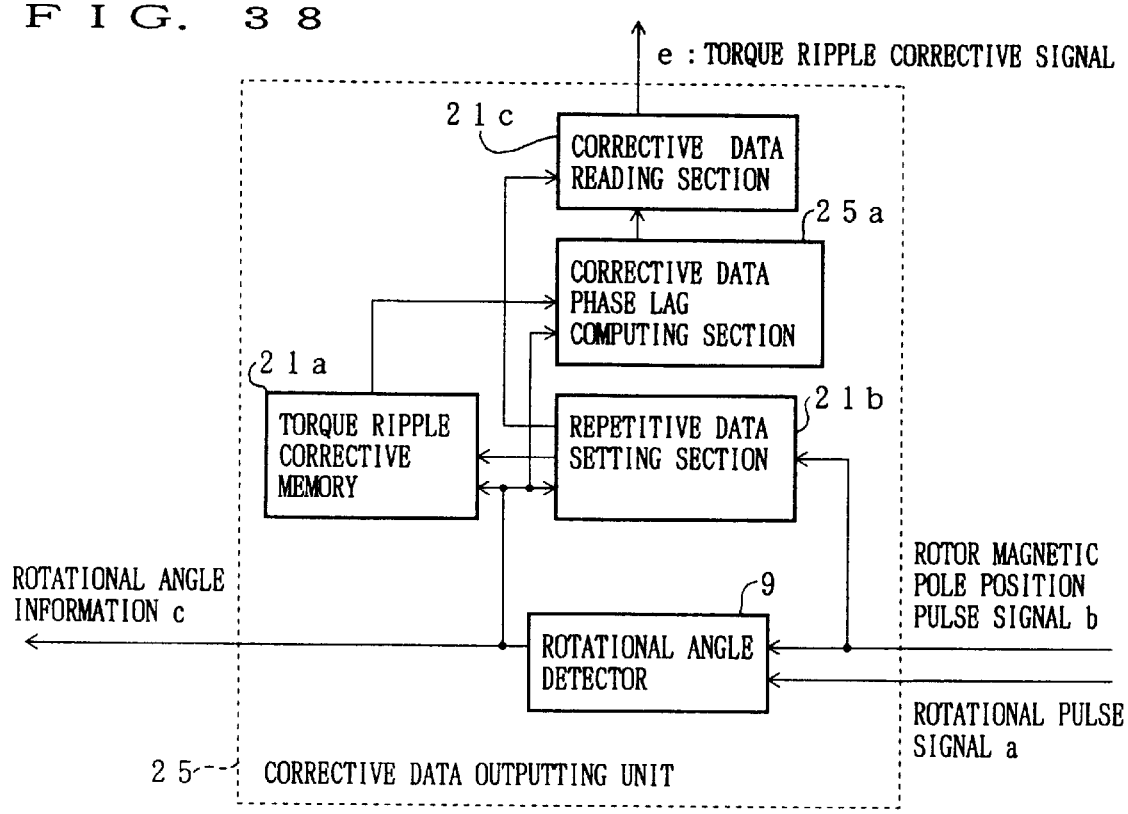
FIG. 38 is a block diagram of a corrective data outputting unit in accordance with the sixteenth embodiment of the present invention.
Figure 39:
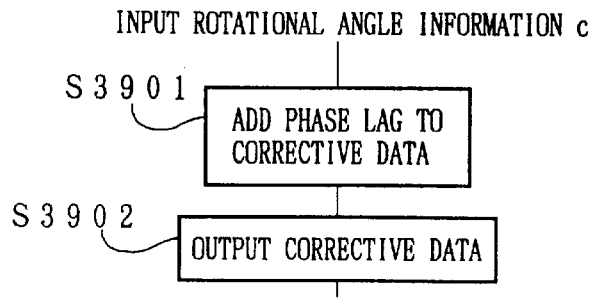
FIG. 39 is a flowchart showing an operation of a corrective data phase lag computing section in the sixteenth embodiment of the present invention.

In contrast, a motor speed control device in accordance with a sixteenth embodiment of the present invention described below with reference to FIGS. 37 through 39 is capable of correcting the phase lag θl and further improving the precision in the correction. As illustrated in FIG. 38, a corrective data outputting unit 25 in accordance with the present embodiment is equipped with, in addition to the arrangement shown in FIG. 20, a corrective data phase lag computing section 25a for correcting the output of the torque ripple corrective memory 21a, based on the phase lag θl which has been computed from a pulse interval of the rotational pulse signal a. Note that the members having the same structure (function) as those in the arrangement shown in FIG. 20 will be designated by the same reference numerals and their description will be omitted.

As illustrated in FIG. 39, the corrective data phase lag computing section 25a is supplied with the rotational angle information c, and at every output of new corrective data by the torque ripple corrective memory 21a (S3901), and it corrects the corrective data by adding an error Δe due to the phase lag θl to the corrective data. Then, it outputs the corrective data thus corrected (S3902). The phase lag θl is computed so as to be 0.5 time a pulse interval of the rotational pulse signal a.

The following description will explain the correcting process at S3901 in more detail, by exemplifying a case where a corrective data stream M can be approximated into a sinusoidal wave in the same cycle as that of the pulse intervals of the rotor magnetic pole position pulse signal b. Specifically, let the number data corresponding to the current pulse interval of the rotor magnetic pole position pulse signal b be l(i), and the phase lag θl[rad] is expressed by an expression (12) below:

$$\theta l = 2 \times \pi / \{2 \times l(i)\} \tag{12}$$

Therefore, the error Δe of the corrective data stream stemming from the phase lag θl is expressed by an expression (13) below:

$$\Delta e = \mathrm{Sin}[2 \times \pi \times \{c/l(i)\} + \theta l] - \mathrm{Sin}[2 \times \pi \times \{c/l(i)\}] \tag{13}$$

Furthermore, the corrective data phase lag computing section 25a corrects the corrective data by adding the corrective data error Δe thereto. Note that the corrective data error Δe may not be determined by computation by the use of the above approximation expression, but a value corresponding to a combination of the rotational angle information c, the number data l(i), and the phase lag θl may be stored and read out when necessary.

The steps S3901 and S3902 are repeated at every input of a pulse of the rotational pulse signal a. The corrective data phase lag computing section 25a computes the phase lag θl from the number data l(i) corresponding to the current pulse interval of the rotor magnetic pole position pulse signal b, and corrects the corrective data based on the phase lag θl and the rotational angle information c. By doing so, as illustrated in FIG. 37, the phase lag θl stemming from the zeroth-order delay du to data holding is eliminated, and the phase of the torque ripple corrective signal e as a result of the phase lag correction is made to coincide with the phase of the motor torque ripple. As a result, the motor speed control device is made to control the motor rotational speed with further higher precision.

The above description explains the sixteenth embodiment by exemplifying the case where the torque ripple corrective signal e is generated by using the corrective data streams M, but the following description will explain a seventeenth embodiment by exemplifying a case where the torque ripple corrective signal e is generated by computation, like in the fifteenth embodiment.

Figure 40:
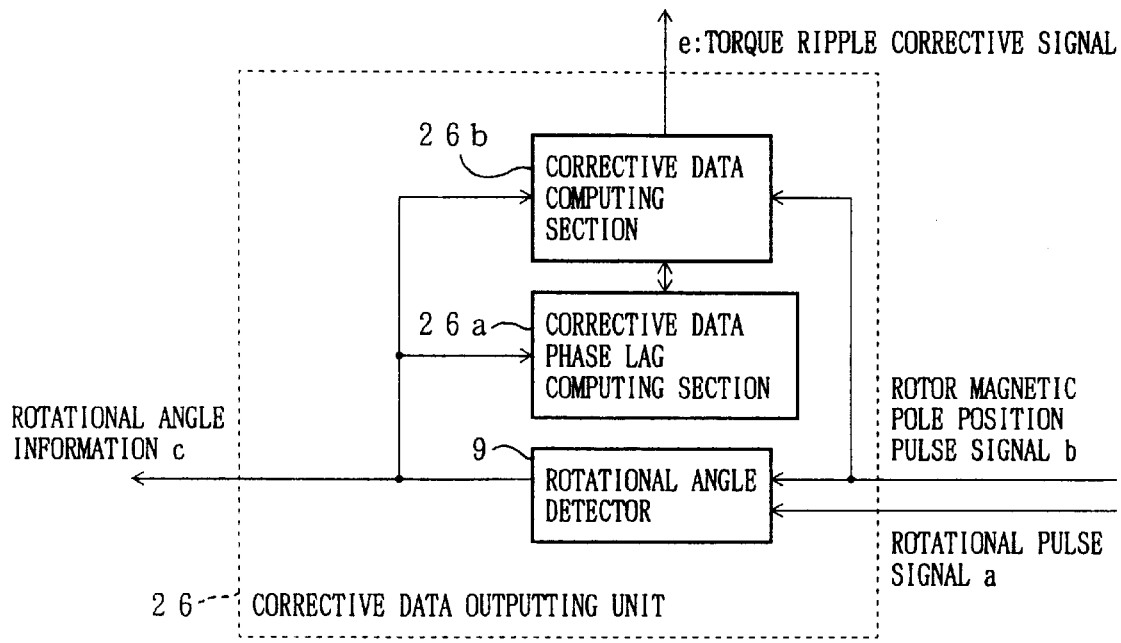
FIG. 40 is a block diagram of a corrective data outputting unit in the seventeenth embodiment of the present invention.

Specifically, as illustrated in FIG. 40, a corrective data outputting unit 26 in accordance with the present embodiment is equipped with: the rotation angle detector 9 which is the same one as that shown in FIG. 20; a corrective data phase lag computing section 26a for detecting the phase lag θl; and a corrective data computing section 26b for computing a torque ripple corrective signal e as a result of correction with use of the phase lag θl.

Figure 41:
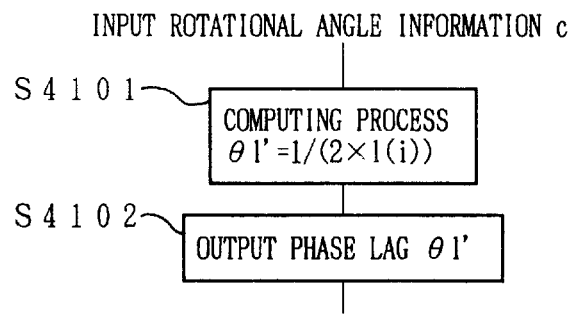
FIG. 41 is a flowchart showing an operation of a corrective data phase lag computing section in the seventeenth embodiment of the present invention.

The corrective data phase lag computing section 26a carries out a process shown in FIG. 41 the moment a pulse of the rotational pulse signal a is inputted, computes a phase lag θl (S4101), and outputs the phase lag θl (S4102).

Figure 42:
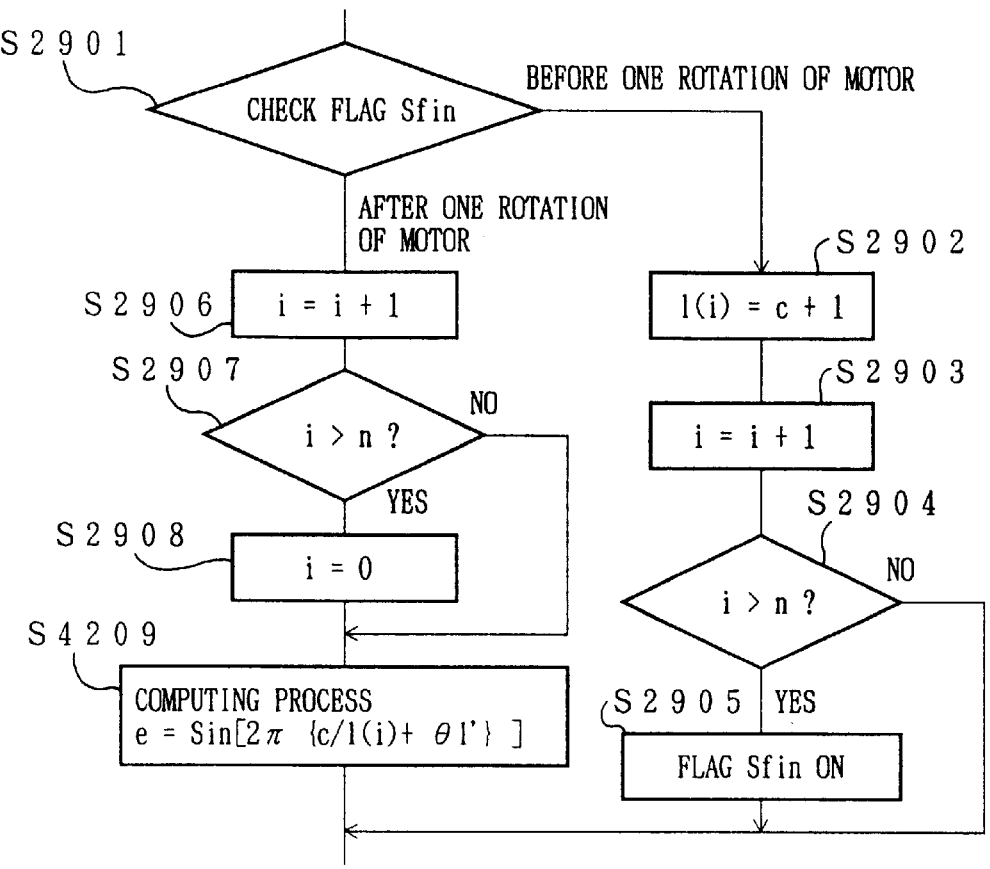
FIG. 42 is a flowchart showing an operation of a corrective data computing unit in the seventeenth embodiment of the present invention.

On the other hand, as illustrated in FIG. 42, the corrective data computing section 26b carries out the substantially same operation as that shown in FIG. 29, and generates the torque ripple corrective signal e. Note that in the present embodiment, at S4209 which substitutes for S2909 shown in FIG. 29, the torque ripple corrective signal e as a result of the correction with the use of the phase lag θl is outputted.

Here, as is the case with the above embodiments, assume that the torque ripple corrective signal e has a sinusoidal waveform in the same cycle as that of the pulse intervals of the rotor magnetic pole position pulse signal b. In this case, the computing processes at S4101 and S4209 are expressed by expressions (14) and (15) below, respectively:

$$\theta l' = 1/\{2 \times l(i)\} \quad (14)$$

$$e = \operatorname{Sin}[2 \times \pi \times \{c/l(i) + \theta l'\}] \quad (15)$$

Note that in the above expressions (14) and (15), a value $\theta l'$ which is $1/(2 \times \pi)$ times the phase lag $\theta l$ is computed, instead of the phase lag $\theta l$, so as to reduce a quantity of computation.

By doing so, as illustrated in FIG. 37, the corrective data outputting unit 26 in accordance with the present embodiment is capable of eliminating the phase lag $\theta l$ stemming from the zeroth-order delay due to data holding, and making the phase of the torque ripple corrective signal e as a result of the phase lag correction coincide with the phase of the motor torque ripple. As a result, the motor speed control device is made to control the motor rotational speed with further higher precision.

Note that in the above sixteenth and seventeenth embodiments, the corrective data phase lag computing section 25a (26a) computes the phase lag $\theta l$ corresponding to ½ of a pulse interval of the rotational pulse signal a based on the number data l(i) which respectively correspond to pulse intervals of the rotor magnetic pole position pulse signal b, but, a predetermined constant value may be used, instead of the phase lag $\theta l$. The substantially same effect can be achieved in the case where the torque ripple corrective signal e is made to have a phase so that a phase delay occurring due to the zeroth-order delay due to data holding is cancelled. However, the phase lag $\theta l$ of the motor may be more precisely determined by computing the phase lag $\theta l$ as in the above embodiments, and by doing so, the motor speed control device is made to control the motor rotational speed with higher precision.

The description on the above two embodiments explain the case a member for correcting a phase lag such as the corrective data phase lag computing section 25a (26a) is added to the arrangement in accordance with the twelfth or thirteenth embodiment, but such a member may be added to the arrangement of the fourteenth or fifteenth embodiment. In this case, both errors in the corrective data stemming from the phase error $\theta t$ and the phase lag $\theta l$ are eliminated, thereby resulting in that the motor speed control device is made to control the motor rotational speed with higher precision. Note that the corrective data or the torque ripple corrective signal e may be preferably corrected by first computing a sum of the phase error $\theta t$ and the phase lag $\theta l$, and then, cancelling the error originating in the sum of them, so that a quantity of computation is reduced.

Furthermore, in the fourteenth through seventeenth embodiments, a sinusoidal wave in the same cycle as that of the pulse intervals of the rotor magnetic pole position pulse signal b is given as an example of the torque ripple corrective signal e or its approximation expression. But the torque ripple corrective signal e should not be limited to this, and any desired expression may be used. By altering the expressions (10) through (15) in conformity with the desired expression, the same effect as that of the above embodiments can be achieved.

Incidentally, the descriptions on the twelfth through seventeenth embodiments explain the case where a member for adjusting the cycle or the phase of the torque ripple corrective signal e is added to the arrangement of the first embodiment. However, the member may be added to the arrangement wherein the method for determining the rotor magnetic pole position pulse signal b and the method for setting the amplitude of the torque ripple corrective signal are different from those in the first embodiment, such as the arrangements of the second through eleventh embodiments.

Figure 43:
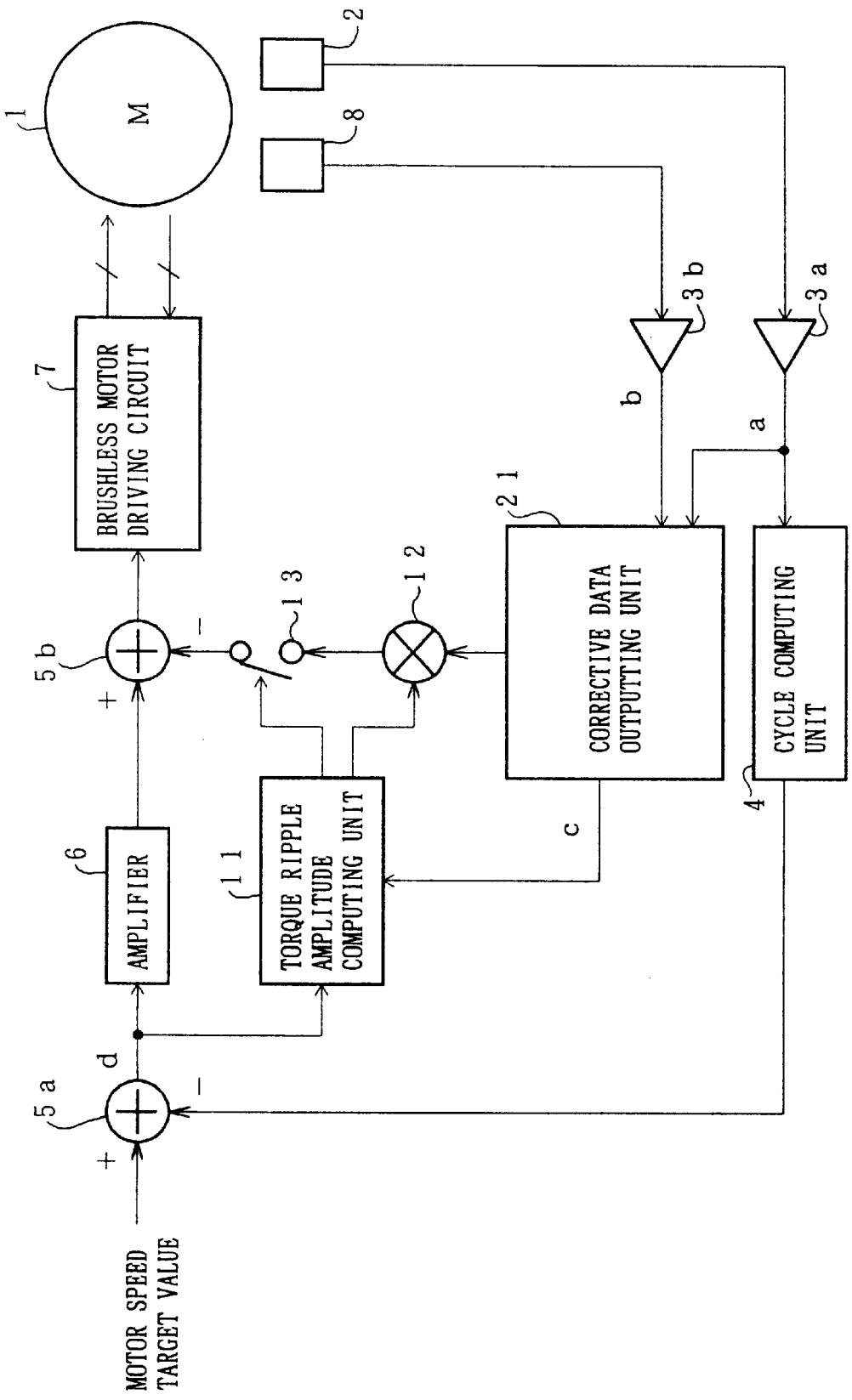
FIG. 43 is a block diagram of an arrangement of essential parts of a motor speed control device in accordance with another embodiment of the present invention.

For example, assume that the twelfth through seventeenth embodiments are applied to the arrangement as shown in FIG. 7, and an arrangement shown in FIG. 43 is obtained. In this arrangement, the amplitude of the torque ripple corrective signal supplied to the subtractor 5b is adjusted in accordance with the amplitude of the torque ripple of the motor. Therefore, the motor speed control device is made to control the motor rotational speed with further higher precision.

Figure 44:
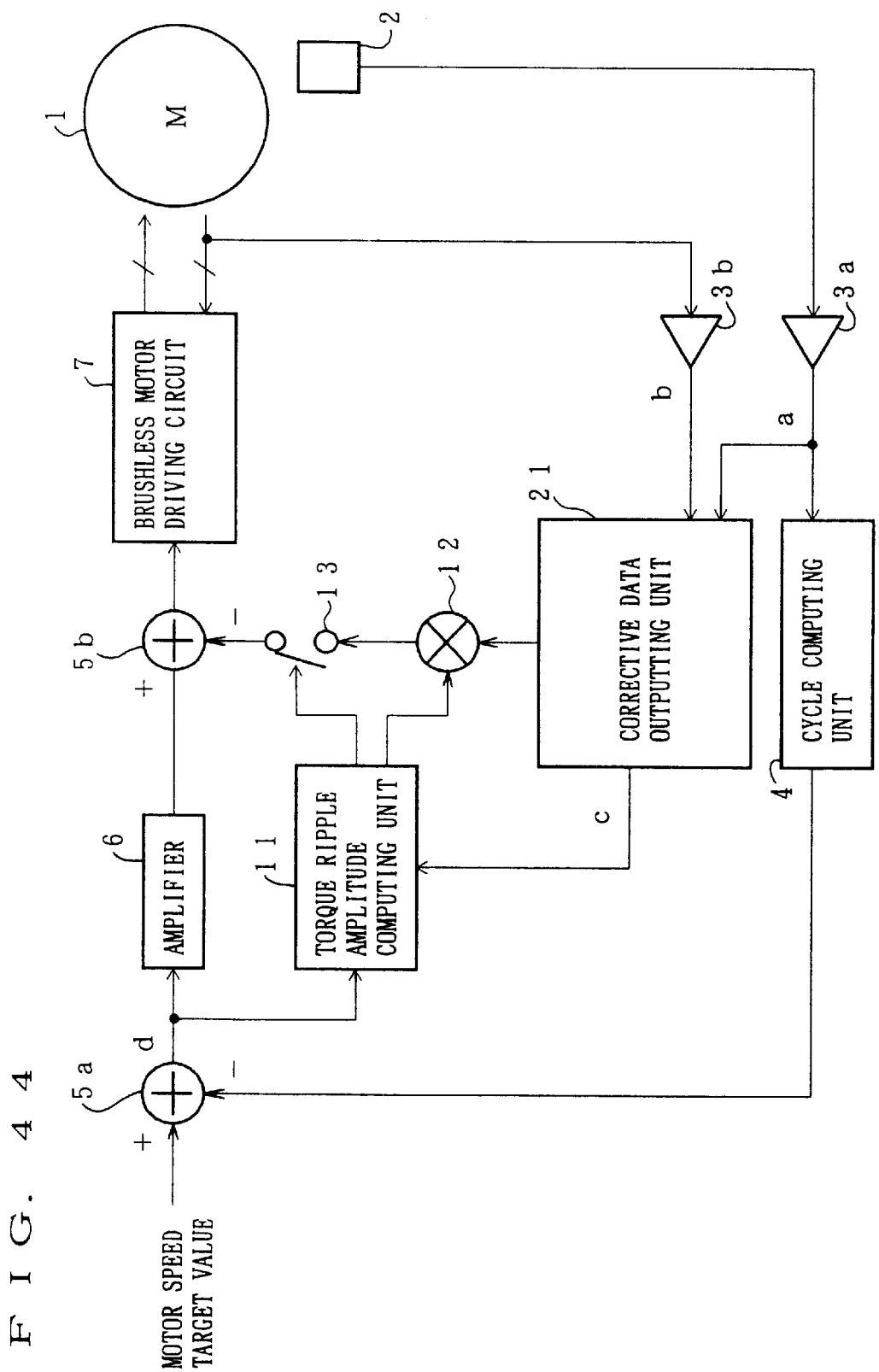
FIG. 44 is a block diagram of an arrangement of essential parts of a motor speed control device in accordance with still another embodiment of the present invention.

Furthermore, in the case where in the arrangement of FIG. 43, the rotor magnetic pole position pulse signal b is generated in accordance with the excitation switching timing detection signals, like in the second embodiment, an arrangement shown in FIG. 44 is obtained. In this arrangement, one of a plurality of the excitation switching timing detection signals detected when the motor 1 is driven is reshaped by the waveform shaping circuit 3b, thereby becoming the rotor magnetic pole position pulse signal b. The excitation switching timing detection signal is an indispensable signal for driving the motor, and is generated by, for example, a sensor such as a Hall sensor. By generating the rotor magnetic pole position pulse signal b from the excitation switching timing detection signal, a pulse signal in synchronization with the rotor magnetic positions, that is, in synchronization with the motor torque ripple, can be generated, without providing an additional sensor. As a result, the phase of the motor torque ripple is identified, and therefore, the number of circuit parts of the motor speed control device can be decreased without impairing the effect of the motor torque ripple correction.

Figure 45:
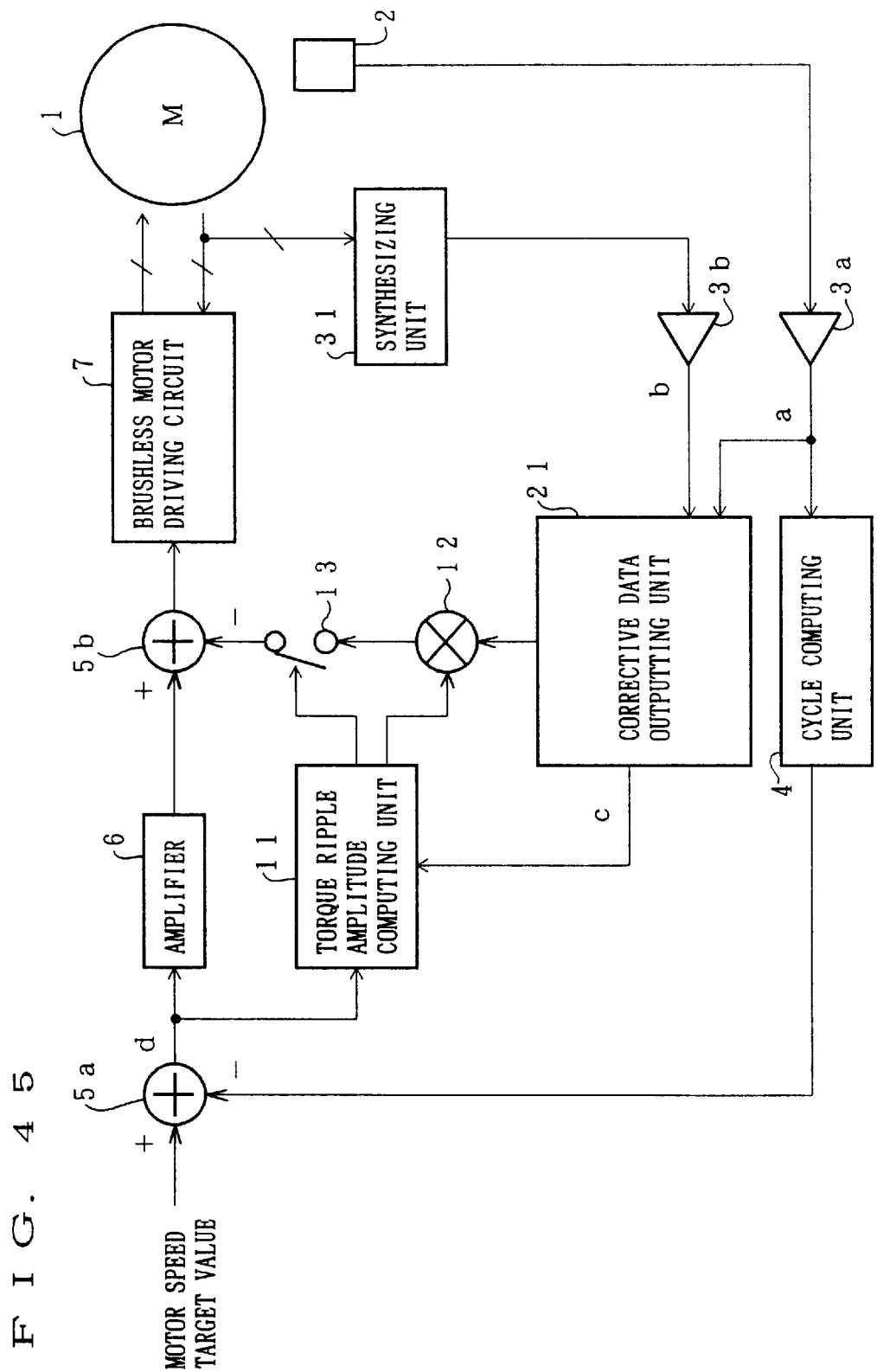
FIG. 45 is a block diagram of an arrangement of essential parts of a motor speed control device in accordance with still another embodiment of the present invention.

Furthermore, as shown in FIG. 45, a synthesizing unit 31 for synthesizing a plurality of the excitation switching timing detection signals and applying it to the waveform shaping circuit 3b is preferably added to the arrangement of FIG. 44.

As described above, in the motor torque ripple, a component thereof the number of whose appearance during one rotation of the motor is a minimum common multiple of the number of the rotor magnetic poles and the number of the motor coils often has a great amplitude. Here, there are usually provided the same number of the excitation switching timing detection signals as the number of phases of the motor. Therefore, by synthesizing the excitation switching timing detection signals, the a synthesizing unit 31 generates the rotor magnetic pole position pulse signal b having pulse intervals in the same cycle as that of the above component of the motor torque ripple. As a result, the motor speed control device is made to more effectively eliminate the motor torque ripple.

It should be noted that in the arrangements of FIGS. 44 and 45, the excitation switching timing detection signals or the signal outputted by the synthesizing unit 31 may be used without alternation as the rotor magnetic pole position pulse signal b, in the case where their waveforms are well-regulated. In such a case, the waveform shaping circuit 3b can be omitted, thereby allowing further decrease in the number of circuit parts.

As has been so far described, the motor speed control device of the present invention, for controlling a rotational speed of a polyphase brushless motor, is characterized in comprising (1) rotational angle detecting means for detecting rotational angle information indicating a rotational angle of the motor, based on (i) a rotor magnetic pole position pulse signal and (ii) a rotational pulse signal, and (2) a torque ripple memory for preliminarily storing a sinusoidal wave data stream for correcting a torque ripple of the motor. The rotor magnetic pole position pulse signal has n pulses per one rotation of the motor (n is an integer satisfying n>1 and an integral multiple of the number of driving magnetic poles of the motor), and the rotational pulse signal has m pulses per one rotation of the motor (m is an integer satisfying m>n). In this motor speed control device, the rotational angle information is used as an access address for reading out the torque ripple corrective memory. A sinusoidal wave data stored in the torque ripple corrective memory which corresponds to the access address is read out, and the sinusoidal wave data is used as the torque ripple corrective signal and is add-subtracted with respect to the motor control signal for controlling the motor rotational speed.

With the above arrangement, the fluctuation of the motor rotational speed due to the ripple of the motor torque on the motor coil excitation switching cycle, namely, the motor torque ripple, can be surely corrected and eliminated, thereby allowing stable and precise control of the motor rotational speed. It should be noted that, though needless to say, the same effect can be achieved by using a cosine wave data stream instead of the sinusoidal wave data stream.

In addition to the above arrangement, the rotor magnetic pole position pulse signal is preferably a motor coil excitation switching signal used for driving the motor. Alternatively, the rotor magnetic pole position pulse signal is a signal found from a back electromotive voltage at motor driving coils. No one of these arrangements of the motor speed control devices particularly requires a motor magnetic pole position detector, and hence further reduction of costs and reduction of circuitry scale is achieved with these arrangements.

Here, in the case where the rotor magnetic pole position pulse signal is generated with the use of the motor coil excitation switching signal, a synthesizing unit for synthesizing a plurality of excitation switching timing detection signals is preferably provided. Usually, in the motor torque ripple, a component thereof the number of times of whose appearance during one rotation of the motor is a least common multiple of the number of the rotor magnetic poles and the number of the motor coils has a great amplitude. The aforementioned synthesizing unit is capable of generating a rotor magnetic pole position pulse signal with the same cycle as that of the component, thereby enabling more effective suppression of the motor torque ripple.

Furthermore, it is preferably that m, representing the number of pulses of the rotational pulse signal per one rotation of the motor, is an integral multiple of n, n representing the number of pulses of the rotor magnetic pole position pulse signal per one rotation of the motor. With the above arrangement, the phase of the rotational pulse signal when a pulse of the rotor magnetic pole position pulse signal is applied is the same all the time, since the rotational pulse signal and the rotor magnetic pole position pulse signal synchronize with each other. Therefore, the torque ripple generated in synchronization with the excitation switching cycle is surely corrected.

Incidentally, the number of times the sinusoidal wave data stream stored in the torque ripple corrective memory may be repeated per one rotation of the motor is set to a least common multiple of the number of motor coils and the number of driving magnetic poles of the motor. As described above, usually, in the torque ripple, a component of the torque ripple, the number of times of whose appearance per one rotation of the motor is a least common multiple of the number of the coils and the number of the rotor magnetic poles, occurs at a degree greater than the others. Therefore, with the above arrangement, the component of the greatest degree in the torque ripple is surely removed.

Besides, the sinusoidal wave data stream stored in the torque ripple corrective memory may be a data stream resulting on synthesis of a plurality of sinusoidal wave data streams differing in at least either cycle or phase. Usually, in the torque ripple, other than the above least common multiple component, there also appear components the number of times of whose appearance per one rotation of the motor is an integral multiple of the number of the rotor magnetic poles, and the like. Therefore, synthesizing a plurality of sinusoidal wave data streams differing in either cycle or phase and storing it in the torque ripple corrective memory, the torque ripple is further suppressed.

On the other hand, the motor speed control device of the present invention more preferably further comprises a torque ripple corrective amplitude computing unit for extracting a component having the same frequency as that of the torque ripple corrective signal, from the speed error signal found from a difference between the target value of the motor rotational speed and the motor speed information found from the rotational pulse signal, then, detecting an amplitude thereof, and computing the amplitude information of the torque ripple corrective signal based on the amplitude thus detected. By the torque ripple corrective amplitude computing unit, the amplitude information and the sinusoidal wave data read out from the torque ripple corrective memory are multiplied together so that the torque ripple corrective signal is found.

Furthermore, the motor speed control device of the present invention preferably further comprises a torque ripple amplitude computing unit for taking in speed error information of a rotational angle corresponding to a maximum amplitude or a minimum amplitude of the torque ripple corrective signal y times (y is an integer satisfying y>1), then, detecting an amplitude by integrating and averaging the taken-in information, and computing amplitude information of the torque ripple corrective signal from the amplitude thus detected. The torque ripple corrective signal is found by multiplying the sinusoidal wave data read out from the torque ripple corrective memory and the amplitude information together.

Moreover, the motor speed control device of the present invention is preferably arranged so that y, representing the number of times an integrating operation is repeated until a mean value is found, is an integral multiple of the number of times the integrating operation is repeated per one rotation of the motor.

Besides, the amplitude information may be changed in accordance with an average speed of the motor.

Furthermore, the motor speed control device of the present invention may further comprises a torque ripple amplitude computing unit for extracting a component having the same frequency as that of the torque ripple corrective signal, from the motor torque information, then, detecting an amplitude thereof, and computing amplitude information based on the amplitude of the torque ripple corrective signal. The amplitude information thus computed and the sinusoidal wave data read out from the torque ripple corrective memory are multiplied together, so that the torque ripple corrective signal is found.

Additionally, the motor speed control device of the present invention may further comprises a torque ripple amplitude computing unit for taking in motor torque information of a rotational angle corresponding to a maximum amplitude or a minimum amplitude of the torque ripple corrective signal y times (y is an integer satisfying y>1), then, detecting an amplitude thereof by integrating and averaging the taken-in information, and computing amplitude information of the torque ripple corrective signal from the amplitude. The torque ripple corrective signal is found by multiplying the sinusoidal wave data read out from the torque ripple corrective memory and the amplitude information together.

Furthermore, y, representing the number of times an integrating operation is repeated until a mean value is found, is preferably an integral multiple of the number of times the integrating operation is repeated per one rotation of the motor.

With these arrangements, the amplitude of the torque ripple corrective signal may be adjusted in accordance with actual conditions of the rotation of the motor. As a result, more precise correction can be realized. Particularly, a speed error due to the torque ripple directly appears in the speed error information, and the speed error information can be detected without an additional circuit. Therefore, the amplitude of the torque ripple corrective signal is preferably adjusted in accordance with the motor torque information. Besides, in the case where the amplitude information is computed by addition and averaging, the arrangement of the torque ripple amplitude computing unit or the operation thereof is further simplified, since the amplitude information can be computed by simple calculations such as addition and averaging. Note that in the case where the amplitude information is computed by addition and averaging, by setting the number of times of the integrating operation in the aforementioned manner, the amplitude information is computed in accordance with actual conditions of the rotation of the motor during a period corresponding to several full rotational cycles of the motor. As a result, influences of motor decentricity, deflection, and the like can be suppressed, and more precise correction can be realized.

Incidentally, a transfer function between the motor torque ripple and the speed error information varies with the motor rotational speed. Therefore, in the case where the torque ripple amplitude computing unit computes the amplitude information from the speed error information without taking the rotational speed in consideration, an amplitude computed when the rotational speed greatly fluctuates is sometimes inappropriate.

In contrast, with the above arrangement wherein the torque ripple amplitude computing unit computes the amplitude information while referring to the rotational speed as well, correction can be executed with precision all the time, irrelevant to the rotational speed at which the motor is driven.

Furthermore, the motor speed control device of the present invention may further comprises a corrective effect detecting unit for sequentially detecting the torque ripple correction effect, so that the amplitude information of the torque ripple corrective signal is renewed in accordance with the detection result of the corrective effect detecting unit. With the above arrangement wherein the torque ripple correction effect is sequentially detected and the amplitude of the torque ripple corrective signal is changed in accordance with the detected torque ripple correction effect, automatic adjustment of the amplitude is realized, and more precise correction can be achieved.

Furthermore, the torque ripple corrective memory stores a plurality of corrective data streams differing in the number of constituent corrective data, and the motor speed control device may further comprise (1) a selecting unit for selecting, among the corrective data streams, one corrective data stream to be outputted as the torque ripple corrective signal, in accordance with a current pulse interval of the rotor magnetic pole position pulse signal, and (2) a corrective data reading unit for reading out, from the corrective data stream selected, a corrective data corresponding to the rotational angle information.

With this arrangement, even though the pulse interval of the rotor magnetic pole position pulse signal varies, cycles of the torque ripple corrective signal can be adjusted in accordance with respective pulse intervals of the rotor magnetic pole position pulse signal. Therefore, the motor speed can be stably controlled with high precision.

Additionally, instead of reproducing the torque ripple corrective signal from the torque ripple corrective memory, there may be provided a corrective data computing unit for computing a level of a torque ripple corrective signal corresponding to the rotational angle information, based on a total number of pieces of rotational angle information supplied during a current pulse interval of the rotor magnetic pole position pulse signal, and the rotational angle information detected. With this arrangement as well, the cycles of the torque ripple corrective signal can be adjusted in accordance with respective pulse intervals of the rotor magnetic pole position pulse signal. Therefore, the motor speed control device is made capable of stably controlling the motor speed with high precision.

Furthermore, there may be provided a phase compensating unit for adjusting the phase of the torque ripple corrective signal so as to compensate a phase difference between the torque ripple of the motor and the torque ripple corrective signal. With this arrangement, a phase difference between the torque ripple corrective signal and the actual motor torque ripple is reduced, thereby enabling more stable and precise control with respect to the motor rotational speed.

Note that the phase may be shifted by the phase compensating unit by, for example, a predetermined uniform degree, but in the case where the phase lag originating in the phase difference between the pulses varies or the phase lag stemming from the zeroth-order delay caused by data holding varies as is the case with an inexpensive motor, the phase lag cannot be sufficiently suppressed.

Therefore, the phase compensating unit preferably includes a phase difference detecting section for detecting a phase difference since input of a pulse of the rotor magnetic pole position pulse signal until input of a pulse of the rotational pulse signal.

With the foregoing arrangement wherein the phase difference detecting section detects the phase lag due to the phase difference between the pulses, even in the case where the phase difference between the pulses varies, for example, when an inexpensive motor or a small-size motor is controlled, the phase lag stemming from the phase difference can be surely compensated.

In addition, the phase compensating unit may be equipped with a phase lag computing section for computing a phase of the torque ripple corrective signal corresponding to 0.5 time the pulse interval of the rotational pulse signal. With this arrangement, the phase compensating unit computes a phase of the torque ripple corrective signal corresponding to 0.5 time the pulse interval of the rotational pulse signal. Therefore, even in the case a phase lag originating in the zeroth-order delay due to data holding varies as is the case with an inexpensive motor or a small motor, such a phase lag is surely compensated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor speed control device for controlling a rotational speed of a polyphase brushless motor, said device comprising:

a rotor magnetic pole position pulse signal generating circuit for generating a rotor magnetic pole position pulse signal having n pulses per one rotation of said motor, n being an integer greater than 1 and being an integral multiple of the number of driving magnetic poles of said motor;

a rotational pulse signal generating circuit for generating a rotational pulse signal indicating the number of rotations of said motor and having m pulses per one rotation of said motor, m being an integer greater than n;

a rotational angle detector for detecting rotational angle information indicating a rotational angle of said motor, based on the rotor magnetic pole position pulse signal and the rotational pulse signal;

a torque ripple corrective memory for preliminarily storing a data stream for correcting a torque ripple of said motor, reading out a data corresponding to the rotational angle information from the data stream, and outputting the data as a torque ripple corrective signal; and a correction circuit for using the torque ripple corrective signal in conjunction with a motor control signal for controlling the rotational speed of said motor so as to correct the motor control signal.

2. The motor speed control device as set forth in claim 1, wherein:

said rotational angle detector resets the rotational angle information in synchronization with the rotor magnetic pole position pulse signal and on a cycle shorter than a rotational cycle of said motor; and said torque ripple corrective memory reads out a data at an address indicated by the rotational angle information and outputs the data.

3. The motor speed control device as set forth in claim 2, wherein said rotational angle detector resets the rotational angle information at every pulse of the rotor magnetic pole position pulse signal, and changes the rotational angle information at every pulse of the rotational pulse signal.

4. The motor speed control device as set forth in claim 1, wherein said rotor magnetic pole position pulse signal generating circuit generates the rotor magnetic pole position pulse signal based on a motor coil excitation switching signal used for driving said motor.

5. A motor speed control device as set forth in claim 1, wherein said rotor magnetic pole position pulse signal generating circuit includes a synthesizing unit for synthesizing a plurality of excitation switching timing detection signals used for driving said motor, so as to generate the rotor magnetic pole position pulse signal.

6. The motor speed control device as set forth in claim 1, wherein said rotor magnetic pole position pulse signal generating circuit generates the rotor magnetic pole position pulse signal based on a back electromotive voltage induced at motor coils for driving said motor.

7. The motor speed control device as set forth in claim 1, wherein m, representing the number of pulses of the rotational pulse signal per one rotation of said motor, is an integral multiple of n, n representing the number of pulses of the rotor magnetic pole position pulse signal per one rotation of said motor.

8. The motor speed control device as set forth in claim 1, wherein the number of times said torque ripple corrective memory repeats the data stream per one rotation of said motor is set to a least common multiple of the number of coils and the number of driving magnetic poles of said motor.

9. The motor speed control device as set forth in claim 1, wherein the data stream stored in said torque ripple corrective memory is one type of either a sinusoidal wave data stream or a cosine wave data stream.

10. The motor speed control device as set forth in claim 1, wherein the data stream stored in said torque ripple corrective memory is a waveform data stream resulting on synthesizing a plurality of sinusoidal waves differing in at least either cycle or phase.

11. A motor speed control device as set forth in claim 1, further comprising:

a torque ripple corrective amplitude computing unit for, based on motor information fluctuating in accordance with a torque ripple of said motor, estimating amplitude information indicating an amplitude of the torque ripple corrective signal which is required to cancel the torque ripple; and an amplitude adjuster for adjusting the amplitude of the torque ripple corrective signal in accordance with the amplitude information.

12. The motor speed control device as set forth in claim 11, wherein said amplitude adjuster is a multiplier for multiplying the torque ripple corrective signal by the amplitude information.

13. The motor speed control device as set forth in claim 11, wherein the motor information is speed error information, the speed error information being found from a difference between motor speed information and a target value of the rotational speed of said motor, the motor speed information being computed based on the rotational pulse signal.

14. The motor speed control device as set forth in claim 11, wherein the motor information is motor torque information indicating a torque of said motor.

15. The motor speed control device as set forth in claim 14, wherein the motor torque information is found from inconsistency in exciting current supplied to motor coils for driving said motor.

16. The motor speed control device as set forth in claim 11, wherein said torque ripple corrective amplitude computing unit extracts a component having a same frequency as that of the torque ripple corrective signal, from the motor information, and computes the amplitude information based on the amplitude of the extracted component.

17. The motor speed control device as set forth in claim 11, wherein said torque ripple corrective amplitude computing unit computes the amplitude information, based on the motor information at a first point when the data stream stored in said torque ripple corrective memory exhibits a maximum amplitude and at a second point when the data stream exhibits a minimum amplitude.

18. The motor speed control device as set forth in claim 15, wherein said torque ripple corrective amplitude computing unit takes in the motor information at the first and second points a plurality of times, and computes the amplitude information based on the taken-in motor information.

19. The motor speed control device as set forth in claim 18, wherein said torque ripple corrective amplitude computing unit takes in the motor information at the first and second points a plurality of times, finds a mean value as to each of the first and second points, and computes the amplitude information based on a difference between the mean values.

20. The motor speed control device as set forth in claim 18, wherein said torque ripple corrective amplitude computing unit finds an amplitude from a difference between the motor information at the first point and the motor information at the second point a plurality of times, and computes the amplitude information based on a mean value of the plural amplitudes thus found.

21. The motor speed control device as set forth in claim 18, wherein the number of times said torque ripple corrective amplitude computing unit takes in both the motor information to compute one piece of the amplitude information is set to an integral multiple of the number of times the motor information is taken in per one rotation of said motor.

22. The motor speed control device as set forth in claim 11, wherein said torque ripple corrective amplitude computing unit corrects a value of the amplitude information in accordance with an average speed of said motor.

23. A motor speed control device as set forth in claim 11, further comprising:
correction suspending means for suspending correction of the motor control signal by said adder-subtractor while said torque ripple corrective amplitude computing unit is estimating the amplitude information.

24. The motor speed control device as set forth in claim 23, wherein said correction suspending means is a switch provided between said torque ripple corrective memory and said adder-subtractor.

25. The motor speed control device as set forth in claim 23, wherein said torque ripple corrective amplitude computing unit commands said correction suspending means to suspend the correction only in the case where the amplitude information has not yet been computed.

26. The motor speed control unit as set forth in claim 11, wherein said torque ripple corrective amplitude computing unit computes the amplitude information immediately after the rotation of said motor starts.

27. The motor speed control unit as set forth in claim 11, wherein said torque ripple corrective amplitude computing unit sequentially detects a torque ripple correction effect while said adder-subtractor is correcting the motor control signal, and renews the amplitude information to be supplied to said amplitude adjuster, based on the detection result.

28. The motor speed control unit as set forth in claim 27, wherein said torque ripple corrective amplitude computing unit continues to sequentially compute the amplitude information and detect a torque ripple correction effect, after the computation of the amplitude information as well.

29. The motor speed control device as set forth in claim 28, wherein said torque ripple corrective amplitude computing unit renews the amplitude information to be supplied to said amplitude adjuster in the case where the amplitude information thus sequentially computed is out of a predetermined range.

30. The motor speed control device as set forth in claim 28, wherein in renewal of the amplitude information, said torque ripple corrective amplitude computing unit increases or decreases the amplitude information by a set value, so that the torque ripple is suppressed.

31. The motor speed control device as set forth in claim 28, wherein in renewal of the amplitude information, said torque ripple corrective amplitude computing unit increases or decreases the amplitude information to be supplied to said amplitude adjuster, by a value equal to a newly computed amplitude information, so that the torque ripple is suppressed.

32. The motor speed control device as set forth in claim 1, wherein a plurality of corrective data streams differing in the number of constituent corrective data are stored in said torque ripple corrective memory,
said motor speed control device further comprising:
a selecting unit for selecting, among the corrective data streams, one corrective data stream to be outputted as the torque ripple corrective signal, in accordance with a current pulse interval of the rotor magnetic pole position pulse signal.

33. The motor speed control device as set forth in claim 32, wherein said selecting unit:
previously measures and stores each pulse interval of the rotor magnetic pole position pulse signal applied during one rotation of said motor; and
refers to the measured value when selecting the corrective data stream.

34. A motor speed control device as set forth in claim 1, further comprising:
a phase compensating unit for adjusting the phase of the torque ripple corrective signal so as to compensate a phase difference between the torque ripple of said motor and the torque ripple corrective signal.

35. The motor speed control device as set forth in claim 34, wherein said phase compensating unit includes a phase difference detecting section for detecting a phase difference since input of a pulse of the rotor magnetic pole position pulse signal until input of a pulse of the rotational pulse signal.

36. The motor speed control device as set forth in claim 34, wherein said phase compensating unit includes a phase lag computing section for computing a phase of the torque ripple corrective signal corresponding to 0.5 time the pulse interval of the rotational pulse signal.

37. A motor speed control device for controlling a rotational speed of a polyphase brushless motor, said device comprising:
a rotor magnetic pole position pulse signal generating circuit for generating a rotor magnetic pole position pulse signal having n pulses per one rotation of said motor, n being an integer greater than 1 and being an integral multiple of the number of driving magnetic poles of said motor:
a rotational pulse signal generating circuit for generating a rotational pulse signal indicating the number of rotations of said motor and having m pulses per one rotation of said motor, m being an integer greater than n;
a rotational angle detector for detecting rotational angle information indicating a rotational angle of said motor, based on the rotor magnetic pole position pulse signal and the rotational pulse signal;
a corrective data computing unit for computing a level of a torque ripple corrective signal corresponding to the rotational angle information, based on a total number of pieces of rotational angle information supplied during a current pulse interval of the rotor magnetic pole position pulse signal, and the rotational angle information detected; and
a correction circuit for using the torque ripple corrective signal in conjunction with a motor control signal for controlling the rotational speed of said motor so as to correct the motor signal.

38. A motor speed control device as set forth in claim 37, further comprising:
a phase compensating unit for adjusting a phase of the torque ripple corrective signal so as to compensate a phase difference between the torque ripple of said motor and the torque ripple corrective signal.

39. The motor speed control device as set forth in claim 37, wherein said phase compensating unit includes phase difference detecting section for detecting a phase difference since input of a pulse of the rotor magnetic pole position pulse signal until input of a pulse of the rotational pulse signal.

40. The motor speed control device as set forth in claim 37, wherein said phase compensating unit includes a phase lag computing section for computing a phase of the torque ripple corrective signal corresponding to 0.5 time the pulse interval of the rotational pulse signal.

41. A motor speed control device as set forth in claim 37, further comprising:

a torque ripple corrective amplitude computing unit for, based on motor information fluctuating in accordance with a torque ripple of said motor, estimating amplitude information indicating an amplitude of the torque ripple corrective signal which is required to cancel the torque ripple; and an amplitude adjuster for adjusting the amplitude of the torque ripple corrective signal in accordance with the amplitude information.

42. A torque ripple correcting method of a motor speed control device for controlling a rotational speed of a polyphase brushless motor, said method comprising the steps of:

(a) storing a torque ripple corrective signal synchronizing with a rotor magnetic pole position pulse signal which is inputted at timings in synchronization with driving magnetic pole positions of said motor, the torque ripple corrective signal having a cycle shorter than a pulse input cycle of the rotor magnetic pole position pulse signal; and (b) correcting a motor control signal for controlling the rotational speed of said motor, by reproducing the torque ripple corrective signal and using the torque ripple corrective signal in conjunction with the motor control signal, in synchronization with the rotor magnetic pole position pulse signal.

43. A torque ripple correcting method as set forth in claim 42, further comprising the step of:

(c) measuring an amplitude of a torque ripple of said motor, and based on the measurement result, adjusting an amplitude of the torque ripple corrective signal to be used, step (c) being conducted between said step (a) and said step (b).

44. The torque ripple correcting method as set forth in claim 42, wherein said step (b) includes the sub-step of sequentially measuring a torque ripple generated in said motor, and based on the measurement result, correcting the amplitude of the torque ripple corrective signal.

45. The torque ripple correcting method as set forth in claim 42, wherein said step (b) includes the sub-step of adjusting a cycle of the torque ripple corrective signal in accordance with a pulse interval of the rotor magnetic pole position pulse signal.

46. The torque ripple correcting method as set forth in claim 42, wherein:

a level of the torque ripple corrective signal reproduced through said step (b) is renewed every time a pulse of a rotational pulse signal is inputted, the rotational pulse signal having a shorter pulse interval than that of the rotor magnetic pole position pulse signal and having the number of pulses proportional to the number of motor rotations; and said step (b) includes the sub-step of adjusting a phase difference, for shifting a phase of the torque ripple corrective signal by a phase difference since input of a pulse of the rotor magnetic pole position pulse signal until input of a pulse of the rotational pulse signal.

47. The torque ripple correcting method as set forth in claim 42, wherein:

a level of the torque ripple corrective signal reproduced through said step (b) is renewed every time a pulse of a rotational pulse signal is inputted, the rotational pulse signal having a shorter pulse interval than that of the rotor magnetic pole position pulse signal and having the number of pulses proportional to the number of motor rotations; and said step (b) includes the sub-step of adjusting a phase lag, for shifting a phase of the torque ripple corrective signal by a degree corresponding to 0.5 time the pulse interval of the rotational pulse signal.

48. The torque ripple correcting method as set forth in claim 42, wherein:

through said step (a), a computing process for computing a level of the torque ripple corrective signal based on the number of pulses of a rotational pulse signal is stored, the rotational pulse signal having a shorter pulse interval than that of the rotor magnetic pole position pulse signal and having the number of pulses proportional to the number of motor rotations; and the level of the torque ripple corrective signal to be reproduced through said step (b) is computed through the computing process every time a pulse of the rotational signal is inputted.

49. The motor speed control device as set forth in claim 1, wherein said rotational pulse signal generating circuit is a rotation detecting sensor for detecting a magnetic pattern formed on a motor rotating section.

50. The motor speed control device as set forth in claim 1, wherein said rotor magnetic pole position pulse signal generating circuit is a position detecting sensor for detecting positions of driving magnetic poles of a motor rotor.

51. The motor speed control device as set forth in claim 37, wherein said rotational pulse signal generating circuit is a rotation detecting sensor for detecting a magnetic pattern formed on a motor rotating section.

52. The motor speed control device as set forth in claim 37, wherein said rotor magnetic pole position pulse signal generating circuit is a position detecting sensor for detecting positions of driving magnetic poles of a motor rotor.

53. The motor speed control device of claim 1, wherein the correction circuit is an adder for adding the torque ripple corrective signal to the motor control signal.

54. The motor speed control device of claim 37, wherein the correction circuit is an adder for adding the torque ripple corrective signal to the motor control signal.

55. The torque ripple correcting method of claim 42, wherein the torque ripple corrective signal is added to the motor control signal in step (b).

* * * * *